US012333623B1

(12) United States Patent
Kapczynski

(10) Patent No.: US 12,333,623 B1
(45) **Date of Patent: *Jun. 17, 2025**

(54) DIGITAL IDENTITY

(71) Applicant: ConsumerInfo.com, Inc., Costa Mesa, CA (US)

(72) Inventor: Mark Joseph Kapczynski, Santa Monica, CA (US)

(73) Assignee: ConsumerInfo.com, Inc., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/471,197

(22) Filed: Sep. 20, 2023

Related U.S. Application Data

(63) Continuation of application No. 17/444,849, filed on Aug. 11, 2021, now Pat. No. 11,803,929, which is a continuation of application No. 16/657,174, filed on Oct. 18, 2019, now Pat. No. 11,120,519, which is a continuation of application No. 15/662,712, filed on Jul. 28, 2017, now Pat. No. 10,453,159, which is a continuation of application No. 14/276,540, filed on May 13, 2014, now Pat. No. 9,721,147.

(60) Provisional application No. 61/826,925, filed on May 23, 2013.

(51) Int. Cl.
*G06Q 50/26* (2024.01)

(52) U.S. Cl.
CPC .................................. *G06Q 50/265* (2013.01)

(58) Field of Classification Search
None
See application file for complete search history.

(56) References Cited

U.S. PATENT DOCUMENTS

| | | | |
|---|---|---|---|
| 3,752,904 | A | 8/1973 | Waterbury |
| 4,795,890 | A | 1/1989 | Goldman |
| 4,891,503 | A | 1/1990 | Jewell |
| 4,977,595 | A | 12/1990 | Ohta et al. |
| 4,989,141 | A | 1/1991 | Lyons et al. |
| 5,095,480 | A | 3/1992 | Fenner |
| 5,126,936 | A | 6/1992 | Champion et al. |
| 5,351,293 | A | 9/1994 | Michener et al. |
| 5,490,258 | A | 2/1996 | Fenner |
| 5,590,038 | A | 12/1996 | Pitroda |

(Continued)

FOREIGN PATENT DOCUMENTS

| | | |
|---|---|---|
| AU | 2017397325 | 8/2018 |
| AU | 2023223007 | 9/2023 |

(Continued)

OTHER PUBLICATIONS

U.S. Appl. No. 12/705,489, filed Feb. 12, 2010, Bargoli et al.

(Continued)

*Primary Examiner* — Nancy Bitar
(74) *Attorney, Agent, or Firm* — Knobbe, Martens, Olson & Bear, LLP

(57) ABSTRACT

A digital identity, which may include a user interface that may be displayed on a mobile computing device, may be generated to include information extracted from a physical identification card (e.g., driver license or passport), as well as information regarding validation of the physical identification card and of the consumer's identity. The digital identity may be used in place of the physical identification card.

18 Claims, 12 Drawing Sheets

(56) References Cited

U.S. PATENT DOCUMENTS

| | | | |
|---|---|---|---|
| 5,640,577 | A | 6/1997 | Scharmer |
| 5,659,725 | A | 8/1997 | Levy et al. |
| 5,659,731 | A | 8/1997 | Gustafson |
| 5,715,314 | A | 2/1998 | Payne et al. |
| 5,719,941 | A | 2/1998 | Swift et al. |
| 5,748,098 | A | 5/1998 | Grace |
| 5,754,632 | A | 5/1998 | Smith |
| 5,828,840 | A | 10/1998 | Cowan et al. |
| 5,832,068 | A | 11/1998 | Smith |
| 5,842,224 | A | 11/1998 | Fenner |
| 5,844,218 | A | 12/1998 | Kawan et al. |
| 5,860,136 | A | 1/1999 | Fenner |
| 5,866,889 | A | 2/1999 | Weiss et al. |
| 5,881,131 | A | 3/1999 | Farris et al. |
| 5,903,830 | A | 5/1999 | Joao et al. |
| 5,913,196 | A | 6/1999 | Talmor et al. |
| 5,956,693 | A | 9/1999 | Geerlings |
| 5,966,695 | A | 10/1999 | Melchione et al. |
| 5,999,596 | A | 12/1999 | Walker et al. |
| 6,021,397 | A | 2/2000 | Jones et al. |
| 6,021,943 | A | 2/2000 | Chastain |
| 6,026,440 | A | 2/2000 | Shrader et al. |
| 6,038,551 | A | 3/2000 | Barlow et al. |
| 6,055,570 | A | 4/2000 | Nielsen |
| 6,069,941 | A | 5/2000 | Byrd et al. |
| 6,072,894 | A | 6/2000 | Payne |
| 6,073,106 | A | 6/2000 | Rozen et al. |
| 6,073,140 | A | 6/2000 | Morgan et al. |
| 6,084,704 | A | 7/2000 | Button et al. |
| 6,085,242 | A | 7/2000 | Chandra |
| 6,119,103 | A | 9/2000 | Basch et al. |
| 6,128,602 | A | 10/2000 | Northington et al. |
| 6,157,707 | A | 12/2000 | Baulier et al. |
| 6,161,139 | A | 12/2000 | Win et al. |
| 6,182,068 | B1 | 1/2001 | Culliss |
| 6,182,219 | B1 | 1/2001 | Feldbau et al. |
| 6,182,229 | B1 | 1/2001 | Nielsen |
| 6,196,460 | B1 | 3/2001 | Shin |
| 6,233,588 | B1 | 5/2001 | Marchoili et al. |
| 6,247,000 | B1 | 6/2001 | Hawkins et al. |
| 6,253,202 | B1 | 6/2001 | Gilmour |
| 6,254,000 | B1 | 7/2001 | Degen et al. |
| 6,263,447 | B1 | 7/2001 | French et al. |
| 6,269,369 | B1 | 7/2001 | Robertson |
| 6,282,658 | B2 | 8/2001 | French et al. |
| 6,292,795 | B1 | 9/2001 | Peters et al. |
| 6,311,169 | B2 | 10/2001 | Duhon |
| 6,321,339 | B1 | 11/2001 | French et al. |
| 6,327,578 | B1 | 12/2001 | Linehan |
| 6,343,279 | B1 | 1/2002 | Bissonette et al. |
| 6,356,937 | B1 | 3/2002 | Montville et al. |
| 6,397,212 | B1 | 5/2002 | Biffar |
| 6,453,353 | B1 | 9/2002 | Win et al. |
| 6,457,012 | B1 | 9/2002 | Jatkowski |
| 6,463,533 | B1 | 10/2002 | Calamera et al. |
| 6,473,740 | B2 | 10/2002 | Cockril et al. |
| 6,496,936 | B1 | 12/2002 | French et al. |
| 6,510,415 | B1 | 1/2003 | Talmor et al. |
| 6,523,021 | B1 | 2/2003 | Monberg et al. |
| 6,523,041 | B1 | 2/2003 | Morgan et al. |
| 6,539,377 | B1 | 3/2003 | Culliss |
| 6,564,210 | B1 | 5/2003 | Korda et al. |
| 6,571,334 | B1 | 5/2003 | Feldbau et al. |
| 6,574,736 | B1 | 6/2003 | Andrews |
| 6,581,059 | B1 | 6/2003 | Barrett et al. |
| 6,601,173 | B1 | 7/2003 | Mohler |
| 6,607,136 | B1 | 8/2003 | Atsmon et al. |
| 6,622,131 | B1 | 9/2003 | Brown et al. |
| 6,629,245 | B1 | 9/2003 | Stone et al. |
| 6,647,383 | B1 | 11/2003 | August et al. |
| 6,654,786 | B1 | 11/2003 | Fox et al. |
| 6,658,393 | B1 | 12/2003 | Basch et al. |
| 6,679,425 | B1 | 1/2004 | Sheppard et al. |
| 6,714,944 | B1 | 3/2004 | Shapiro et al. |
| 6,725,381 | B1 | 4/2004 | Smith et al. |
| 6,734,886 | B1 | 5/2004 | Hagan et al. |
| 6,750,985 | B2 | 6/2004 | Rhoads |
| 6,754,665 | B1 | 6/2004 | Futagami et al. |
| 6,766,327 | B2 | 7/2004 | Morgan, Jr. et al. |
| 6,766,946 | B2 | 7/2004 | Iida et al. |
| 6,782,379 | B2 | 8/2004 | Lee |
| 6,795,812 | B1 | 9/2004 | Lent et al. |
| 6,796,497 | B2 | 9/2004 | Benkert et al. |
| 6,804,346 | B1 | 10/2004 | Mewhinney |
| 6,805,287 | B2 | 10/2004 | Bishop et al. |
| 6,816,850 | B2 | 11/2004 | Culliss |
| 6,816,871 | B2 | 11/2004 | Lee |
| 6,823,319 | B1 | 11/2004 | Lynch et al. |
| 6,829,711 | B1 | 12/2004 | Kwok et al. |
| 6,845,448 | B1 | 1/2005 | Chaganti et al. |
| 6,857,073 | B2 | 2/2005 | French et al. |
| 6,871,287 | B1 | 3/2005 | Ellingson |
| 6,892,307 | B1 | 5/2005 | Wood et al. |
| 6,900,731 | B2 | 5/2005 | Kreiner et al. |
| 6,907,408 | B2 | 6/2005 | Angel |
| 6,908,030 | B2 | 6/2005 | Rajasekaran et al. |
| 6,910,624 | B1 | 6/2005 | Natsuno |
| 6,920,435 | B2 | 7/2005 | Hoffman et al. |
| 6,928,487 | B2 | 8/2005 | Eggebraaten et al. |
| 6,934,714 | B2 | 8/2005 | Meinig |
| 6,934,849 | B2 | 8/2005 | Kramer et al. |
| 6,934,858 | B2 | 8/2005 | Woodhill |
| 6,947,989 | B2 | 9/2005 | Gullotta et al. |
| 6,950,807 | B2 | 9/2005 | Brock |
| 6,950,809 | B2 | 9/2005 | Dahan et al. |
| 6,950,858 | B2 | 9/2005 | Ogami |
| 6,965,881 | B1 | 11/2005 | Brickell et al. |
| 6,968,319 | B1 | 11/2005 | Remington et al. |
| 6,973,462 | B2 | 12/2005 | Dattero et al. |
| 6,983,381 | B2 | 1/2006 | Jerdonek |
| 6,985,887 | B1 | 1/2006 | Sunstein et al. |
| 6,986,461 | B1 | 1/2006 | Geoghegan et al. |
| 6,988,085 | B2 | 1/2006 | Hedy |
| 6,993,596 | B2 | 1/2006 | Hinton et al. |
| 6,999,941 | B1 | 2/2006 | Agarwal |
| 7,016,907 | B2 | 3/2006 | Boreham et al. |
| 7,028,013 | B2 | 4/2006 | Saeki |
| 7,028,052 | B2 | 4/2006 | Chapman et al. |
| 7,039,607 | B2 | 5/2006 | Watarai et al. |
| 7,043,476 | B2 | 5/2006 | Robson |
| 7,058,817 | B1 | 6/2006 | Ellmore |
| 7,059,531 | B2 | 6/2006 | Beenau et al. |
| 7,062,475 | B1 | 6/2006 | Szabo et al. |
| 7,076,462 | B1 | 7/2006 | Nelson et al. |
| 7,085,727 | B2 | 8/2006 | VanOrman |
| 7,089,584 | B1 | 8/2006 | Sharma |
| 7,107,241 | B1 | 9/2006 | Pinto |
| 7,117,172 | B1 | 10/2006 | Black |
| 7,121,471 | B2 | 10/2006 | Beenau et al. |
| 7,124,144 | B2 | 10/2006 | Christianson et al. |
| 7,154,375 | B2 | 12/2006 | Beenau et al. |
| 7,155,739 | B2 | 12/2006 | Bari et al. |
| 7,174,454 | B2 | 2/2007 | Roskind |
| 7,177,846 | B2 | 2/2007 | Moenickheim et al. |
| 7,194,416 | B1 | 3/2007 | Provost et al. |
| 7,200,602 | B2 | 4/2007 | Jonas |
| 7,203,653 | B1 | 4/2007 | McIntosh |
| 7,209,895 | B2 | 4/2007 | Kundtz et al. |
| 7,219,107 | B2 | 5/2007 | Beringer |
| 7,222,369 | B2 | 5/2007 | Vering et al. |
| 7,225,464 | B2 | 5/2007 | Satyavolu et al. |
| 7,231,657 | B2 | 6/2007 | Honarvar et al. |
| 7,234,156 | B2 | 6/2007 | French et al. |
| 7,234,160 | B2 | 6/2007 | Vogel et al. |
| 7,237,267 | B2 | 6/2007 | Rayes et al. |
| 7,240,199 | B2 | 7/2007 | Tomkow |
| 7,240,363 | B1 | 7/2007 | Ellingson |
| 7,243,369 | B2 | 7/2007 | Bhat et al. |
| 7,246,067 | B2 | 7/2007 | Austin et al. |
| 7,246,740 | B2 | 7/2007 | Swift et al. |
| 7,249,096 | B1 | 7/2007 | Lasater et al. |
| 7,249,113 | B1 | 7/2007 | Continelli et al. |
| 7,251,347 | B2 * | 7/2007 | Smith ................ G06K 9/00577 340/5.8 |

(56) References Cited

U.S. PATENT DOCUMENTS

| | | | |
|---|---|---|---|
| 7,263,497 | B1 | 8/2007 | Wiser et al. |
| 7,289,971 | B1 | 10/2007 | O'Neil et al. |
| 7,303,120 | B2 | 12/2007 | Beenau et al. |
| 7,310,611 | B2 | 12/2007 | Shibuya et al. |
| 7,314,167 | B1 | 1/2008 | Kiliccote |
| 7,328,233 | B2 | 2/2008 | Salim et al. |
| 7,330,871 | B2 | 2/2008 | Barber |
| 7,333,635 | B2 | 2/2008 | Tsantes et al. |
| 7,337,468 | B2 | 2/2008 | Metzger |
| 7,340,042 | B2 | 3/2008 | Cluff et al. |
| 7,340,679 | B2 | 3/2008 | Botscheck et al. |
| 7,343,149 | B2 | 3/2008 | Benco |
| 7,343,295 | B2 | 3/2008 | Pomerance |
| 7,356,503 | B1 | 4/2008 | Johnson et al. |
| 7,356,506 | B2 | 4/2008 | Watson et al. |
| 7,356,516 | B2 | 4/2008 | Richey et al. |
| 7,370,044 | B2 | 5/2008 | Mulhern et al. |
| 7,370,351 | B1 | 5/2008 | Ramachandran et al. |
| 7,383,988 | B2 | 6/2008 | Slonecker, Jr. |
| 7,386,448 | B1 | 6/2008 | Poss et al. |
| 7,389,913 | B2 | 6/2008 | Starrs |
| 7,403,942 | B1 | 7/2008 | Bayliss |
| 7,421,732 | B2 | 9/2008 | Costa-Requena et al. |
| 7,433,864 | B2 | 10/2008 | Malik |
| 7,437,679 | B2 | 10/2008 | Uemura et al. |
| 7,438,226 | B2 | 10/2008 | Helsper et al. |
| 7,444,414 | B2 | 10/2008 | Foster et al. |
| 7,444,518 | B1 | 10/2008 | Dharmarajan et al. |
| 7,451,113 | B1 | 11/2008 | Kasower |
| 7,458,508 | B1 | 12/2008 | Shao et al. |
| 7,460,857 | B2 | 12/2008 | Roach, Jr. |
| 7,467,401 | B2 | 12/2008 | Cicchitto |
| 7,478,157 | B2 | 1/2009 | Bohrer et al. |
| 7,480,631 | B1 | 1/2009 | Merced et al. |
| 7,490,356 | B2 | 2/2009 | Lieblich et al. |
| 7,503,489 | B2 | 3/2009 | Heffez |
| 7,509,117 | B2 | 3/2009 | Yum |
| 7,509,278 | B2 | 3/2009 | Jones |
| 7,512,221 | B2 | 3/2009 | Toms |
| 7,519,558 | B2 | 4/2009 | Ballard et al. |
| 7,526,796 | B2 | 4/2009 | Lulich et al. |
| 7,529,698 | B2 | 5/2009 | Joao |
| 7,530,097 | B2 | 5/2009 | Casco-Arias et al. |
| 7,542,993 | B2 | 6/2009 | Satterfield et al. |
| 7,543,739 | B2 | 6/2009 | Brown et al. |
| 7,546,271 | B1 | 6/2009 | Chmielewski et al. |
| 7,548,886 | B2 | 6/2009 | Kirkland et al. |
| 7,552,080 | B1 | 6/2009 | Willard et al. |
| 7,552,123 | B2 | 6/2009 | Wade et al. |
| 7,552,467 | B2 | 6/2009 | Lindsay |
| 7,555,459 | B2 | 6/2009 | Dhar et al. |
| 7,562,184 | B2 | 7/2009 | Henmi et al. |
| 7,562,814 | B1 | 7/2009 | Shao et al. |
| 7,566,002 | B2 | 7/2009 | Love et al. |
| 7,571,473 | B1 | 8/2009 | Boydstun et al. |
| 7,575,157 | B2 | 8/2009 | Barnhardt et al. |
| 7,577,665 | B2 | 8/2009 | Ramer et al. |
| 7,577,934 | B2 | 8/2009 | Anonsen et al. |
| 7,580,884 | B2 | 8/2009 | Cook |
| 7,581,112 | B2 | 8/2009 | Brown et al. |
| 7,584,126 | B1 | 9/2009 | White |
| 7,584,146 | B1 | 9/2009 | Duhon |
| 7,587,366 | B2 | 9/2009 | Grim, III et al. |
| 7,587,368 | B2 | 9/2009 | Felsher |
| 7,603,701 | B2 | 10/2009 | Gaucas |
| 7,606,401 | B2 | 10/2009 | Hoffman et al. |
| 7,606,725 | B2 | 10/2009 | Robertson et al. |
| 7,610,216 | B1 | 10/2009 | May et al. |
| 7,613,600 | B2 | 11/2009 | Krane |
| 7,620,596 | B2 | 11/2009 | Knudson et al. |
| 7,623,844 | B2 | 11/2009 | Herrmann et al. |
| 7,630,932 | B2 | 12/2009 | Danaher et al. |
| 7,634,737 | B2 | 12/2009 | Beringer et al. |
| 7,636,941 | B2 | 12/2009 | Blinn et al. |
| 7,641,113 | B1 | 1/2010 | Alvarez et al. |
| 7,647,344 | B2 | 1/2010 | Skurtovich, Jr. et al. |
| 7,653,592 | B1 | 1/2010 | Flaxman et al. |
| 7,653,600 | B2 | 1/2010 | Gustin |
| 7,653,688 | B2 | 1/2010 | Bittner |
| 7,657,431 | B2 | 2/2010 | Hayakawa |
| 7,660,989 | B2 | 2/2010 | Tomkow |
| 7,672,833 | B2 | 3/2010 | Blume et al. |
| 7,676,834 | B2 | 3/2010 | Camaisa et al. |
| 7,685,096 | B2 | 3/2010 | Margolus et al. |
| 7,685,209 | B1 | 3/2010 | Norton et al. |
| 7,685,279 | B2 | 3/2010 | Miltonberger et al. |
| 7,686,214 | B1 | 3/2010 | Shao et al. |
| 7,689,487 | B1 | 3/2010 | Britto et al. |
| 7,689,505 | B2 | 3/2010 | Kasower |
| 7,689,563 | B1 | 3/2010 | Jacobson |
| 7,690,032 | B1 | 3/2010 | Peirce |
| 7,698,214 | B1 | 4/2010 | Lindgren |
| 7,698,217 | B1 | 4/2010 | Phillips et al. |
| 7,698,445 | B2 | 4/2010 | Fitzpatrick et al. |
| 7,698,558 | B2 | 4/2010 | Tomkow |
| 7,707,271 | B2 | 4/2010 | Rudkin et al. |
| 7,707,624 | B2 | 4/2010 | Tomkow |
| 7,708,190 | B2 | 5/2010 | Brandt et al. |
| 7,711,635 | B2 | 5/2010 | Steele et al. |
| 7,725,385 | B2 | 5/2010 | Royer et al. |
| 7,730,078 | B2 | 6/2010 | Schwabe et al. |
| 7,739,139 | B2 | 6/2010 | Robertson et al. |
| 7,747,494 | B1 | 6/2010 | Kothari et al. |
| 7,747,520 | B2 | 6/2010 | Livermore et al. |
| 7,747,521 | B2 | 6/2010 | Serio |
| 7,747,542 | B2 | 6/2010 | Morley et al. |
| 7,761,384 | B2 | 7/2010 | Madhogarhia |
| 7,761,568 | B1 | 7/2010 | Levi et al. |
| 7,765,166 | B2 | 7/2010 | Beringer et al. |
| 7,765,311 | B2 | 7/2010 | Itabashi et al. |
| 7,769,696 | B2 | 8/2010 | Yoda |
| 7,769,697 | B2 | 8/2010 | Fieschi et al. |
| 7,769,998 | B2 | 8/2010 | Lynch et al. |
| 7,774,270 | B1 | 8/2010 | MacCloskey |
| 7,788,040 | B2 | 8/2010 | Haskell et al. |
| 7,792,715 | B1 | 9/2010 | Kasower |
| 7,792,725 | B2 | 9/2010 | Booraem et al. |
| 7,793,835 | B1 | 9/2010 | Coggeshall et al. |
| 7,797,725 | B2 | 9/2010 | Lunt et al. |
| 7,801,828 | B2 | 9/2010 | Candella et al. |
| 7,801,956 | B1 | 9/2010 | Cumberbatch et al. |
| 7,802,104 | B2 | 9/2010 | Dickinson |
| 7,810,036 | B2 | 10/2010 | Bales et al. |
| 7,818,228 | B1 | 10/2010 | Coulter |
| 7,827,115 | B2 | 11/2010 | Weller et al. |
| 7,841,004 | B1 | 11/2010 | Balducci et al. |
| 7,841,008 | B1 | 11/2010 | Cole et al. |
| 7,844,520 | B1 | 11/2010 | Franklin |
| 7,849,014 | B2 | 12/2010 | Erikson |
| 7,849,624 | B2 | 12/2010 | Holt et al. |
| 7,853,493 | B2 | 12/2010 | DeBie et al. |
| 7,853,533 | B2 | 12/2010 | Eisen |
| 7,853,984 | B2 | 12/2010 | Antell et al. |
| 7,865,557 | B2 | 1/2011 | Tomkow |
| 7,865,958 | B2 | 1/2011 | Lieblich et al. |
| 7,870,078 | B2 | 1/2011 | Clark et al. |
| 7,877,304 | B1 | 1/2011 | Coulter |
| 7,877,784 | B2 | 1/2011 | Chow et al. |
| 7,880,728 | B2 | 2/2011 | de los Reyes et al. |
| 7,886,008 | B2 | 2/2011 | Tomkow et al. |
| 7,908,242 | B1 | 3/2011 | Achanta |
| 7,909,246 | B2 | 3/2011 | Hogg et al. |
| 7,912,865 | B2 | 3/2011 | Akerman et al. |
| 7,930,285 | B2 | 4/2011 | Abraham et al. |
| 7,930,411 | B1 | 4/2011 | Hayward |
| 7,941,324 | B1 | 5/2011 | Sholtis |
| 7,957,266 | B2 | 6/2011 | Kodialam et al. |
| 7,958,046 | B2 | 6/2011 | Doerner et al. |
| 7,966,192 | B2 | 6/2011 | Pagliari et al. |
| 7,966,372 | B1 | 6/2011 | Tomkow |
| 7,970,679 | B2 | 6/2011 | Kasower |
| 7,975,299 | B1 | 7/2011 | Balducci et al. |
| 7,979,908 | B2 | 7/2011 | Millwee |
| 7,983,932 | B2 | 7/2011 | Kane |

(56) References Cited

U.S. PATENT DOCUMENTS

| | | | |
|---|---|---|---|
| 7,983,979 | B2 | 7/2011 | Holland, IV |
| 7,991,688 | B2 | 8/2011 | Phelan et al. |
| 8,001,153 | B2 | 8/2011 | Skurtovich, Jr. et al. |
| 8,001,235 | B2 | 8/2011 | Russ et al. |
| 8,005,155 | B1 | 8/2011 | Lee et al. |
| 8,011,582 | B2 | 9/2011 | Ghafarzadeh |
| 8,032,932 | B2 | 10/2011 | Speyer et al. |
| 8,037,097 | B2 | 10/2011 | Guo et al. |
| 8,041,956 | B1 | 10/2011 | White et al. |
| 8,055,904 | B1 | 11/2011 | Cato et al. |
| 8,060,424 | B2 | 11/2011 | Kasower |
| 8,060,916 | B2 | 11/2011 | Bajaj et al. |
| 8,065,233 | B2 | 11/2011 | Lee et al. |
| 8,073,785 | B1 | 12/2011 | Candella et al. |
| 8,078,453 | B2 | 12/2011 | Shaw |
| 8,078,524 | B2 | 12/2011 | Crawford et al. |
| 8,078,881 | B1 | 12/2011 | Liu |
| 8,079,070 | B2 | 12/2011 | Camaisa et al. |
| 8,099,341 | B2 | 1/2012 | Varghese |
| 8,104,679 | B2 | 1/2012 | Brown |
| 8,116,731 | B2 | 2/2012 | Buhrmann et al. |
| 8,116,751 | B2 | 2/2012 | Aaron |
| 8,127,982 | B1 | 3/2012 | Casey et al. |
| 8,127,986 | B1 | 3/2012 | Taylor et al. |
| 8,131,777 | B2 | 3/2012 | McCullouch |
| 8,144,368 | B2 * | 3/2012 | Rodriguez ............ G06T 1/0021 358/3.28 |
| 8,151,327 | B2 | 4/2012 | Eisen |
| 8,161,104 | B2 | 4/2012 | Tomkow |
| 8,172,132 | B2 | 5/2012 | Love et al. |
| 8,175,889 | B1 | 5/2012 | Girulat et al. |
| 8,185,747 | B2 | 5/2012 | Wood et al. |
| 8,190,513 | B2 | 5/2012 | Felger |
| 8,195,549 | B2 | 6/2012 | Kasower |
| 8,209,389 | B2 | 6/2012 | Tomkow |
| 8,219,771 | B2 | 7/2012 | Le Neel |
| 8,219,822 | B2 | 7/2012 | Camaisa et al. |
| 8,224,723 | B2 | 7/2012 | Bosch et al. |
| 8,224,913 | B2 | 7/2012 | Tomkow |
| 8,225,395 | B2 | 7/2012 | Atwood et al. |
| 8,229,810 | B2 | 7/2012 | Butera et al. |
| 8,229,844 | B2 | 7/2012 | Felger |
| 8,234,498 | B2 | 7/2012 | Britti et al. |
| 8,239,677 | B2 | 8/2012 | Colson |
| 8,239,929 | B2 | 8/2012 | Kwan et al. |
| 8,241,369 | B2 | 8/2012 | Stevens |
| 8,244,629 | B2 | 8/2012 | Lewis et al. |
| 8,244,848 | B1 | 8/2012 | Narayanan et al. |
| 8,255,452 | B2 | 8/2012 | Piliouras |
| 8,255,971 | B1 | 8/2012 | Webb et al. |
| 8,255,978 | B2 | 8/2012 | Dick |
| 8,260,706 | B2 | 9/2012 | Freishtat et al. |
| 8,261,334 | B2 | 9/2012 | Hazlehurst et al. |
| 8,266,065 | B2 | 9/2012 | Dilip et al. |
| 8,275,845 | B2 | 9/2012 | Tomkow |
| 8,280,348 | B2 | 10/2012 | Snyder et al. |
| 8,281,372 | B1 | 10/2012 | Vidal |
| 8,285,613 | B1 | 10/2012 | Coulter |
| 8,285,656 | B1 | 10/2012 | Chang et al. |
| 8,291,218 | B2 | 10/2012 | Garcia et al. |
| 8,291,477 | B2 | 10/2012 | Lunt |
| 8,295,898 | B2 | 10/2012 | Ashfield et al. |
| 8,296,562 | B2 | 10/2012 | Williams et al. |
| 8,302,164 | B2 | 10/2012 | Lunt |
| 8,312,033 | B1 | 11/2012 | McMillan |
| 8,315,940 | B2 | 11/2012 | Winbom et al. |
| 8,327,429 | B2 | 12/2012 | Speyer et al. |
| 8,359,278 | B2 | 1/2013 | Domenikos et al. |
| 8,359,393 | B2 | 1/2013 | Metzger |
| 8,374,634 | B2 | 2/2013 | Dankar et al. |
| 8,374,973 | B2 | 2/2013 | Herbrich et al. |
| 8,406,736 | B2 | 3/2013 | Das et al. |
| 8,423,648 | B2 | 4/2013 | Ferguson et al. |
| 8,442,886 | B1 | 5/2013 | Haggerty et al. |
| 8,442,910 | B2 | 5/2013 | Morris et al. |
| 8,443,202 | B2 | 5/2013 | White et al. |
| 8,447,016 | B1 | 5/2013 | Kugler et al. |
| 8,456,293 | B1 | 6/2013 | Trundle et al. |
| 8,464,939 | B1 | 6/2013 | Taylor et al. |
| 8,468,090 | B2 | 6/2013 | Lesandro et al. |
| 8,468,198 | B2 | 6/2013 | Tomkow |
| 8,468,199 | B2 | 6/2013 | Tomkow |
| 8,478,674 | B1 | 7/2013 | Kapczynski et al. |
| 8,478,981 | B2 | 7/2013 | Khan et al. |
| 8,484,186 | B1 | 7/2013 | Kapczynski et al. |
| 8,484,706 | B2 | 7/2013 | Tomkow |
| 8,504,628 | B2 | 8/2013 | Tomkow |
| 8,515,828 | B1 | 8/2013 | Wolf et al. |
| 8,515,844 | B2 | 8/2013 | Kasower |
| 8,527,357 | B1 | 9/2013 | Ganesan |
| 8,527,417 | B2 | 9/2013 | Telle et al. |
| 8,527,773 | B1 | 9/2013 | Metzger |
| 8,528,078 | B2 | 9/2013 | Camaisa et al. |
| 8,533,118 | B2 | 9/2013 | Weller et al. |
| 8,533,791 | B2 | 9/2013 | Samuelsson et al. |
| 8,549,590 | B1 | 10/2013 | de Villiers Prichard et al. |
| 8,560,381 | B2 | 10/2013 | Green et al. |
| 8,572,391 | B2 | 10/2013 | Golan et al. |
| 8,578,496 | B1 | 11/2013 | Krishnappa |
| 8,588,748 | B2 | 11/2013 | Buhrman et al. |
| 8,600,886 | B2 | 12/2013 | Ramavarjula et al. |
| 8,601,602 | B1 | 12/2013 | Zheng |
| 8,606,234 | B2 | 12/2013 | Pei et al. |
| 8,606,694 | B2 | 12/2013 | Campbell et al. |
| 8,620,942 | B1 | 12/2013 | Hoffman et al. |
| 8,630,938 | B2 | 1/2014 | Cheng et al. |
| 8,645,275 | B2 | 2/2014 | Seifert et al. |
| 8,646,051 | B2 | 2/2014 | Paden et al. |
| 8,656,504 | B2 | 2/2014 | Lurey et al. |
| 8,671,115 | B2 | 3/2014 | Skurtovich, Jr. et al. |
| 8,688,543 | B2 | 4/2014 | Dominquez |
| 8,689,311 | B2 | 4/2014 | Blinn et al. |
| 8,695,105 | B2 | 4/2014 | Mahendrakar et al. |
| 8,700,515 | B2 | 4/2014 | Duckworth et al. |
| 8,701,199 | B1 | 4/2014 | Dotan et al. |
| 8,705,718 | B2 | 4/2014 | Baniak et al. |
| 8,706,599 | B1 | 4/2014 | Koenig et al. |
| 8,713,651 | B1 | 4/2014 | Stibel |
| 8,725,613 | B1 | 5/2014 | Celka et al. |
| 8,738,934 | B2 | 5/2014 | Lurey et al. |
| 8,744,956 | B1 | 6/2014 | DiChiara et al. |
| 8,751,388 | B1 | 6/2014 | Chapa |
| 8,762,287 | B2 | 6/2014 | Morley et al. |
| 8,768,914 | B2 | 7/2014 | Scriffignano et al. |
| 8,769,614 | B1 | 7/2014 | Knox et al. |
| 8,781,882 | B1 | 7/2014 | Arboletti et al. |
| 8,781,953 | B2 | 7/2014 | Kasower |
| 8,781,975 | B2 | 7/2014 | Bennett et al. |
| 8,782,154 | B2 | 7/2014 | Tomkow |
| 8,782,217 | B1 | 7/2014 | Arone et al. |
| 8,782,753 | B2 | 7/2014 | Lunt |
| 8,793,166 | B2 | 7/2014 | Mizhen |
| 8,793,509 | B1 | 7/2014 | Nelson et al. |
| 8,793,777 | B2 | 7/2014 | Colson |
| 8,800,005 | B2 | 8/2014 | Lunt |
| 8,806,584 | B2 | 8/2014 | Lunt |
| 8,818,888 | B1 | 8/2014 | Kapczynski et al. |
| 8,819,793 | B2 | 8/2014 | Gottschalk, Jr. |
| 8,826,371 | B2 | 9/2014 | Webb et al. |
| 8,826,393 | B2 | 9/2014 | Eisen |
| 8,831,564 | B2 | 9/2014 | Ferguson et al. |
| 8,839,394 | B2 | 9/2014 | Dennis et al. |
| 8,856,894 | B1 | 10/2014 | Dean et al. |
| 8,862,514 | B2 | 10/2014 | Eisen |
| 8,868,932 | B2 | 10/2014 | Lurey et al. |
| D717,332 | S | 11/2014 | Nies et al. |
| 8,931,058 | B2 | 1/2015 | DiChiara et al. |
| 8,938,399 | B1 | 1/2015 | Herman |
| 8,954,459 | B1 | 2/2015 | McMillan et al. |
| 8,972,400 | B1 | 3/2015 | Kapczynski et al. |
| 9,010,627 | B1 | 4/2015 | Prasad et al. |
| 9,043,886 | B2 | 5/2015 | Srinivasan et al. |
| 9,047,473 | B2 | 6/2015 | Samuelsson et al. |
| 9,100,400 | B2 | 8/2015 | Lunt |

(56) References Cited

U.S. PATENT DOCUMENTS 9,106,691 B1 8/2015 Burger et al.
9,124,606 B2 9/2015 Metzger
9,147,042 B1 9/2015 Haller et al.
9,147,117 B1 9/2015 Madhu et al.
9,154,482 B2 10/2015 Dudziak et al.
9,158,903 B2 10/2015 Metzger
9,185,123 B2 11/2015 Dennis et al.
9,195,984 B1 11/2015 Spector et al.
9,195,985 B2 11/2015 Domenica et al.
9,196,004 B2 11/2015 Eisen
9,203,819 B2 12/2015 Fenton et al.
9,215,223 B2 12/2015 Kirsch
9,235,728 B2 1/2016 Gottschalk, Jr. et al.
9,246,899 B1 1/2016 Durney et al.
9,256,624 B2 2/2016 Skurtovich, Jr. et al.
9,269,085 B2 2/2016 Webb et al.
9,294,476 B1 3/2016 Lurey et al.
9,344,413 B2 5/2016 Kirsch
9,361,597 B2 6/2016 Britton et al.
9,380,057 B2 6/2016 Knauss
9,390,384 B2 7/2016 Eisen
9,391,971 B2 7/2016 Lunt
9,412,141 B2 8/2016 Prichard et al.
9,420,448 B2 8/2016 Dankar et al.
9,462,044 B1 10/2016 Preibisch et al.
9,465,786 B2 10/2016 Lurey et al.
9,467,445 B2 10/2016 Egan et al.
9,491,160 B2 11/2016 Livesay et al.
9,578,014 B2 2/2017 Sondhi et al.
9,600,651 B1 3/2017 Ryan et al.
9,607,336 B1 3/2017 Dean et al.
9,626,680 B1 4/2017 Ryan et al.
9,633,322 B1 4/2017 Burger
9,641,521 B2 5/2017 Egan et al.
9,665,854 B1 5/2017 Burger et al.
9,684,905 B1 6/2017 Haller et al.
9,697,521 B2 7/2017 Webb et al.
9,706,402 B2 7/2017 Kueh
9,710,523 B2 7/2017 Skurtovich, Jr. et al.
9,721,147 B1 * 8/2017 Kapczynski ......... G06Q 50/265
9,734,501 B2 8/2017 Durney et al.
9,754,256 B2 9/2017 Britton et al.
9,754,311 B2 9/2017 Eisen
9,760,885 B1 9/2017 Ramalingam et al.
9,779,392 B1 10/2017 Prasad et al.
9,818,121 B2 11/2017 Snyder et al.
9,843,582 B2 12/2017 Mahendrakar et al.
9,876,796 B2 1/2018 Egan et al.
9,892,389 B2 2/2018 Domenica et al.
10,075,446 B2 9/2018 McMillan et al.
10,089,679 B2 10/2018 Eisen
10,097,551 B2 10/2018 Chan et al.
10,115,079 B1 10/2018 Burger et al.
10,169,761 B1 1/2019 Burger
10,200,277 B2 2/2019 Sreeramoju et al.
10,277,569 B1 4/2019 Barbour et al.
10,284,548 B2 5/2019 Williams et al.
10,356,079 B2 7/2019 Lurey et al.
10,373,240 B1 8/2019 Ross et al.
10,380,565 B1 8/2019 Prasad
10,395,053 B2 8/2019 Samid
10,438,308 B2 10/2019 Prichard et al.
10,453,159 B2 10/2019 Kapczynski
10,616,196 B1 4/2020 Khitrenovich et al.
10,637,646 B2 4/2020 Krishnamacharya et al.
10,652,227 B2 5/2020 Spektor et al.
10,664,936 B2 5/2020 Chapa et al.
10,685,336 B1 6/2020 Burger et al.
10,719,873 B1 7/2020 Dean et al.
10,740,762 B2 8/2020 Burger
10,742,541 B2 8/2020 Kim et al.
10,771,463 B2 9/2020 Berezin et al.
10,783,542 B2 9/2020 Walz et al.
10,798,093 B2 10/2020 Kaliski, Jr. et al.
10,798,096 B2 10/2020 Touati et al.
10,863,359 B2 12/2020 Talwar
10,891,618 B2 1/2021 Kinch et al.
10,911,234 B2 2/2021 Jain et al.
10,999,298 B2 5/2021 Eisen
11,012,240 B1 5/2021 Kirsch
11,074,641 B1 7/2021 Ross et al.
11,095,643 B2 8/2021 Huffman et al.
11,115,224 B1 9/2021 Scofield et al.
11,120,519 B2 9/2021 Kapczynski
11,128,464 B1 9/2021 Loladia
11,146,676 B2 10/2021 Sena, Jr. et al.
11,157,872 B2 10/2021 McMillan et al.
11,164,178 B2 11/2021 Anderson et al.
11,164,271 B2 11/2021 Chapa et al.
11,178,128 B2 11/2021 Poschel et al.
11,206,246 B2 12/2021 Krishnamacharya
11,232,413 B1 1/2022 Burger et al.
11,277,439 B2 3/2022 Knopf
11,288,677 B1 3/2022 Burger
11,290,255 B2 3/2022 Krishnamacharya et al.
11,310,227 B2 4/2022 Hamburg et al.
11,356,460 B2 6/2022 Bondugula et al.
11,361,317 B2 6/2022 Billman et al.
11,363,015 B2 6/2022 Yeddula et al.
11,431,729 B2 8/2022 Bloomquist et al.
11,449,630 B2 9/2022 Talwar
11,470,069 B2 10/2022 Gillespie
11,526,884 B2 12/2022 Chilaka et al.
11,532,030 B1 12/2022 Smith
11,544,363 B2 1/2023 Deore et al.
11,551,226 B2 1/2023 Kumar
11,587,150 B1 2/2023 Ross et al.
11,588,639 B2 2/2023 Jain et al.
11,651,095 B2 5/2023 Gupta et al.
11,762,975 B2 9/2023 Allen
11,765,145 B2 9/2023 Krishnamacharya
11,769,112 B2 9/2023 McMillan et al.
11,775,979 B1 10/2023 Burger
11,784,791 B2 10/2023 Krishnamacharya et al.
11,790,473 B2 10/2023 Chapa et al.
11,803,929 B1 10/2023 Kapczynski
11,818,272 B2 11/2023 Kirsch
11,876,807 B2 1/2024 Bondugula et al.
11,941,065 B1 3/2024 Li et al.
11,954,655 B1 4/2024 Burger et al.
12,003,540 B1 6/2024 Sharifi Mehr
2001/0029482 A1 10/2001 Tealdi et al.
2001/0039532 A1 11/2001 Coleman, Jr. et al.
2001/0042785 A1 11/2001 Walker et al.
2001/0044729 A1 11/2001 Pomerance
2001/0044756 A1 11/2001 Watkins et al.
2001/0049274 A1 12/2001 Degraeve
2002/0002538 A1 1/2002 Ling
2002/0004736 A1 1/2002 Roundtree et al.
2002/0013827 A1 1/2002 Edstrom et al.
2002/0013899 A1 1/2002 Faul
2002/0026519 A1 2/2002 Itabashi et al.
2002/0026575 A1 2/2002 Wheeler et al.
2002/0032635 A1 3/2002 Harris et al.
2002/0033846 A1 3/2002 Balasubramanian et al.
2002/0045154 A1 4/2002 Wood et al.
2002/0052754 A1 5/2002 Joyce et al.
2002/0059201 A1 5/2002 Work
2002/0059521 A1 5/2002 Tasler
2002/0069122 A1 6/2002 Yun et al.
2002/0077964 A1 6/2002 Brody et al.
2002/0087460 A1 7/2002 Hornung
2002/0091544 A1 7/2002 Middeljans et al.
2002/0091635 A1 7/2002 Dilip et al.
2002/0099635 A1 7/2002 Guiragosian
2002/0103933 A1 8/2002 Garon et al.
2002/0111816 A1 8/2002 Lortscher et al.
2002/0116247 A1 8/2002 Tucker et al.
2002/0120537 A1 8/2002 Morea et al.
2002/0120757 A1 8/2002 Sutherland et al.
2002/0120846 A1 8/2002 Stewart et al.
2002/0128962 A1 9/2002 Kasower
2002/0133365 A1 9/2002 Grey et al.
2002/0133462 A1 9/2002 Shteyn

(56) References Cited

U.S. PATENT DOCUMENTS

| | | | |
|---|---|---|---|
| 2002/0138470 | A1 | 9/2002 | Zhou |
| 2002/0143943 | A1 | 10/2002 | Lee et al. |
| 2002/0147801 | A1 | 10/2002 | Gullotta et al. |
| 2002/0157029 | A1 | 10/2002 | French et al. |
| 2002/0164004 | A1 | 11/2002 | Tamura et al. |
| 2002/0169747 | A1 | 11/2002 | Chapman et al. |
| 2002/0173994 | A1 | 11/2002 | Ferguson, III |
| 2002/0174048 | A1 | 11/2002 | Dheer et al. |
| 2002/0184509 | A1 | 12/2002 | Scheidt et al. |
| 2002/0198800 | A1 | 12/2002 | Shamrakov |
| 2002/0198806 | A1 | 12/2002 | Blagg et al. |
| 2002/0198824 | A1 | 12/2002 | Cook |
| 2002/0198830 | A1 | 12/2002 | Randell et al. |
| 2003/0002671 | A1 | 1/2003 | Inchalik et al. |
| 2003/0009418 | A1 | 1/2003 | Green et al. |
| 2003/0009426 | A1 | 1/2003 | Ruiz-Sanchez |
| 2003/0023531 | A1 | 1/2003 | Fergusson |
| 2003/0036995 | A1 | 2/2003 | Lazerson |
| 2003/0041031 | A1 | 2/2003 | Hedy |
| 2003/0046311 | A1 | 3/2003 | Baidya et al. |
| 2003/0046554 | A1 | 3/2003 | Leydier et al. |
| 2003/0048904 | A1 | 3/2003 | Wang et al. |
| 2003/0061163 | A1 | 3/2003 | Durfield |
| 2003/0069839 | A1 | 4/2003 | Whittington et al. |
| 2003/0069943 | A1 | 4/2003 | Bahrs et al. |
| 2003/0097342 | A1 | 5/2003 | Whittingtom |
| 2003/0097380 | A1 | 5/2003 | Mulhern et al. |
| 2003/0097573 | A1 | 5/2003 | Wheeler et al. |
| 2003/0105710 | A1 | 6/2003 | Barbara et al. |
| 2003/0105733 | A1 | 6/2003 | Boreham |
| 2003/0105742 | A1 | 6/2003 | Boreham et al. |
| 2003/0115133 | A1 | 6/2003 | Bian |
| 2003/0115151 | A1 | 6/2003 | Wheeler et al. |
| 2003/0131102 | A1 | 7/2003 | Umbreit |
| 2003/0154162 | A1 | 8/2003 | Danaher et al. |
| 2003/0158960 | A1 | 8/2003 | Engberg |
| 2003/0163513 | A1 | 8/2003 | Schaeck et al. |
| 2003/0163733 | A1 | 8/2003 | Barriga-Caceres et al. |
| 2003/0171942 | A1 | 9/2003 | Gaito |
| 2003/0177028 | A1 | 9/2003 | Cooper et al. |
| 2003/0182214 | A1 | 9/2003 | Taylor |
| 2003/0187837 | A1 | 10/2003 | Culliss |
| 2003/0188193 | A1 | 10/2003 | Venkataramappa |
| 2003/0195859 | A1 | 10/2003 | Lawrence |
| 2003/0200447 | A1 | 10/2003 | Sjoblom |
| 2003/0204429 | A1 | 10/2003 | Botscheck et al. |
| 2003/0204752 | A1 | 10/2003 | Garrison |
| 2003/0208412 | A1 | 11/2003 | Hillestad et al. |
| 2003/0217094 | A1 | 11/2003 | Andrews et al. |
| 2003/0220858 | A1 | 11/2003 | Lam et al. |
| 2004/0002878 | A1 | 1/2004 | Hinton |
| 2004/0006488 | A1 | 1/2004 | Fitall et al. |
| 2004/0010458 | A1 | 1/2004 | Friedman |
| 2004/0010698 | A1 | 1/2004 | Rolfe |
| 2004/0015714 | A1 | 1/2004 | Abraham et al. |
| 2004/0015715 | A1 | 1/2004 | Brown |
| 2004/0019518 | A1 | 1/2004 | Abraham et al. |
| 2004/0019549 | A1 | 1/2004 | Gulbrandsen |
| 2004/0019799 | A1 | 1/2004 | Vering et al. |
| 2004/0024671 | A1 | 2/2004 | Freund |
| 2004/0024709 | A1 | 2/2004 | Yu et al. |
| 2004/0029601 | A1 | 2/2004 | O'Neill et al. |
| 2004/0030649 | A1 | 2/2004 | Nelson et al. |
| 2004/0039586 | A1 | 2/2004 | Garvey et al. |
| 2004/0044628 | A1 | 3/2004 | Mathew et al. |
| 2004/0044673 | A1 | 3/2004 | Brady et al. |
| 2004/0044739 | A1 | 3/2004 | Ziegler |
| 2004/0078324 | A1 | 4/2004 | Lonnberg et al. |
| 2004/0083159 | A1 | 4/2004 | Crosby et al. |
| 2004/0088237 | A1 | 5/2004 | Moenickheim et al. |
| 2004/0088255 | A1 | 5/2004 | Zielke et al. |
| 2004/0107250 | A1 | 6/2004 | Marciano |
| 2004/0110119 | A1 | 6/2004 | Riconda et al. |
| 2004/0111359 | A1 | 6/2004 | Hudock |
| 2004/0111375 | A1 | 6/2004 | Johnson |
| 2004/0117302 | A1 | 6/2004 | Weichert et al. |
| 2004/0122681 | A1 | 6/2004 | Ruvolo et al. |
| 2004/0122696 | A1 | 6/2004 | Beringer |
| 2004/0122720 | A1 | 6/2004 | Mikalsen et al. |
| 2004/0128150 | A1 | 7/2004 | Lundegren |
| 2004/0128156 | A1 | 7/2004 | Beringer et al. |
| 2004/0133440 | A1 | 7/2004 | Carolan et al. |
| 2004/0133441 | A1 | 7/2004 | Brady et al. |
| 2004/0133509 | A1 | 7/2004 | McCoy et al. |
| 2004/0133513 | A1 | 7/2004 | McCoy et al. |
| 2004/0133515 | A1 | 7/2004 | McCoy et al. |
| 2004/0138994 | A1 | 7/2004 | DeFrancesco et al. |
| 2004/0139009 | A1 | 7/2004 | Kozee et al. |
| 2004/0139010 | A1 | 7/2004 | McMichael et al. |
| 2004/0139011 | A1 | 7/2004 | Kozee et al. |
| 2004/0141005 | A1 | 7/2004 | Banatwala et al. |
| 2004/0143546 | A1 | 7/2004 | Wood et al. |
| 2004/0143596 | A1 | 7/2004 | Sirkin |
| 2004/0153521 | A1 | 8/2004 | Kogo |
| 2004/0158523 | A1 | 8/2004 | Dort |
| 2004/0158723 | A1 | 8/2004 | Root |
| 2004/0159700 | A1 | 8/2004 | Khan et al. |
| 2004/0167793 | A1 | 8/2004 | Masuoka et al. |
| 2004/0167834 | A1 | 8/2004 | Koskinen et al. |
| 2004/0193891 | A1 | 9/2004 | Ollila |
| 2004/0199789 | A1 | 10/2004 | Shaw et al. |
| 2004/0210661 | A1 | 10/2004 | Thompson |
| 2004/0220865 | A1 | 11/2004 | Lozowski et al. |
| 2004/0220918 | A1 | 11/2004 | Scriffignano et al. |
| 2004/0225643 | A1 | 11/2004 | Alpha et al. |
| 2004/0230527 | A1 | 11/2004 | Hansen et al. |
| 2004/0243514 | A1 | 12/2004 | Wankmueller |
| 2004/0243518 | A1 | 12/2004 | Clifton et al. |
| 2004/0243588 | A1 | 12/2004 | Tanner et al. |
| 2004/0243832 | A1 | 12/2004 | Wilf et al. |
| 2004/0249789 | A1 | 12/2004 | Kapoor et al. |
| 2004/0249811 | A1 | 12/2004 | Shostack |
| 2004/0250085 | A1 | 12/2004 | Tattan et al. |
| 2004/0250107 | A1 | 12/2004 | Guo |
| 2004/0254935 | A1 | 12/2004 | Chagoly et al. |
| 2004/0255127 | A1 | 12/2004 | Arnouse |
| 2004/0267714 | A1 | 12/2004 | Frid et al. |
| 2005/0005168 | A1 | 1/2005 | Dick |
| 2005/0010513 | A1 | 1/2005 | Duckworth et al. |
| 2005/0021476 | A1 | 1/2005 | Candella et al. |
| 2005/0021551 | A1 | 1/2005 | Silva et al. |
| 2005/0027983 | A1 | 2/2005 | Klawon |
| 2005/0027995 | A1 | 2/2005 | Menschik et al. |
| 2005/0055231 | A1 | 3/2005 | Lee |
| 2005/0058262 | A1 | 3/2005 | Timmins et al. |
| 2005/0060332 | A1 | 3/2005 | Bernstein et al. |
| 2005/0071328 | A1 | 3/2005 | Lawrence |
| 2005/0075985 | A1 | 4/2005 | Cartmell |
| 2005/0086126 | A1 | 4/2005 | Patterson |
| 2005/0086297 | A1 | 4/2005 | Hinks |
| 2005/0091164 | A1 | 4/2005 | Varble |
| 2005/0097017 | A1 | 5/2005 | Hanratty |
| 2005/0097039 | A1 | 5/2005 | Kulcsar et al. |
| 2005/0097320 | A1 | 5/2005 | Golan et al. |
| 2005/0102180 | A1 | 5/2005 | Gailey et al. |
| 2005/0105719 | A1 | 5/2005 | Huda |
| 2005/0108396 | A1 | 5/2005 | Bittner |
| 2005/0108631 | A1 | 5/2005 | Amorin et al. |
| 2005/0114335 | A1 | 5/2005 | Wesinger, Jr. et al. |
| 2005/0114344 | A1 | 5/2005 | Wesinger, Jr. et al. |
| 2005/0114345 | A1 | 5/2005 | Wesinger, Jr. et al. |
| 2005/0117535 | A1 | 6/2005 | Mahonen |
| 2005/0119978 | A1 | 6/2005 | Ates |
| 2005/0125291 | A1 | 6/2005 | Demkiw Grayson et al. |
| 2005/0125397 | A1 | 6/2005 | Gross et al. |
| 2005/0125686 | A1 | 6/2005 | Brandt |
| 2005/0137899 | A1 | 6/2005 | Davies et al. |
| 2005/0138391 | A1 | 6/2005 | Mandalia et al. |
| 2005/0138553 | A1 | 6/2005 | Ballard et al. |
| 2005/0138648 | A1 | 6/2005 | Ahmed et al. |
| 2005/0144133 | A1 | 6/2005 | Hoffman et al. |
| 2005/0144452 | A1 | 6/2005 | Lynch et al. |
| 2005/0154664 | A1 | 7/2005 | Guy et al. |
| 2005/0154665 | A1 | 7/2005 | Kerr |

(56) References Cited

U.S. PATENT DOCUMENTS

2005/0154769 A1 7/2005 Eckart et al.
2005/0166262 A1 7/2005 Beattie et al.
2005/0171884 A1 8/2005 Arnott
2005/0181765 A1 8/2005 Mark
2005/0208461 A1 9/2005 Krebs et al.
2005/0216434 A1 9/2005 Haveliwala et al.
2005/0216582 A1 9/2005 Toomey et al.
2005/0216953 A1 9/2005 Ellingson
2005/0216955 A1 9/2005 Wilkins et al.
2005/0226224 A1 10/2005 Lee et al.
2005/0240578 A1 10/2005 Biederman et al.
2005/0256809 A1 11/2005 Sadri
2005/0267840 A1 12/2005 Holm-Blagg et al.
2005/0273431 A1 12/2005 Abel et al.
2005/0273442 A1 12/2005 Bennett et al.
2005/0288998 A1 12/2005 Verma et al.
2006/0004623 A1 1/2006 Jasti
2006/0004626 A1 1/2006 Holmen et al.
2006/0010072 A1 1/2006 Eisen
2006/0010391 A1 1/2006 Uemura et al.
2006/0010487 A1 1/2006 Fierer et al.
2006/0016107 A1 1/2006 Davis
2006/0032909 A1 2/2006 Seegar
2006/0036543 A1 2/2006 Blagg et al.
2006/0036748 A1 2/2006 Nusbaum et al.
2006/0036870 A1 2/2006 Dasari et al.
2006/0041464 A1 2/2006 Powers et al.
2006/0041670 A1 2/2006 Musseleck et al.
2006/0059110 A1 3/2006 Madhok et al.
2006/0059362 A1 3/2006 Paden et al.
2006/0069635 A1 3/2006 Ram et al.
2006/0074986 A1 4/2006 Mallalieu et al.
2006/0074991 A1 4/2006 Lussier et al.
2006/0079211 A1 4/2006 Degraeve
2006/0080230 A1 4/2006 Freiberg
2006/0080251 A1 4/2006 Fried et al.
2006/0080263 A1 4/2006 Willis et al.
2006/0085361 A1 4/2006 Hoerle et al.
2006/0101508 A1 5/2006 Taylor
2006/0129419 A1 6/2006 Flaxer et al.
2006/0129481 A1 6/2006 Bhatt et al.
2006/0129533 A1 6/2006 Purvis
2006/0131390 A1 6/2006 Kim
2006/0136595 A1 6/2006 Satyavolu
2006/0140460 A1 6/2006 Coutts
2006/0155573 A1 7/2006 Hartunian
2006/0155780 A1 7/2006 Sakairi et al.
2006/0161435 A1 7/2006 Atef et al.
2006/0161554 A1 7/2006 Lucovsky et al.
2006/0173776 A1 8/2006 Shalley et al.
2006/0173792 A1 8/2006 Glass
2006/0178971 A1 8/2006 Owen et al.
2006/0179050 A1 8/2006 Giang et al.
2006/0184585 A1 8/2006 Grear et al.
2006/0195351 A1 8/2006 Bayburtian
2006/0204051 A1 9/2006 Holland, IV
2006/0212407 A1 9/2006 Lyon
2006/0218407 A1 9/2006 Toms
2006/0229943 A1 10/2006 Mathias et al.
2006/0229961 A1 10/2006 Lyftogt et al.
2006/0235935 A1 10/2006 Ng
2006/0239512 A1 10/2006 Petrillo
2006/0253294 A1 11/2006 Martti et al.
2006/0253358 A1 11/2006 Delgrosso et al.
2006/0256729 A1 11/2006 Chen et al.
2006/0262929 A1 11/2006 Vatanen et al.
2006/0265243 A1 11/2006 Racho et al.
2006/0271456 A1 11/2006 Romain et al.
2006/0271457 A1 11/2006 Romain et al.
2006/0271633 A1 11/2006 Adler
2006/0277089 A1 12/2006 Hubbard et al.
2006/0282429 A1 12/2006 Hernandez-Sherrington et al.
2006/0282660 A1 12/2006 Varghese et al.
2006/0282819 A1 12/2006 Graham et al.
2006/0287764 A1 12/2006 Kraft
2006/0287765 A1 12/2006 Kraft
2006/0287766 A1 12/2006 Kraft
2006/0287767 A1 12/2006 Kraft
2006/0288090 A1 12/2006 Kraft
2006/0294199 A1 12/2006 Bertholf
2007/0005508 A1 1/2007 Chiang
2007/0005984 A1 1/2007 Florencio et al.
2007/0022141 A1 1/2007 Singleton et al.
2007/0027816 A1 2/2007 Writer
2007/0032240 A1 2/2007 Finnegan et al.
2007/0038568 A1 2/2007 Greene et al.
2007/0043577 A1 2/2007 Kasower
2007/0047714 A1 3/2007 Baniak et al.
2007/0055672 A1 3/2007 Stevens
2007/0055785 A1 3/2007 Stevens
2007/0060367 A1 3/2007 Heler
2007/0067297 A1 3/2007 Kublickis
2007/0072190 A1 3/2007 Aggarwal
2007/0073889 A1 3/2007 Morris
2007/0078908 A1 4/2007 Rohatgi et al.
2007/0078985 A1 4/2007 Shao et al.
2007/0083460 A1 4/2007 Bachenheimer
2007/0083463 A1 4/2007 Kraft
2007/0093234 A1 4/2007 Willis et al.
2007/0094142 A1 4/2007 Russell et al.
2007/0094230 A1 4/2007 Subramaniam et al.
2007/0094241 A1 4/2007 M. Blackwell et al.
2007/0106904 A1 4/2007 Russell et al.
2007/0106517 A1 5/2007 Cluff et al.
2007/0112667 A1 5/2007 Rucker
2007/0112668 A1 5/2007 Celano et al.
2007/0121843 A1 5/2007 Atazky et al.
2007/0124256 A1 5/2007 Crooks et al.
2007/0143825 A1 6/2007 Goffin
2007/0156692 A1 7/2007 Rosewarne
2007/0156758 A1 7/2007 Adiga
2007/0162307 A1 7/2007 Austin et al.
2007/0174186 A1 7/2007 Hokland
2007/0174448 A1 7/2007 Ahuja et al.
2007/0174903 A1 7/2007 Greff
2007/0192121 A1 8/2007 Routson et al.
2007/0192853 A1 8/2007 Shraim et al.
2007/0198432 A1 8/2007 Pitroda et al.
2007/0198433 A1 8/2007 McGee et al.
2007/0204338 A1 8/2007 Aiello et al.
2007/0205266 A1 9/2007 Carr et al.
2007/0206515 A1 9/2007 Andreasen et al.
2007/0220604 A1 9/2007 Long
2007/0226122 A1 9/2007 Burrell et al.
2007/0240206 A1 10/2007 Wu et al.
2007/0244807 A1 10/2007 Andringa et al.
2007/0245245 A1 10/2007 Blue et al.
2007/0250441 A1 10/2007 Paulsen et al.
2007/0250459 A1 10/2007 Schwarz et al.
2007/0261108 A1 11/2007 Lee et al.
2007/0261114 A1 11/2007 Pomerantsev
2007/0266439 A1 11/2007 Kraft
2007/0282743 A1 12/2007 Lovelett
2007/0282959 A1 12/2007 Stern
2007/0288355 A1 12/2007 Roland et al.
2007/0288360 A1 12/2007 Seeklus
2007/0294195 A1 12/2007 Curry et al.
2008/0010203 A1 1/2008 Grant
2008/0010206 A1 1/2008 Coleman
2008/0010687 A1 1/2008 Gonen et al.
2008/0025208 A1 1/2008 Chan
2008/0028446 A1 1/2008 Burgoyne
2008/0033742 A1 2/2008 Bernasconi
2008/0033956 A1 2/2008 Saha et al.
2008/0040610 A1 2/2008 Fergusson
2008/0040717 A1 2/2008 Hobson
2008/0047017 A1 2/2008 Renaud
2008/0052182 A1 2/2008 Marshall
2008/0052244 A1 2/2008 Tsuei et al.
2008/0059364 A1 3/2008 Tidwell et al.
2008/0066188 A1 3/2008 Kwak
2008/0071682 A1 3/2008 Dominguez
2008/0072316 A1 3/2008 Chang et al.
2008/0077526 A1 3/2008 Arumugam

(56) References Cited

U.S. PATENT DOCUMENTS

2008/0082536 A1 4/2008 Schwabe et al.
2008/0083021 A1 4/2008 Doane et al.
2008/0086431 A1 4/2008 Robinson et al.
2008/0091530 A1 4/2008 Egnatios et al.
2008/0103800 A1 5/2008 Domenikos et al.
2008/0103972 A1 5/2008 Lanc
2008/0104672 A1 5/2008 Lunde et al.
2008/0104674 A1 5/2008 Sherkin et al.
2008/0109422 A1 5/2008 Dedhia
2008/0109875 A1 5/2008 Kraft
2008/0114670 A1 5/2008 Friesen
2008/0115191 A1 5/2008 Kim et al.
2008/0115226 A1 5/2008 Welingkar et al.
2008/0120196 A1 5/2008 Reed et al.
2008/0120400 A1 5/2008 Keller et al.
2008/0120569 A1 5/2008 Mann et al.
2008/0120617 A1 5/2008 Keller et al.
2008/0120716 A1 5/2008 Hall et al.
2008/0126233 A1 5/2008 Hogan
2008/0141346 A1 6/2008 Kay et al.
2008/0148368 A1 6/2008 Zurko et al.
2008/0154758 A1 6/2008 Schattmaier et al.
2008/0155686 A1 6/2008 McNair
2008/0162317 A1 7/2008 Banaugh et al.
2008/0162350 A1 7/2008 Allen-Rouman et al.
2008/0162383 A1 7/2008 Kraft
2008/0175360 A1 7/2008 Schwarz et al.
2008/0183480 A1 7/2008 Carlson et al.
2008/0183585 A1 7/2008 Vianello
2008/0195548 A1 8/2008 Chu et al.
2008/0201401 A1 8/2008 Pugh et al.
2008/0205655 A1 8/2008 Wilkins et al.
2008/0208726 A1 8/2008 Tsantes et al.
2008/0208735 A1 8/2008 Balet et al.
2008/0208752 A1 8/2008 Gottlieb et al.
2008/0208873 A1 8/2008 Boehmer
2008/0212845 A1 9/2008 Lund
2008/0215427 A1 9/2008 Kawada et al.
2008/0216156 A1 9/2008 Kosaka
2008/0222706 A1 9/2008 Renaud et al.
2008/0222722 A1 9/2008 Navratil et al.
2008/0229415 A1 9/2008 Kapoor et al.
2008/0249869 A1 10/2008 Angell et al.
2008/0255992 A1 10/2008 Lin
2008/0256613 A1 10/2008 Grover
2008/0263058 A1 10/2008 Peden
2008/0270295 A1 10/2008 Lent et al.
2008/0270299 A1 10/2008 Peng
2008/0281621 A1 11/2008 Shan et al.
2008/0281737 A1 11/2008 Fajardo
2008/0288283 A1 11/2008 Baldwin, Jr. et al.
2008/0288299 A1 11/2008 Schultz
2008/0288405 A1 11/2008 John
2008/0301016 A1 12/2008 Durvasula et al.
2008/0306750 A1 12/2008 Wunder et al.
2008/0314977 A1 12/2008 Domenica et al.
2008/0319889 A1 12/2008 Hammad
2009/0006230 A1 1/2009 Lyda et al.
2009/0018986 A1 1/2009 Alcorn et al.
2009/0031426 A1 1/2009 Dal Lago et al.
2009/0037332 A1 2/2009 Cheung et al.
2009/0043691 A1 2/2009 Kasower
2009/0055298 A1 2/2009 Foll
2009/0055322 A1 2/2009 Bykov et al.
2009/0055894 A1 2/2009 Lorsch
2009/0064297 A1 3/2009 Selgas et al.
2009/0089128 A1 4/2009 Tkatch et al.
2009/0094237 A1 4/2009 Churi et al.
2009/0094674 A1 4/2009 Schwartz et al.
2009/0100047 A1 4/2009 Jones et al.
2009/0106141 A1 4/2009 Becker
2009/0106150 A1 4/2009 Pelegero et al.
2009/0106846 A1 4/2009 Dupray et al.
2009/0119299 A1 5/2009 Rhodes
2009/0125369 A1 5/2009 Kloostra et al.
2009/0125972 A1 5/2009 Hinton et al.
2009/0132347 A1 5/2009 Anderson et al.
2009/0138335 A1 5/2009 Lieberman
2009/0138895 A1 5/2009 Dumas et al.
2009/0144166 A1 6/2009 Dickelman
2009/0150166 A1 6/2009 Leite et al.
2009/0150238 A1 6/2009 Marsh et al.
2009/0157564 A1 6/2009 Cross
2009/0157693 A1 6/2009 Palahnuk
2009/0158030 A1 6/2009 Rasti
2009/0164232 A1 6/2009 Chmielewski et al.
2009/0164380 A1 6/2009 Brown
2009/0169019 A1 7/2009 Bauchot et al.
2009/0172788 A1 7/2009 Veldula et al.
2009/0172795 A1 7/2009 Ritari et al.
2009/0177529 A1 7/2009 Hadi
2009/0177562 A1 7/2009 Peace et al.
2009/0183259 A1 7/2009 Rinek et al.
2009/0199264 A1 8/2009 Lang
2009/0199294 A1 8/2009 Schneider
2009/0204514 A1 8/2009 Bhogal et al.
2009/0204599 A1 8/2009 Morris et al.
2009/0210241 A1 8/2009 Calloway
2009/0210347 A1 8/2009 Sarcanin
2009/0210807 A1 8/2009 Xiao et al.
2009/0215431 A1 8/2009 Koraichi
2009/0216640 A1 8/2009 Masi
2009/0222449 A1 9/2009 Hom et al.
2009/0228918 A1 9/2009 Rolff et al.
2009/0234665 A1 9/2009 Conkel
2009/0234775 A1 9/2009 Whitney et al.
2009/0234876 A1 9/2009 Schigel et al.
2009/0240624 A1 9/2009 James et al.
2009/0247122 A1 10/2009 Fitzgerald et al.
2009/0252134 A1 10/2009 Schlicht et al.
2009/0254375 A1 10/2009 Martinez et al.
2009/0254476 A1 10/2009 Sharma et al.
2009/0254572 A1 10/2009 Redlich et al.
2009/0254656 A1 10/2009 Vignisson et al.
2009/0254971 A1 10/2009 Herz et al.
2009/0260064 A1 10/2009 Mcdowell et al.
2009/0271847 A1 10/2009 Karjala et al.
2009/0276269 A1 11/2009 Yee et al.
2009/0307778 A1 12/2009 Mardikar
2009/0313134 A1 12/2009 Faith et al.
2009/0313562 A1 12/2009 Appleyard et al.
2009/0319638 A1 12/2009 Faith et al.
2009/0327270 A1 12/2009 Teevan et al.
2009/0328173 A1 12/2009 Jakobson et al.
2010/0011428 A1 1/2010 Atwood et al.
2010/0030578 A1 2/2010 Siddique et al.
2010/0030677 A1 2/2010 Melik-Aslanian et al.
2010/0042542 A1 2/2010 Rose et al.
2010/0043055 A1 2/2010 Baumgart
2010/0049803 A1 2/2010 Ogilvie et al.
2010/0057560 A1 3/2010 Skudlark et al.
2010/0058404 A1 3/2010 Rouse
2010/0063942 A1 3/2010 Arnott et al.
2010/0063993 A1 3/2010 Higgins et al.
2010/0076836 A1 3/2010 Giordano et al.
2010/0077351 A1 3/2010 Kaulgud et al.
2010/0077483 A1 3/2010 Stolfo et al.
2010/0083371 A1 4/2010 Bennetts et al.
2010/0088233 A1 4/2010 Tattan et al.
2010/0094768 A1 4/2010 Miltonberger
2010/0094910 A1 4/2010 Bayliss
2010/0100945 A1 4/2010 Ozzie et al.
2010/0114744 A1 5/2010 Gonen
2010/0114776 A1 5/2010 Weller et al.
2010/0121767 A1 5/2010 Coulter et al.
2010/0122305 A1 5/2010 Moloney
2010/0122324 A1 5/2010 Welingkar et al.
2010/0122333 A1 5/2010 Noe et al.
2010/0130172 A1 5/2010 Vendrow et al.
2010/0136956 A1 6/2010 Drachev et al.
2010/0138298 A1 6/2010 Fitzherald et al.
2010/0145836 A1 6/2010 Baker et al.
2010/0153278 A1 6/2010 Farsedakis
2010/0153290 A1 6/2010 Duggan

(56) References Cited

U.S. PATENT DOCUMENTS

| | | | |
|---|---|---|---|
| 2010/0161816 | A1 | 6/2010 | Kraft et al. |
| 2010/0169159 | A1 | 7/2010 | Rose et al. |
| 2010/0174638 | A1 | 7/2010 | Debie et al. |
| 2010/0174813 | A1 | 7/2010 | Hildreth et al. |
| 2010/0175119 | A1 | 7/2010 | Vitaletti |
| 2010/0179906 | A1 | 7/2010 | Hawkes |
| 2010/0185546 | A1 | 7/2010 | Pollard |
| 2010/0205076 | A1 | 8/2010 | Parson et al. |
| 2010/0205662 | A1 | 8/2010 | Ibrahim et al. |
| 2010/0211445 | A1 | 8/2010 | Bodington |
| 2010/0211636 | A1 | 8/2010 | Starkenburg et al. |
| 2010/0212004 | A1 | 8/2010 | Fu |
| 2010/0217837 | A1 | 8/2010 | Ansari et al. |
| 2010/0217969 | A1 | 8/2010 | Tomkow |
| 2010/0223192 | A1 | 9/2010 | Levine et al. |
| 2010/0229245 | A1 | 9/2010 | Singhal |
| 2010/0241493 | A1 | 9/2010 | Onischuk |
| 2010/0241535 | A1 | 9/2010 | Nightengale et al. |
| 2010/0250338 | A1 | 9/2010 | Banerjee et al. |
| 2010/0250410 | A1 | 9/2010 | Song et al. |
| 2010/0250411 | A1 | 9/2010 | Ogrodski |
| 2010/0250955 | A1 | 9/2010 | Trevithick et al. |
| 2010/0257102 | A1 | 10/2010 | Perlman |
| 2010/0258623 | A1 | 10/2010 | Beemer et al. |
| 2010/0262932 | A1 | 10/2010 | Pan |
| 2010/0280914 | A1 | 11/2010 | Carlson |
| 2010/0281020 | A1 | 11/2010 | Drubner |
| 2010/0287541 | A1 | 11/2010 | Saunders et al. |
| 2010/0293049 | A1 | 11/2010 | Maher et al. |
| 2010/0293050 | A1 | 11/2010 | Maher et al. |
| 2010/0293058 | A1 | 11/2010 | Maher et al. |
| 2010/0293090 | A1 | 11/2010 | Domenikos et al. |
| 2010/0299262 | A1 | 11/2010 | Handler |
| 2010/0325442 | A1 | 12/2010 | Petrone et al. |
| 2010/0325694 | A1 | 12/2010 | Bhagavatula et al. |
| 2010/0332393 | A1 | 12/2010 | Weller et al. |
| 2011/0004498 | A1 | 1/2011 | Readshaw |
| 2011/0016533 | A1 | 1/2011 | Zeigler et al. |
| 2011/0023115 | A1 | 1/2011 | Wright |
| 2011/0029388 | A1 | 2/2011 | Kendall et al. |
| 2011/0035788 | A1 | 2/2011 | White et al. |
| 2011/0040736 | A1 | 2/2011 | Kalaboukis |
| 2011/0071950 | A1 | 3/2011 | Ivanovic |
| 2011/0082768 | A1 | 4/2011 | Eisen |
| 2011/0083181 | A1 | 4/2011 | Nazarov |
| 2011/0113084 | A1 | 5/2011 | Ramnani |
| 2011/0119155 | A1 | 5/2011 | Hammad et al. |
| 2011/0126024 | A1 | 5/2011 | Beatson et al. |
| 2011/0126275 | A1 | 5/2011 | Anderson et al. |
| 2011/0131096 | A1 | 6/2011 | Frew et al. |
| 2011/0131123 | A1 | 6/2011 | Griffin et al. |
| 2011/0137760 | A1 | 6/2011 | Rudie et al. |
| 2011/0142213 | A1 | 6/2011 | Baniak et al. |
| 2011/0145899 | A1 | 6/2011 | Cao et al. |
| 2011/0148625 | A1 | 6/2011 | Velusamy |
| 2011/0161218 | A1 | 6/2011 | Swift |
| 2011/0166988 | A1 | 7/2011 | Coulter |
| 2011/0167011 | A1 | 7/2011 | Paltenghe et al. |
| 2011/0173681 | A1 | 7/2011 | Qureshi et al. |
| 2011/0179139 | A1 | 7/2011 | Starkenburg et al. |
| 2011/0184780 | A1 | 7/2011 | Alderson et al. |
| 2011/0184838 | A1 | 7/2011 | Winters et al. |
| 2011/0188387 | A1 | 8/2011 | Das et al. |
| 2011/0196791 | A1 | 8/2011 | Dominguez |
| 2011/0208601 | A1 | 8/2011 | Ferguson et al. |
| 2011/0211445 | A1 | 9/2011 | Chen |
| 2011/0260832 | A1 | 10/2011 | Ross et al. |
| 2011/0264566 | A1 | 10/2011 | Brown |
| 2011/0270754 | A1 | 11/2011 | Kelly et al. |
| 2011/0289094 | A1 | 11/2011 | Fisher |
| 2011/0307397 | A1 | 12/2011 | Benmbarek |
| 2011/0307957 | A1 | 12/2011 | Barcelo et al. |
| 2012/0011158 | A1 | 1/2012 | Avner et al. |
| 2012/0016948 | A1 | 1/2012 | Sinha |
| 2012/0018506 | A1 | 1/2012 | Hammad et al. |
| 2012/0030216 | A1 | 2/2012 | Churi et al. |
| 2012/0030771 | A1 | 2/2012 | Pierson et al. |
| 2012/0047219 | A1 | 2/2012 | Feng et al. |
| 2012/0047423 | A1 | 2/2012 | Tomkow |
| 2012/0054592 | A1 | 3/2012 | Jaffe et al. |
| 2012/0072382 | A1 | 3/2012 | Pearson et al. |
| 2012/0079585 | A1 | 3/2012 | Chan et al. |
| 2012/0084866 | A1 | 4/2012 | Stolfo |
| 2012/0089438 | A1 | 4/2012 | Tavares et al. |
| 2012/0096557 | A1 | 4/2012 | Britton et al. |
| 2012/0108274 | A1 | 5/2012 | Acebo Ruiz et al. |
| 2012/0110467 | A1 | 5/2012 | Blake et al. |
| 2012/0110677 | A1 | 5/2012 | Abendroth et al. |
| 2012/0117629 | A1 | 5/2012 | Miyazawa et al. |
| 2012/0124498 | A1 | 5/2012 | Santoro et al. |
| 2012/0130898 | A1 | 5/2012 | Snyder et al. |
| 2012/0136763 | A1 | 5/2012 | Megdal et al. |
| 2012/0151045 | A1 | 6/2012 | Anakata et al. |
| 2012/0173339 | A1 | 7/2012 | Flynt et al. |
| 2012/0173563 | A1 | 7/2012 | Griffin et al. |
| 2012/0191610 | A1 | 7/2012 | Prasad |
| 2012/0215682 | A1 | 8/2012 | Lent et al. |
| 2012/0215719 | A1 | 8/2012 | Verlander |
| 2012/0216125 | A1 | 8/2012 | Pierce |
| 2012/0235897 | A1 | 9/2012 | Hirota |
| 2012/0239497 | A1 | 9/2012 | Nuzzi |
| 2012/0246060 | A1 | 9/2012 | Conyack, Jr. et al. |
| 2012/0246730 | A1 | 9/2012 | Raad |
| 2012/0253852 | A1 | 10/2012 | Pourfallah et al. |
| 2012/0290660 | A1 | 11/2012 | Rao et al. |
| 2012/0297484 | A1 | 11/2012 | Srivastava |
| 2012/0323717 | A1 | 12/2012 | Kirsch |
| 2012/0331557 | A1 | 12/2012 | Washington |
| 2013/0004033 | A1 | 1/2013 | Trugenberger et al. |
| 2013/0006843 | A1 | 1/2013 | Tralvex |
| 2013/0018811 | A1 | 1/2013 | Britti et al. |
| 2013/0031109 | A1 | 1/2013 | Roulson et al. |
| 2013/0031624 | A1 | 1/2013 | Britti et al. |
| 2013/0041701 | A1 | 2/2013 | Roth |
| 2013/0066775 | A1 | 3/2013 | Milam |
| 2013/0080467 | A1 | 3/2013 | Carson et al. |
| 2013/0085804 | A1 | 4/2013 | Leff et al. |
| 2013/0085939 | A1 | 4/2013 | Colak et al. |
| 2013/0086186 | A1 | 4/2013 | Tomkow |
| 2013/0086654 | A1 | 4/2013 | Tomkow |
| 2013/0110678 | A1 | 5/2013 | Vigier et al. |
| 2013/0117087 | A1 | 5/2013 | Coppinger |
| 2013/0117387 | A1 | 5/2013 | Tomkow |
| 2013/0125010 | A1 | 5/2013 | Strandell |
| 2013/0132151 | A1 | 5/2013 | Stibel et al. |
| 2013/0139229 | A1 | 5/2013 | Fried et al. |
| 2013/0173449 | A1 | 7/2013 | Ng et al. |
| 2013/0179955 | A1 | 7/2013 | Bekker et al. |
| 2013/0198525 | A1 | 8/2013 | Spies et al. |
| 2013/0205135 | A1 | 8/2013 | Lutz |
| 2013/0212661 | A1 | 8/2013 | Neafsey et al. |
| 2013/0246150 | A1 | 9/2013 | Ovick et al. |
| 2013/0246273 | A1 | 9/2013 | Ovick et al. |
| 2013/0246528 | A1 | 9/2013 | Ogura |
| 2013/0254008 | A1 | 9/2013 | Ovick et al. |
| 2013/0254096 | A1 | 9/2013 | Serio et al. |
| 2013/0268333 | A1 | 10/2013 | Ovick et al. |
| 2013/0271272 | A1 | 10/2013 | Dhesi et al. |
| 2013/0275762 | A1 | 10/2013 | Tomkow |
| 2013/0279676 | A1 | 10/2013 | Baniak et al. |
| 2013/0282461 | A1 | 10/2013 | Ovick et al. |
| 2013/0290097 | A1 | 10/2013 | Balestrieri et al. |
| 2013/0293363 | A1 | 11/2013 | Plymouth |
| 2013/0298238 | A1 | 11/2013 | Shah et al. |
| 2013/0318569 | A1 | 11/2013 | Canning et al. |
| 2013/0332342 | A1 | 12/2013 | Kasower |
| 2013/0339217 | A1 | 12/2013 | Breslow et al. |
| 2013/0339249 | A1 | 12/2013 | Weller et al. |
| 2013/0346331 | A1 | 12/2013 | Giovannetti et al. |
| 2014/0012733 | A1 | 1/2014 | Vidal |
| 2014/0013396 | A1 | 1/2014 | Field-Eliot et al. |
| 2014/0025475 | A1 | 1/2014 | Burke |
| 2014/0032723 | A1 | 1/2014 | Nema |
| 2014/0033280 | A1 | 1/2014 | Nimashakavi et al. |

(56) References Cited

U.S. PATENT DOCUMENTS

2014/0040051 A1 2/2014 Ovick et al.
2014/0040135 A1 2/2014 Ovick et al.
2014/0046872 A1 2/2014 Arnott et al.
2014/0051464 A1 2/2014 Ryan et al.
2014/0061302 A1 3/2014 Hammad
2014/0089167 A1 3/2014 Kasower
2014/0110477 A1 4/2014 Hammad
2014/0162611 A1 6/2014 Mezhibovsky et al.
2014/0164112 A1 6/2014 Kala
2014/0164398 A1 6/2014 Smith et al.
2014/0164519 A1 6/2014 Shah
2014/0201100 A1* 7/2014 Rellas ................ G06Q 30/0607
705/330
2014/0258083 A1 9/2014 Achanta et al.
2014/0279467 A1 9/2014 Chapa et al.
2014/0280945 A1 9/2014 Lunt
2014/0283123 A1 9/2014 Lonstein et al.
2014/0289812 A1 9/2014 Wang et al.
2014/0298485 A1 10/2014 Gardner
2014/0317023 A1 10/2014 Kim
2014/0317716 A1 10/2014 Chao et al.
2014/0331282 A1 11/2014 Tkachev
2014/0365653 A1 12/2014 Matoba
2014/0379600 A1 12/2014 Chapa et al.
2015/0067341 A1 3/2015 Deen et al.
2015/0089569 A1 3/2015 Sondhi et al.
2015/0128237 A1 5/2015 Lund et al.
2015/0142595 A1 5/2015 Acuña-Rohter
2015/0150106 A1 5/2015 Lund et al.
2015/0161228 A1 6/2015 Davies
2015/0180870 A1 6/2015 Zhang et al.
2015/0199667 A1 7/2015 Fernando et al.
2015/0199668 A1 7/2015 Fernando et al.
2015/0229512 A1 8/2015 Dutti et al.
2015/0249655 A1 9/2015 Lunt
2015/0254658 A1 9/2015 Bondesen et al.
2015/0278277 A1 10/2015 Agrawal et al.
2015/0326580 A1 11/2015 McMillan et al.
2015/0350186 A1 12/2015 Chan et al.
2016/0005020 A1 1/2016 Fernando et al.
2016/0027008 A1 1/2016 John
2016/0050198 A1 2/2016 Thibadeau Sr. et al.
2016/0065563 A1 3/2016 Broadbent et al.
2016/0070758 A1 3/2016 Thomson et al.
2016/0087957 A1 3/2016 Shah et al.
2016/0088465 A1 3/2016 Golla
2016/0142532 A1 5/2016 Bostick
2016/0164878 A1 6/2016 Nakano
2016/0217444 A1 7/2016 Martin
2016/0217445 A1 7/2016 Martin
2016/0226879 A1 8/2016 Chan et al.
2016/0275476 A1 9/2016 Artman et al.
2016/0283740 A1 9/2016 Roundtree
2016/0294612 A1 10/2016 Ravinoothala et al.
2016/0337369 A1 11/2016 Sanso
2017/0061436 A1 3/2017 Liu et al.
2017/0111336 A1 4/2017 Davis et al.
2017/0140386 A1 5/2017 Kolkowitz et al.
2017/0163532 A1 6/2017 Tubaltsev et al.
2017/0186012 A1 6/2017 McNeal
2017/0200223 A1 7/2017 Kasower
2017/0324749 A1 11/2017 Bhargava et al.
2017/0331832 A1 11/2017 Lander et al.
2017/0337549 A1 11/2017 Wong
2017/0337557 A1 11/2017 Durney et al.
2017/0357971 A1 12/2017 Pitz et al.
2018/0041336 A1 2/2018 Keshava et al.
2018/0046856 A1* 2/2018 Kapczynski ......... G06Q 50/265
2018/0077142 A1 3/2018 Thakkar
2018/0083915 A1 3/2018 Medam et al.
2018/0097828 A1 4/2018 Coskun
2018/0145967 A1 5/2018 Matsugashita
2018/0184288 A1 6/2018 De Lorenzo et al.
2018/0227292 A1 8/2018 Golshan et al.
2018/0232433 A1 8/2018 Kanvinde
2018/0285549 A1 10/2018 Sonkar et al.
2018/0337914 A1 11/2018 Mohamad Abdul et al.
2018/0343265 A1 11/2018 McMillan et al.
2018/0351852 A1 12/2018 Boucadair et al.
2018/0365690 A1 12/2018 Ovick et al.
2018/0375791 A1 12/2018 Kaladgi et al.
2019/0073676 A1 3/2019 Wang
2019/0095516 A1 3/2019 Srinivasan et al.
2019/0164173 A1 5/2019 Liu et al.
2019/0208040 A1 7/2019 Boucadair et al.
2019/0228173 A1 7/2019 Gupta et al.
2019/0228178 A1 7/2019 Sharma et al.
2019/0259030 A1 8/2019 Burger
2019/0260594 A1 8/2019 Singhal et al.
2019/0268797 A1 8/2019 Pang et al.
2019/0273809 A1 9/2019 Boucadair et al.
2019/0306157 A1 10/2019 Lores et al.
2019/0349360 A1 11/2019 Yeddula et al.
2020/0104834 A1 4/2020 Pontious et al.
2020/0118127 A1 4/2020 Miller et al.
2020/0120004 A1 4/2020 Kohout et al.
2020/0120015 A1 4/2020 Boucadair et al.
2020/0137080 A1 4/2020 Bloomquist et al.
2020/0145324 A1 5/2020 Wei et al.
2020/0162443 A1 5/2020 Poschel et al.
2020/0205002 A1 6/2020 Talwar
2020/0210466 A1 7/2020 Yin et al.
2020/0228321 A1 7/2020 Krishnamacharya et al.
2020/0293684 A1 9/2020 Harris et al.
2020/0304501 A1 9/2020 Fan
2020/0314088 A1 10/2020 Feijoo et al.
2020/0320511 A1 10/2020 Anderson et al.
2020/0334349 A1 10/2020 Billman et al.
2020/0342557 A1 10/2020 Chapa et al.
2020/0372535 A1 11/2020 Walz et al.
2020/0380112 A1 12/2020 Allen
2020/0380509 A1 12/2020 Billman et al.
2020/0394331 A1 12/2020 Talwar
2020/0403992 A1 12/2020 Huffman et al.
2021/0012312 A1 1/2021 Bradstreet
2021/0092115 A1 3/2021 Bhattacharyya et al.
2021/0117969 A1 4/2021 Chilaka et al.
2021/0144131 A1 5/2021 Krishnamacharya
2021/0203667 A1 7/2021 Bondugula et al.
2021/0240808 A1 8/2021 Sadhwani et al.
2021/0241120 A1 8/2021 Chen et al.
2021/0288948 A1 9/2021 Joffe et al.
2022/0027853 A1 1/2022 McMillan et al.
2022/0027891 A1 1/2022 Anderson et al.
2022/0044343 A1 2/2022 Chapa et al.
2022/0070169 A1 3/2022 Cano et al.
2022/0109578 A1 4/2022 Kirsch
2022/0173887 A1 6/2022 Krishnamacharya et al.
2022/0182487 A1 6/2022 Sharma et al.
2022/0239665 A1 7/2022 Bondugula et al.
2022/0261461 A1 8/2022 Bondugula et al.
2022/0279067 A1 9/2022 Sena, Jr. et al.
2022/0345460 A1 10/2022 Alden et al.
2023/0239295 A1 7/2023 Cano et al.
2023/0254404 A1 8/2023 Sharma et al.
2023/0259648 A1 8/2023 Gupta et al.
2023/0319036 A1 10/2023 Singh et al.
2023/0376585 A1 11/2023 Allen
2023/0421376 A1 12/2023 Jain et al.
2024/0022431 A1 1/2024 Kirsch
2024/0169314 A1 5/2024 McMillan et al.
2024/0212084 A1 6/2024 Chapa et al.

FOREIGN PATENT DOCUMENTS

AU 2023258421 11/2023
CA 3 076 931 10/2020
CA 3 052 415 7/2021
CA 2 896 503 8/2021
CN 104877993 9/2015
EP 1 028 401 8/2000
EP 1 239 378 9/2002
EP 1 301 887 4/2003
EP 1 850 278 10/2007

(56) References Cited

FOREIGN PATENT DOCUMENTS

| | | |
|---|---|---|
| EP | 2 425 583 | 3/2012 |
| EP | 2 074 513 | 2/2016 |
| EP | 2 939 364 | 6/2020 |
| EP | 3 577 850 | 7/2021 |
| EP | 3 862 897 | 8/2021 |
| EP | 4 060 941 | 9/2022 |
| ES | 2 811 070 | 3/2021 |
| GB | 2 518 099 | 3/2015 |
| IN | 201917040928 | 11/2019 |
| JP | 2005-135431 | 5/2005 |
| JP | 2005-208945 | 8/2005 |
| JP | 4202314 | 12/2008 |
| JP | 2012-113696 | 6/2012 |
| KR | 10-2000-0063313 | 11/2000 |
| KR | 10-2002-0039203 | 5/2002 |
| KR | 10-2007-0081504 | 8/2007 |
| TW | 1256569 | 6/2006 |
| WO | WO 99/054803 | 10/1999 |
| WO | WO 99/060481 | 11/1999 |
| WO | WO 00/030045 | 5/2000 |
| WO | WO 01/009752 | 2/2001 |
| WO | WO 01/009792 | 2/2001 |
| WO | WO 01/010090 | 2/2001 |
| WO | WO 01/084281 | 11/2001 |
| WO | WO 02/011025 | 2/2002 |
| WO | WO 02/029636 | 4/2002 |
| WO | WO 03/073711 | 9/2003 |
| WO | WO 2004/031986 | 4/2004 |
| WO | WO 2004/049654 | 6/2004 |
| WO | WO 2005/033979 | 4/2005 |
| WO | WO 2006/019752 | 2/2006 |
| WO | WO 2006/050278 | 5/2006 |
| WO | WO 2006/069199 | 6/2006 |
| WO | WO 2006/099081 | 9/2006 |
| WO | WO 2007/001394 | 1/2007 |
| WO | WO 2007/050156 | 5/2007 |
| WO | WO 2008/042614 | 4/2008 |
| WO | WO 2008/054849 | 5/2008 |
| WO | WO 2009/064694 | 5/2009 |
| WO | WO 2009/102391 | 8/2009 |
| WO | WO 2009/108901 | 9/2009 |
| WO | WO 2009/117468 | 9/2009 |
| WO | WO 2010/001406 | 1/2010 |
| WO | WO 2010/062537 | 6/2010 |
| WO | WO 2010/077989 | 7/2010 |
| WO | WO 2010/150251 | 12/2010 |
| WO | WO 2011/005876 | 1/2011 |
| WO | WO 2011/014878 | 2/2011 |
| WO | WO 2012/054646 | 4/2012 |
| WO | WO 2013/126281 | 8/2013 |
| WO | WO 2013/140410 | 9/2013 |
| WO | WO 2014/008079 | 1/2014 |
| WO | WO 2014/150987 | 9/2014 |
| WO | WO 2015/038520 | 3/2015 |
| WO | WO 2018/129373 | 7/2018 |
| WO | WO 2018/191638 | 10/2018 |
| WO | WO 2018/199992 | 11/2018 |
| WO | WO 2019/006144 | 1/2019 |
| WO | WO 2019/152592 | 8/2019 |
| WO | WO 2019/209857 | 10/2019 |
| WO | WO 2019/245998 | 12/2019 |
| WO | WO 2020/206305 | 10/2020 |
| WO | WO 2021/011308 | 1/2021 |
| WO | WO 2021/067446 | 4/2021 |
| WO | WO 2021/097090 | 5/2021 |
| WO | WO 2021/138263 | 7/2021 |
| WO | WO 2021/155053 | 8/2021 |
| WO | WO 2023/192175 | 10/2023 |

OTHER PUBLICATIONS

U.S. Appl. No. 12/705,511, filed Feb. 12, 2010, Bargoli et al.

Official Communication in Australian Patent Application No. 2021204354, dated Jun. 29, 2022.

Official Communication in Australian Patent Application No. 2023226759, dated Sep. 21, 2023.

Dekleva, Sasha, "Electronic Commerce: A Half-Empty Glass?" Communications of the Association for Information Systems, Jun. 2000, vol. 3, Article 18, pp. 101.

Aad et al., "NRC Data Collection and the Privacy by Design Principles", IEEE, Nov. 2010, pp. 5.

Actuate, "Delivering Enterprise Information for Corporate Portals", White Paper, 2004, pp. 1-7.

"Aggregate and Analyze Social Media Content: Gain Faster and Broader Insight to Market Sentiment," SAP Partner, Mantis Technology Group, Apr. 2011, pp. 4.

Aharony et al., "Social Area Networks: Data Networking of the People, by the People, for the People," 2009 International Conference on Computational Science and Engineering, May 2009, pp. 1148-1155.

Aktas et al., "Personalizing PageRank Based on Domain Profiles", WEBKDD workshop: Webmining and Web Usage Analysis, Aug. 22, 2004, pp. 83-90.

Aktas et al., "Using Hyperlink Features to Personalize Web Search", WEBKDD workshop: Webmining and Web Usage Analysis, Aug. 2004.

"Arizona Company Has Found Key in Stopping ID Theft," PR Newswire, New York, Aug. 10, 2005 http://proquest.umi.com/pqdweb?did=880104711&SID=1&Fmt=3&clientld=19649&RQT=309&Vname=PQD.

ABC News Now: Money Matters, as broadcasted Nov. 15, 2005 with guest Todd Davis (CEO of Lifelock), pp. 6.

Anonymous, "Credit-Report Disputes Await Electronic Resolution," Credit Card News, Chicago, Jan. 15, 1993, vol. 5, No. 19, pp. 5.

Anonymous, "MBNA Offers Resolution of Credit Card Disputes," Hempstead, Feb. 2002, vol. 68, No. 2, pp. 47.

Anonymous, "Feedback", Credit Management, ABI/INFORM Global, Sep. 2006, pp. 6.

Bacon, Chris, "OAuth id_token missing information on refresh #1141", <https://github.com/googleapis/google-api-dotnet-client/issues/1141>, Jan. 1, 2018, pp. 9.

Bielski, Lauren, "Will you Spend to Thwart ID Theft?" ABA Banking Journal, Apr. 2005, pp. 54, 56-57, 60.

Bluecava, "What We Do", http://www.bluecava.com/what-we-do/, printed Nov. 5, 2012 in 3 pages.

Buxfer, http://www.buxfer.com/ printed Feb. 5, 2014 in 1 page.

Check, http://check.me/ printed Feb. 5, 2014 in 3 pages.

Cheng, Fred, "Security Attack Safe Mobile and Cloud-based One-time Password Tokens Using Rubbing Encryption Algorithm", MONET, 2011, vol. 16, pp. 304-336.

Chores & Allowances, "Do Kids Have Credit Reports?" Oct. 15, 2007, http://choresandallowances.blogspot.com/2007/10/do-kids-have-credit-reports.html, pp. 5.

Comlounge.net, "plonesocial.auth.rpx" http://web.archive.org/web/20101026041841/http://comlounge.net/rpx as captured Oct. 26, 2010 in 9 pages.

"Consumers Gain Immediate and Full Access to Credit Score Used by Majority of U.S. Lenders", PR Newswire, ProQuest Copy, Mar. 19, 2001, p. 1.

"CreditCheck Monitoring Services," Dec. 11, 2000, pp. 1, lines 21-23.

Cullen, Terri; "The Wall Street Journal Complete Identity Theft Guidebook:How to Protect Yourself from the Most Pervasive Crime in America"; Chapter 3, pp. 59-79; Jul. 10, 2007.

"D&B Corporate Family Linkage", D&B Internet Access for U.S. Contract Customers, https://www.dnb.com/ecomp/help/linkage.htm as printed Dec. 17, 2009, pp. 1.

Day, Jo and Kevin; "ID-ology: A Planner's Guide to Identity Theft"; Journal of Financial Planning: Tech Talk; pp. 36-38; Sep. 2004.

Equifax, "InstaTouch ID: Separate Fact from Friction." http://equifax.uberflip.com/i/791148-mobile-consumer-identity-service-product-sheet/1, 2016, pp. 2.

Equifax; "Equifax Credit Watch"; https://web.archive.org/web/20070627135447/https://www.econsumer.equifax.co.uk/consumer/uk/sitepage.ehtml?forward=gb_esn_detail, dated Jun. 27, 2007 on www.archive.org in 2 pages.

(56) References Cited

OTHER PUBLICATIONS

Ettorre, "Paul Kahn on Exceptional Marketing," Management Review, vol. 83, No. 11, Nov. 1994, pp. 48-51.
Facebook, "Facebook helps you connect and share with the people in your life," www.facebook.com printed Nov. 16, 2010 in 1 page.
FamilySecure.com, "Frequently Asked Questions", http://www.familysecure.com/FAQ.aspx as archived Jul. 15, 2007 in 3 pages.
FamilySecure.com; "Identity Theft Protection for the Whole Family | FamilySecure.com" http://www.familysecure.com/, as retrieved on Nov. 5, 2009.
Fenner, Peter, "Mobile Address Management and Billing for Personal Communications", 1st International Conference on Universal Personal Communications, 1992, ICUPC '92 Proceedings, pp. 253-257.
"Fictitious Business Name Records", Westlaw Database Directory, http://directory.westlaw.com/scope/default.asp?db=FBN-ALL&RS-W...&VR=2.0 as printed Dec. 17, 2009, pp. 5.
Fisher, Joseph, "Access to Fair Credit Reports: Current Practices and Proposed Legislation," American Business Law Journal, Fall 1981, vol. 19, No. 3, p. 319.
Franks et al., "HTTP Authentication: Basic and Digest Access Authentication", Network Working Group, Standards Track, Jun. 1999, pp. 34.
"Fraud Alert | Learn How". Fight Identity Theft. http://www.fightidentitytheft.com/flag.html, accessed on Nov. 5, 2009.
Gibbs, Adrienne; "Protecting Your Children from Identity Theft," Nov. 25, 2008, http://www.creditcards.com/credit-card-news/identity-ID-theft-and-kids-children-1282.php, pp. 4.
Gordon et al., "Identity Fraud: A Critical National and Global Threat," LexisNexis, Oct. 28, 2003, pp. 1-48.
Gordon et al., "Using Identity Authentication and Eligibility Assessment to Mitigate the Risk of Improper Payments", LexisNexis, Jan. 28, 2008, pp. 18. https://risk.lexisnexis.com/-/media/files/government/white-paper/identity_authentication-pdf.pdf.
Haglund, Christoffer, "Two-Factor Authentication with a Mobile Phone", Fox Technologies, Uppsala, Department of Information Technology, Nov. 2, 2007, pp. 62.
Harrington et al., "iOS 4 In Action", Chapter 17, Local and Push Notification Services, Manning Publications Co., Jun. 2011, pp. 347-353.
Herzberg, Amir, "Payments and Banking with Mobile Personal Devices," Communications of the ACM, May 2003, vol. 46, No. 5, pp. 53-58.
Hoofnagle, Chris Jay, "Identity Theft: Making the Known Unknowns Known," Harvard Journal of Law & Technology, Fall 2007, vol. 21, No. 1, pp. 98-122.
ID Analytics, "ID Analytics® Consumer Notification Service" printed Apr. 16, 2013 in 2 pages.
ID Theft Assist, "Do You Know Where Your Child's Credit Is?", Nov. 26, 2007, http://www.idtheftassist.com/pages/story14, pp. 3.
"ID Thieves These Days Want Your Number, Not Your Name", The Columbus Dispatch, Columbus, Ohio, http://www.dispatch.com/content/stories/business/2014/08/03/id-thieves-these-days-want-your-number-not-your-name.html, Aug. 3, 2014 in 2 pages.
Identity Theft Resource Center; Fact Sheet 120 A—To Order a Credit Report for a Child; Fact Sheets, Victim Resources; Apr. 30, 2007.
"Identity Thieves Beware: Lifelock Introduces Nation's First Guaranteed Proactive Solution to Identity TheftProtection," PR Newswire, New York, Jun. 13, 2005 http://proquest.umi.com/pqdweb?did=852869731&SID=1&Fmt=3&clientId=19649&RQT=309&Vname=PQD.
Ideon, Credit-Card Registry that Bellyflopped this Year, Is Drawing some Bottom-Fishers, The Wall Street Journal, Aug. 21, 1995, pp. C2.
Information Brokers of America, "Information Brokers of America Child Identity Theft Protection"http://web.archive.org/web/20080706135451/http://iboainfo.com/child-order.html as archived Jul. 6, 2008 in 1 page.
Information Brokers of America, "Safeguard Your Child's Credit", http://web.archive.org/web/20071215210406/http://www.iboainfo.com/child-id-protect.html as archived Dec. 15, 2007 in 1 page.
Intelius, "People Search—Updated Daily, Accurate and Fast!" http://www.intelius.com/people-search.html?=&gclid=CJqZIZP7paUCFYK5KgodbCUJJQ printed Nov. 16, 2010 in 1 page.
Iovation, Device Identification & Device Fingerprinting, http://www.iovation.com/risk-management/device-identification printed Nov. 5, 2012 in 6 pages.
Jones et al., "JSON Web Signature (JWS)", Internet Engineering Task Force (IETF), ISSN: 2070-1721, Standards Track, May 2015, pp. 59.
Khan, Muhammad Khurram, PhD., "An Efficient and Secure Remote Mutual Authentication Scheme with Smart Cards" IEEE International Symposium on Biometrics & Security Technologies (ISBAST), Apr. 23-24, 2008, pp. 1-6.
Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.
Lee, W.A.; "Experian, on Deal Hunt, Nets Identity Theft Insurer", American Banker: The Financial Services Daily, Jun. 4, 2003, New York, NY, 1 page.
Lefebvre et al., "A Robust Soft Hash Algorithm for Digital Image Signature", International Conference on Image Processing 2:11 (ICIP), vol. 3, Oct. 2003, pp. 495-498.
Leskovec, Jure, "Social Media Analytics: Tracking, Modeling and Predicting the Flow of Information through Networks", WWW 2011—Tutorial, Mar. 28-Apr. 1, 2011, Hyderabad, India, pp. 277-278.
Letter to Donald A. Robert from Carolyn B. Maloney, dated Oct. 31, 2007, pp. 2.
Letter to Donald A. Robert from Senator Charles E. Schumer, dated Oct. 11, 2007, pp. 2.
Letter to Harry C. Gambill from Carolyn B. Maloney, dated Oct. 31, 2007, pp. 2.
Letter to Harry C. Gambill from Senator Charles E. Schumer, dated Oct. 11, 2007, pp. 2.
Letter to Richard F. Smith from Carolyn B. Maloney, dated Oct. 31, 2007, pp. 2.
Letter to Richard F. Smith from Senator Charles E. Schumer, dated Oct. 11, 2007, pp. 2.
Li et al., "Automatic Verbal Information Verification for User Authentication", IEEE Transactions on Speech and Audio Processing, vol. 8, No. 5, Sep. 2000, pp. 585-596.
LifeLock, "How LifeLock Works," http://www.lifelock.com/lifelock-for-people printed Mar. 14, 2008 in 1 page.
LifeLock, "LifeLock Launches First ID Theft Prevention Program for the Protection of Children," PressRelease, Oct. 14, 2005, http://www.lifelock.com/about-us/press-room/2005-press-releases/lifelock-protection-for-children.
LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.
LifeLock, "Personal Identity Theft Protection & Identity Theft Products," http://www.lifelock.com/lifelock-for-people, accessed Nov. 5, 2007.
LifeLock, Various Pages, www.lifelock.com/, Jan. 9, 2007, pp. 49.
Lobo, Jude, "MySAP.com Enterprise Portal Cookbook," SAP Technical Delivery, Feb. 2002, vol. 1, pp. 1-13.
Lodderstedt et al., "OAuth 2.0 token Revocation", Internet Engineering Task Force (IETF), Standards Track, Aug. 2013, pp. 11.
Magid, Lawrence, J., Business Tools: When Selecting an ASP Ensure Data Mobility, Los Angeles Times, Los Angeles, CA, Feb. 26, 2001, vol. C, Issue 4, pp. 3.
Manilla, http://www.manilla.com/how-it-works/ printed Feb. 5, 2014 in 1 page.
Meyers et al., "Using Your Social Networking Accounts to Log Into NPR.org," NPR. org, Jun. 24, 2010, http://web.archive.org/web/

(56) References Cited

OTHER PUBLICATIONS

20100627034054/http://www.npr.org/blogs/inside/2010/06/24/128079309/using-your-social-networking-accounts-to-log-into-npr-org in 3 pages.
Micarelli et al., "Personalized Search on the World Wide Web," The Adaptive Web, LNCS 4321, 2007, pp. 195-230.
Microsoft, "Expand the Reach of Your Business," Microsoft Business Solutions, 2004, in 16 pages.
Mint.com, http://www.mint.com/how-it-works/ printed Feb. 5, 2013 in 2 pages.
Mvelopes, http://www.mvelopes.com/ printed Feb. 5, 2014 in 2 pages.
My Call Credit http://www.mycallcredit.com/products.asp?product=ALR dated Dec. 10, 2005 on www.archive.org.
My Call Credit http://www.mycallcredit.com/rewrite.asp?display=faq dated Dec. 10, 2005 on www.archive.org.
My ID Alerts, "Why ID Alerts" http://www.myidalerts.com/why-id-alerts.jsps printed Apr. 3, 2012 in 2 pages.
My ID Alerts, "How it Works" http://www.myidalerts.com/how-it-works.jsps printed Apr. 3, 2012 in 3 pages.
"Name Availability Records", Westlaw Database Directory, http://directory.westlaw.com/scope/default.asp?db=NA-ALL&RS=W...&VR=2.0 as printed Dec. 17, 2009, pp. 5.
National Alert Registry Launches RegisteredOffendersList.org to Provide Information on Registered Sex Offenders, May 16, 2005, pp. 2, http://www.prweb.com/printer/240437.htm accessed on Oct. 18, 2011.
National Alert Registry Offers Free Child Safety "Safe From Harm" DVD and Child Identification Kit, Oct. 24, 2006. pp. 2, http://www.prleap.com/pr/53170 accessed on Oct. 18, 2011.
National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.
Next Card: About Us, http://web.cba.neu.edu/~awatson/NextCardCase/NextCardAboutUs.htm printed Oct. 23, 2009 in 10 pages.
Ogg, Erica, "Apple Cracks Down on UDID Use", http://gigaom.com/apple/apple-cracks-down-on-udid-use/ printed Nov. 5, 2012 in 5 Pages.
Pagano, et al., "Information Sharing in Credit Markets," Dec. 1993, The Journal of Finance, vol. 48, No. 5, pp. 1693-1718.
Partnoy, Frank, Rethinking Regulation of Credit Rating Agencies: An Institutional Investor Perspective, Council of Institutional Investors, Apr. 2009, pp. 21.
Paustian, Chuck, "Every Cardholder a King Customers get the Full Treatment at Issuers' Web Sites," Card Marketing, New York, Mar. 2001, vol. 5, No. 3, pp. 4.
People Finders, http://www.peoplefinders.com/?CMP=Google&utm_source=google&utm_medium=cpc printed Nov. 16, 2010 in 1 page.
People Lookup, "Your Source for Locating Anyone!" www.peoplelookup.com/people-search.html printed Nov. 16, 2010 in 1 page.
People Search, "The Leading Premium People Search Site on the Web," http://www.peoplesearch.com printed Nov. 16, 2010 in 2 pages.
PersonalCapital.com, http://www.personalcapital.com/how-it-works printed Feb. 5, 2014 in 5 pages.
Phinisee, Tamarind, "Banks, FTC Step Up Efforts to Address Identity Theft", San Antonio Business Journal; San Antonio, Jul. 5, 2002, vol. 16, No. 24, pp. 5.
Press Release—"Helping Families Protect Against Identity Theft—Experian Announces FamilySecure.com;Parents and guardians are alerted for signs of potential identity theft for them and their children; product features an industry-leading $2 million guarantee"; PR Newswire; Irvine, CA; Oct. 1, 2007.
Privacy Rights Clearinghouse, "Identity Theft: What to do if it Happens to You,"http://web.archive.org/web/19990218180542/http://privacyrights.org/fs/fs17a.htm printed Feb. 18, 1999.
Ramaswamy, Vinita M., Identity-Theft Toolkit, The CPA Journal, Oct. 1, 2006, vol. 76, Issue 10, pp. 66-70.
Rawe, Julie; "Identity Thieves", Time Bonus Section, Inside Business, Feb. 2002, pp. 2.
Roth, Andrew, "CheckFree to Introduce E-Mail Billing Serving," American Banker, New York, Mar. 13, 2001, vol. 166, No. 49, pp. 3.
Sakimura et al., "OpenID Connect Core 1.0 Incorporating Errata Set 1", <https://openid.net/specs/openid-connect-core-1_0.html>, Nov. 8, 2014, pp. 78.
SAS, "SAS® Information Delivery Portal", Fact Sheet, 2008, in 4 pages.
Scholastic Inc.:Parent's Request for Information http://web.archive.org/web/20070210091055/http://www.scholastic.com/inforequest/index.htm as archived Feb. 10, 2007 in 1 page.
Scholastic Inc.:Privacy Policy http://web.archive.org/web/20070127214753/http://www.scholastic.com/privacy.htm as archived Jan. 27, 2007 in 3 pages.
Securities and Futures Commission, "Guideline on Anti-Money Laundering and Counter-Terrorist Financing", Jul. 2012, pp. 135.
Singletary, Michelle, "The Littlest Victims of ID Theft", The Washington Post, The Color of Money, Oct. 4, 2007.
Sun, Hung-Min, "An Efficient Remote Use Authentication Scheme Using Smart Cards", IEEE Transactions on Consumer Electronics, Nov. 2000, vol. 46, No. 4, pp. 958-961.
Target, "Free Credit Monitoring and Identity Theft Protection with Experian's ProtectMyID Now Available", Jan. 13, 2014, pp. 2. http://corporate.target.com.
TheMorningCall.Com, "Cheap Ways to Foil Identity Theft," www.mcall.com/business/columnists/all-karp.5920748jul01,0 . . . , published Jul. 1, 2007.
"TransUnion—Child Identity Theft Inquiry", TransUnion, http://www.transunion.com/corporate/personal/fraudIdentityTheft/fraudPrevention/childIDInquiry.page as printed Nov. 5, 2009 in 4 pages.
Truston, "Checking if your Child is an ID Theft Victim can be Stressful," as posted by Michelle Pastor on Jan. 22, 2007 at http://www.mytruston.com/blog/credit/checking_if_your_child_is_an_id_theft_vi.html.
US Legal, Description, http://www.uslegalforms.com/us/US-00708-LTR.htm printed Sep. 4, 2007 in 2 pages.
Vamosi, Robert, "How to Handle ID Fraud's Youngest Victims," Nov. 21, 2008, http://news.cnet.com/8301-10789_3-10105303-57.html.
Waggoner, Darren J., "Having a Global Identity Crisis," Collections & Credit Risk, Aug. 2001, vol. vol. 6, No. 8, pp. 6.
Wang et al., "User Identification Based on Finger-vein Patterns for Consumer Electronics Devices", IEEE Transactions on Consumer Electronics, May 2010, vol. 56, No. 2, pp. 799-804.
Weaver et al., "Federated, Secure Trust Networks for Distributed Healthcare IT Services", IEEE International Conference on Industrial Informatics, 2003. INDIN 2003. Proceedings, 2003, pp. 162-169.
WhatIs.com, "Risk-Based Authentication (RBA)", https://web.archive.org/web/20121025033106/http://whatis.techtarget.com/definition/risk-based-authentication-RBA, Oct. 23, 2012, pp. 1.
Willems et al., "On the Security and Privacy of Interac e-Transfers", School of Electrical Engineering and Computer Science, Faculty of Engineering, University of Ottawa, Extended Version, Dec. 10, 2019, pp. 47.
Yahoo! Search, "People Search," http://people.yahoo/com printed Nov. 16, 2010 in 1 page.
Yodlee | Money Center, https://yodleemoneycenter.com/ printed Feb. 5, 2014 in 2 pages.
You Need a Budget, http://www.youneedabudget.com/features printed Feb. 5, 2014 in 3 pages.
Official Communication in Australian Patent Application No. 2014318966, dated Apr. 6, 2019.
Official Communication in Australian Patent Application No. 2019261724, dated Sep. 1, 2020.
Official Communication in Canadian Patent Application No. 2,923,697, dated Oct. 9, 2019.
Extended European Search Report for Application No. EP14843372.5, dated May 2, 2017.

(56) References Cited

OTHER PUBLICATIONS

Official Communication in European Application No. EP14843372.5 dated Nov. 29, 2018.
Extended European Search Report for Application No. EP19203040.1, dated Jan. 29, 2020.
Extended European Search Report for Application No. EP21183630.9, dated Oct. 15, 2021.
International Search Report and Written Opinion for Application No. PCT/US2014/054713, dated Dec. 15, 2014.
International Preliminary Report on Patentability in Application No. PCT/US2014/054713, dated Mar. 24, 2016.
Official Communication in Australian Patent Application No. 2006306790, dated Apr. 29, 2010.
Official Communication in Australian Patent Application No. 2006306790, dated May 19, 2011.
International Search Report and Written Opinion for Application No. PCT/US2006/028006, dated Jul. 27, 2007.
International Preliminary Report on Patentability in Application No. PCT/US2006/028006, dated Apr. 23, 2008.
International Search Report and Written Opinion for Application No. PCT/US2019/037547, dated Oct. 4, 2019.
International Preliminary Report on Patentability in Application No. PCT/US2019/037547, dated Dec. 30, 2020.
International Search Report and Written Opinion for Application No. PCT/US2021/015566, dated May 11, 2021.
International Preliminary Report on Patentability in Application No. PCT/US2021/015566, dated Aug. 11, 2022.

* cited by examiner

DIGITAL IDENTITY

CROSS-REFERENCE TO RELATED APPLICATIONS

This application is a continuation of U.S. patent application Ser. No. 17/444,849, filed Aug. 11, 2021, which is a continuation of U.S. application Ser. No. 16/657,174, filed Oct. 18, 2019, which is a continuation U.S. patent application Ser. No. 15/662,712, filed Jul. 28, 2017, which is a continuation of U.S. patent application Ser. No. 14/276,540, filed on May 13, 2014, which claims priority benefit to U.S. Provisional Application No. 61/826,925, filed on May 23, 2013, each of which is hereby incorporated by reference in its entirety herein.

BACKGROUND

One valuable object that many people carry on a day-to-day basis is a wallet. The wallet contains items of financial value, such as cash, credit cards and other payment instruments. It additionally may include personal information, such as identification cards, which people use every day to verify their identities at various locations and/or establishments. However, the wallet has not caught up to the digital age. In particular, digital replacements of identification cards may in some cases be more susceptible to fraud if they are easy to counterfeit, copy, or duplicate, or may otherwise be more difficult to verify as authentic.

SUMMARY

Validated identification ("ID") systems and methods as discussed in the present disclosure provide individuals with the ability to carry and present a validated digital ID for everyday use, for example as part of a digital wallet, much as one uses a driver's license or other form of ID in a physical wallet. In one embodiment, the validated ID system validates a digital form of ID (such as a scanned driver's license) for an individual, and provides a validated ID token to the individual for use, for example, with a mobile computing device (such as a smartphone). Thus, the digital form of ID, representing the actual ID of the individual, may be associated with the validated ID token, which indicates that the digital form of ID is validated (e.g., the digital form of ID is a validated digital ID). The validated ID token may then be provided or presented by the individual at various service providers/locations (such as retailers, restaurants, etc.) as a form of identification. The service providers/locations can request verification by the validated ID system of the individual's identity through use of the provided validated ID token. In some embodiments, the validated ID token may be refreshed, automatically or manually by request, on a periodic basis to increase security, prevent fraudulent use, and/or assure service providers of the validity of the individual's digital ID. In some embodiments, to provide greater security and trust, the validated ID system may provide the validated ID token to the individual over a first network, while providing verification of the validated ID token to the service provider/location over a second network (e.g., "out-of-band" verification or authentication).

An individual may find having a digital identification that is accepted at various participating service providers, establishments, and locations a convenient way to provide proof of her identity when asked or required. As an example, consider an individual asked to present a valid form of ID (e.g., to show proof of age) to gain entry into a nightclub with a minimum age requirement. The individual might carry, for example on a smartphone or other mobile computing device which the individual typically carries everywhere, a digital ID that has been validated by the validated ID system. The bouncer may have a computing device (such as a smartphone or a computer) available at the nightclub entry point, configured to read an ID token, and request verification of the ID token from the validated ID system. Thus, the individual can present her digital ID to the bouncer at the nightclub instead of a physical ID card (such as a driver's license). In some cases, the bouncer may visually inspect the digital ID and determine that the ID token is trustworthy (as might be indicated, for example, by a verification badge) and allow the individual to enter. However, for added security, the bouncer may use his computing device to read the individual's ID token, for example by scanning an image associated with the ID token or by wirelessly receiving some or all of the ID token (such as a unique code or digital certificate) from the individual's smartphone. The bouncer's computing device may then submit the ID token to the validated ID system for verification. In this example, the validated ID system may then determine whether the ID token is a validly issued and/or non-expired validated ID token, and provides a verification status to the bouncer's computing device. Depending on the verification status the bouncer may decide whether to allow the individual to enter.

As part of the "out-of-band" authentication process for even greater security, the validated ID system may communicate with (e.g. provide the validated ID token to) the individual's smartphone over a first network, and the bouncer's computing device may be configured to communicate with (e.g. send the validated ID token to and receive verification status from) the validated ID system over a second network distinct from the first network. Thus, among other benefits, a potential fraudster's attempt to commit fraud may be frustrated because the fraudster would have to intercept the validated ID token across two networks in communication with two separate computing devices.

One embodiment may include one or more computer processors and a storage device storing software instructions configured for execution by the one or more computer processors. In one embodiment, the software instructions are configured to cause the computing system to access an image of a driver license of a consumer, extract information regarding the consumer from the driver license image, the information including at least a name of the consumer and a photograph of the consumer, transmit the driver license image to a document authentication service with a request to validate authenticity of the driver license, receive from the document authentication service an indication of whether the driver license is valid, provide one or more authentication questions to the consumer, wherein responses to the one or more authentication questions are usable to determine whether the consumer is the consumer named in the driver license image, receive responses to the one or more authentication questions, and determine, based on the responses, whether the consumer is the consumer named in the driver license image. In one embodiment, in response to determining that both the driver license is valid and that the consumer is the consumer named in the driver license image, the computing system generates a digital identity including one or more images and/or user interfaces configured for display on a mobile computing device, the digital identity including the photograph of the consumer or another photograph of the consumer, at least some of the information extracted from the driver license image, an indication that the at least some of the information extracted from the driver license image was extracted from a validly issued driver license, and an indication that the identity of the consumer has been validated.

DETAILED DESCRIPTION

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

High Level Data Flows

Figure 1:
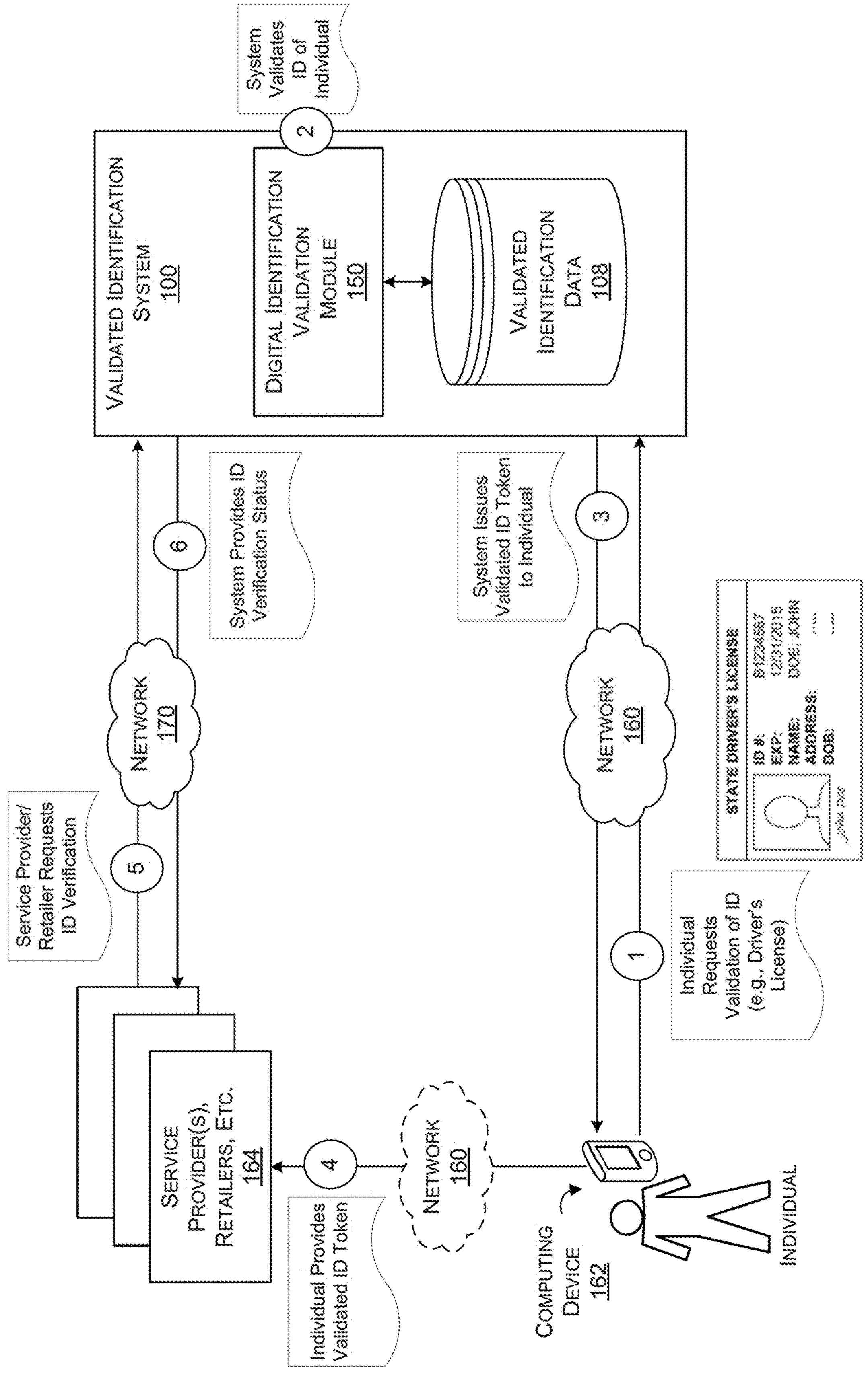
FIG. 1 is a block diagram which illustrates an exemplary data flow between one or more consumer devices (e.g., computing devices), service providers/retailers, and a validated identification system, according to one embodiment.

FIG. 1 is a block diagram which illustrates an exemplary data flow between one or more consumer devices (e.g., computing devices) 162, service providers/retailers 164, and a validated identification system 100, according to one embodiment. The data flow of FIG. 1 illustrates how an individual may validate a digital ID, and provide the validated digital ID at participating service providers and/or retailers as proof of his or her identity.

Beginning at step (1), the individual can request validation of a digital ID, for example by providing the digital ID to the validated ID system. The digital ID may be provided in many different forms. For example, according to one embodiment, the individual may scan a physical form of identification (e.g., a driver's license, a passport, a government-issued form of ID, an identification card, or any other form of ID) into a digital data format (e.g., an image file, a document, etc.). Such scanning may be performed, for example, by a camera on the individual's computing device (e.g., a smartphone camera), or by any type of image scanning device capable of scanning the image of an object into a digital format. In other embodiments, the digital ID may comprise a form of ID already in a digital format (e.g., a form of ID issued or provided to the individual originally and/or only issued in digital format) or the individual may manually provide the digital ID information, such as by typing in a driver's license number and related information.

Figure 7:
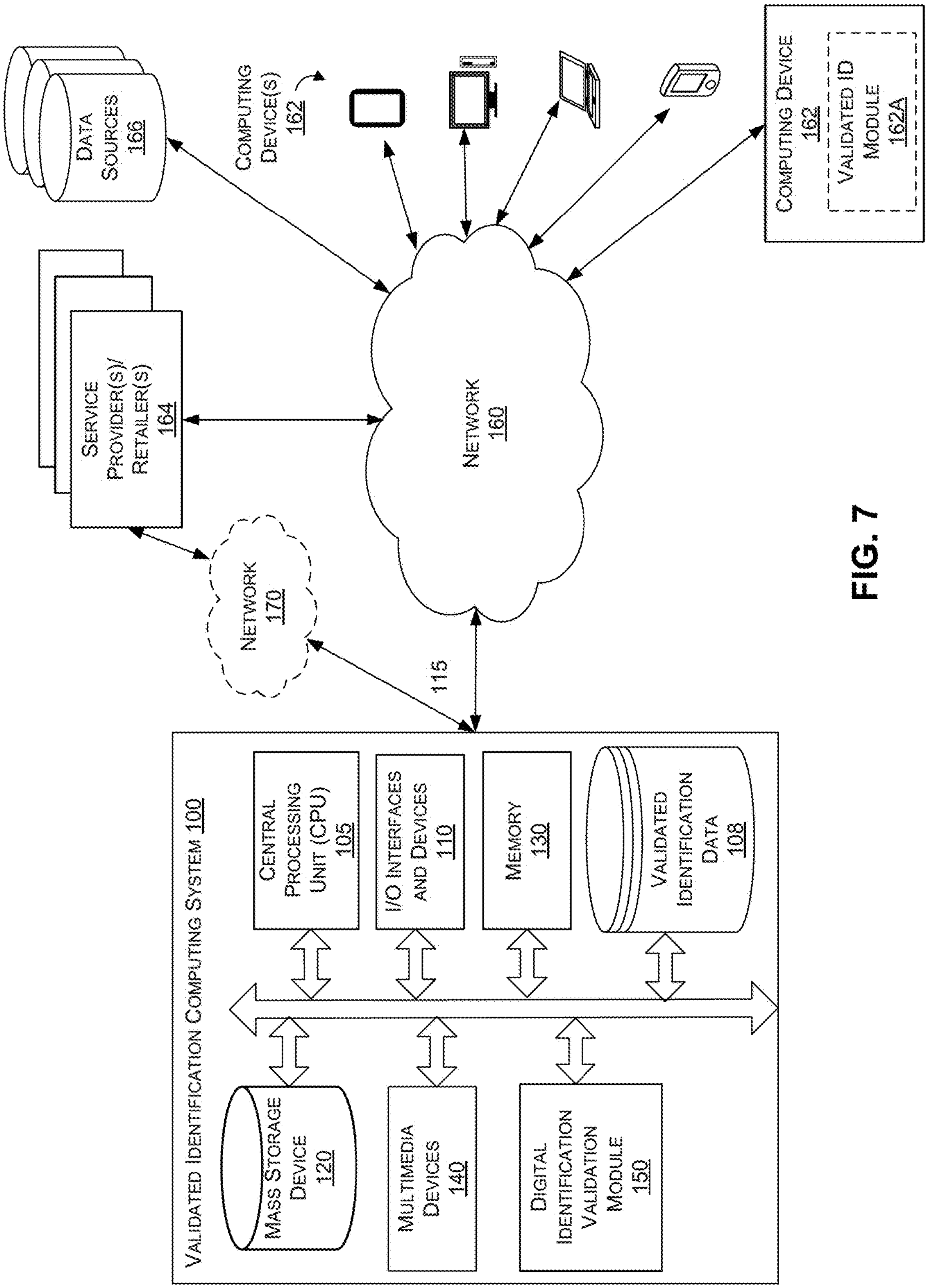
FIG. 7 is a block diagram showing an embodiment in which a validated ID computing system is in communication with one or more networks, and various systems, are also in communication with the one or more networks.

At step (2), the validated ID system validates the digital ID. The validated ID system may validate the digital ID by, for example, accessing one or more data sources (such as the data sources 166 as shown in FIG. 7) to retrieve consumer profile data associated with the individual. In order to validate the digital ID, the validated ID system can also use the consumer profile data associated with the individual to determine whether there is already a validated ID token that may be associated with the consumer profile for the individual. In some embodiments, the validated ID system may determine that no validated ID has been associated with the individual. In such cases, the validated ID system may extract personally identifying information ("PII") such as the name, address, and other information associated with the individual from the digital ID provided by the individual. The validated ID system may then compare the extracted PII to the accessed consumer profile data to determine whether there is a match. If the PII extracted from the digital ID matches the consumer profile data, the validated ID system may generate a validated ID token for the digital ID for the individual.

In some embodiments, the validated ID system may validate information regarding the individual, such as the individual's date of birth ("DOB"), by referencing data such as the individual's credit report and/or public records, such as a birth certificate. Such age validation or authentication may be performed as part of the digital ID validation process, or as a separate process. Age validation may also be performed by the validated ID system as part of the verification process(es) described herein.

If the validated ID system determines that a validated ID token has already been generated and associated with the consumer profile data, the validated ID system may generate a new validated ID token (e.g. refresh the existing or previous validated ID token). Once generated and/or refreshed, the validated ID token may be associated with the consumer profile data associated with the individual, and stored, for example, in a validated identification data store for later use in the identity verification processes described herein.

The validated ID token may be provided by the validated ID system in myriad formats. In one embodiment, the validated ID token comprises a verification badge, such as a unique image generated dynamically and/or randomly by the validated ID system for the individual. In some embodiments, the validated ID token comprises an alphanumeric code (e.g., a data text string of characters). In some embodiments, the validated ID token comprises a cookie, a "super cookie," a digital certificate, or other form of digital authentication which may be used to uniquely and securely identify and/or verify the individual's digital ID. In some embodiments, the validated ID token comprises a time stamp (e.g., a date and/or time) indicating when the validated ID token was issued and/or last validated. In some embodiments, the validated ID token comprises a geographic location indicator (e.g., Global Positioning System ("GPS") coordinates, street, city, state, and/or any other information which provides an indication of geographic location) indicating a location from which the validated ID token was last validated. Such location information may reduce risk of a fraudster copying a digital ID (e.g., photographing or taking a screen shot of a digital ID on another user's device) since the fraudster likely isn't at the location at which the validated ID token was authenticated by the consumer (and which would be included in the photograph or screen shot of the consumers digital ID).

The validated ID token may also comprise any combination of the examples described herein (e.g., a verification badge and a digital certificate; or a verification badge and GPS coordinates; etc.). The validated ID token may also be encrypted. In some embodiments, some or all portions of the validated ID token (e.g., a verification badge) are configured for display via a user interface on the individual's computing device. In some embodiments, some or all portions of the validated ID token (e.g., a digital certificate) may additionally, or alternatively, be configured for digital transmission between one or more computing devices (e.g., via a wired or wireless connection including Ethernet connections, radio, infrared, Bluetooth, Wi-Fi, near field communication ("NFC"), text messaging, short message service ("SMS"), cellular networks, etc.). In some embodiments the validated ID token is refreshed or updated automatically on a periodic basis by the validated ID system, and the refreshed validated ID token is pushed to the individual's computing device. Alternatively or in combination with the above, the individual may manually trigger a refresh of the validated ID token.

In some embodiments, the validated ID token may be issued to or associated with the individual's computing device(s). The validated ID system may also be configured to track and record usage data related to the validated ID token (e.g. by logging or recording when a request to verify the validated ID token is received by the validated ID system). The usage data may be recorded, for example at the validated identification data store 108, and used by the validated ID system to determine and charge a periodic fee to the individual for use of the digital identification associated with the validated ID token.

Once the digital ID has been validated and the validated ID token has been generated, at step (3) the validated ID system may issue the validated ID token to the individual and/or the individual's computing device. In the event that the validated ID system is unable to determine a match of the personally identifying information of the digital ID to the accessed consumer profile data, the validated ID system may instead provide an indication to the individual that a digital ID could not be validated. In that case, the individual may attempt to submit a different form of digital ID, for example, by scanning a different identification card or rescanning the submitted digital ID and attempt to try again.

Continuing to step (4), the individual may present the validated digital ID at various service providers, retailers, locations, establishments, and the like. The individual may present or provide the validated ID in various different ways. For example, the individual may show an image of the validated digital ID to the service provider which may then visually inspect the validated digital ID to determine whether the digital ID of the individual is valid. For example, the validated digital ID may display a badge, an image, or a logo which provides a visual indication that the digital ID has been validated by the validated ID system. The badge, image, or logo may, for example, be a trusted or recognized image which may only displayed on a trusted device carrying the validated digital ID, or some other form of visual indication which participating service providers may recognize as an indication that the digital ID is valid for the individual. The digital ID may display, for example, a photograph of the individual (as typically shown in an identification card) as well as other personally identifying information in addition to the verification badge, image, or logo. One example of a validated digital ID is shown in an example user interface in FIG. 2 discussed herein.

In other embodiments, the individual may provide the validated digital ID to the service provider over a wireless or wired connection such as infrared, radio, Bluetooth, Wi-Fi, NFC, text messaging, SMS, cellular networks, etc., instead of, or in conjunction with, presenting a visual user interface of the digital ID. Thus, for example, the individual may simply digitally transmit the digital ID to a service provider's computing device (e.g., by placing his/her computing device in the proximity of the service provider's computing device, by "bumping" his/her computing device with the service provider's computing device, by docking, connecting, or plugging in his/her computing device to the service provider's computing device, and the like) to transmit some or all portions or components of the validated digital ID and/or validated ID token. The service provider's computing device may be configured to read or receive the validated ID token or a portion of the validated ID token, such as a digital certificate, over the wired or wireless connection. The service provider's computing device may also be configured to request the validated ID token from a nearby computing device, such as to enable the service provider to initiate the verification process manually and/or without further or direct action from the individual. Thus, in this example, the individual may not need to actually show the digital ID, but instead can simply provide the validated ID token to the service provider or retailer by proximity of their computing device which contains their digital wallet and/or validated digital ID.

At step (5), the service provider/retailer requests verification of the identity of the individual by using the ID token provided by the individual. The request may be sent, for example, over a network 170 (which in some embodiments may be separate and distinct from the network 160) to the validated identification system, which may use the ID token to determine whether the digital ID presented by the individual is valid.

At step (6), the validated ID system attempts to verify the identity of the individual using the ID token provided by the service provider/retailer. According to one embodiment, to verify the ID token, the validated ID system may access one or more validated ID tokens stored, for example, in a validated identification data store 108. Using the validated ID tokens, the validated ID system may determine whether the provided ID token is valid. If the provided ID token is determined to be invalid, the validated ID system may provide a verification status to the service provider/retailer indicating that the ID token could not be verified as valid.

If the validated ID system determines that the provided ID token is valid, then the validated ID system may provide a verification status to the service provider/retailer indicating that the ID token has been verified as valid. If the validated ID system determines that the provided ID token is not valid, then the validated ID system may provide an indication to the service provider/retailer that the ID token could not be verified as valid.

Once the service provider/retailer receives the verification status provided by the validated ID system, the service provider/retailer may take the appropriate action depending on the verification status. For example, if the verification status indicates that the identify of the individual could not be verified, the service provider/retailer may deny service or request further identification from the individual in order to verify their identity. In some embodiments, if the service provider/retailer receives a verification status from the validated ID system indicating that the ID token is valid, the service provider/retailer may provide the service accordingly.

Example of a Validated Digital ID User Interface for a Validated ID System

Figure 2:
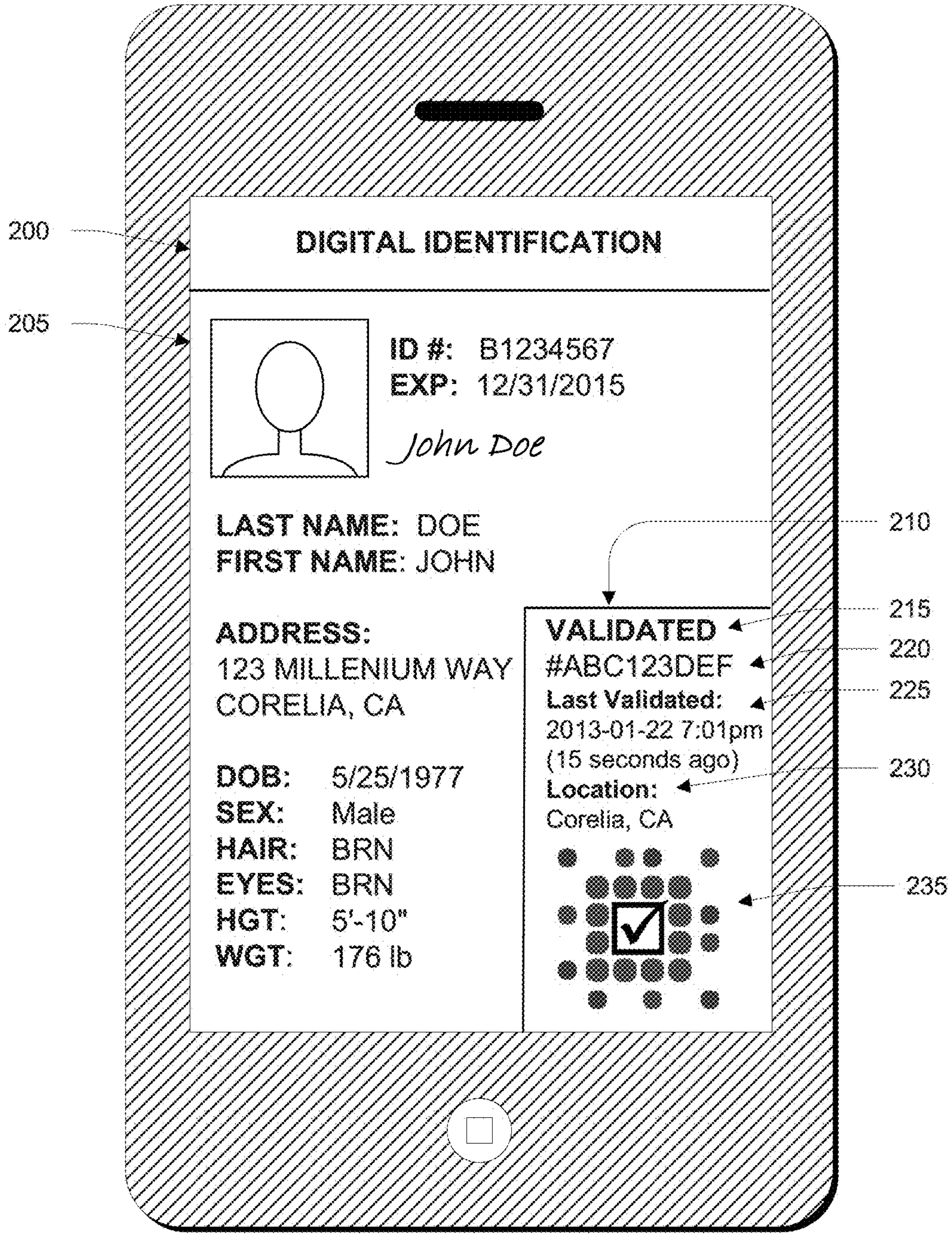
FIG. 2 illustrates an example user interface displaying a validated digital ID for an individual as used in one or more embodiments of the validated ID system.

FIG. 2 illustrates an example user interface displaying a validated digital ID for an individual as used in one or more embodiments of the validated ID system. The sample user interface may be displayed, for example, via a web browser or standalone application. However, in some embodiments, the sample user interface shown in FIG. 2 may also be displayed on a suitable computer device, such as a cell/smart phone, tablet, portable computing device, desktop, laptop, or personal computer, and are not limited to the samples as described herein. The user interface includes examples of only certain features that a validated ID system may provide. In other embodiments, additional features may be provided, and they may be provided using various different user interfaces and software code. Depending on the embodiment, the user interface and functionality described with reference to FIG. 2 may be provided by software executing on the individual's computing device, by a validated ID system located remotely that is in communication with the computing device via one or more networks, and/or some combination of software executing on the computing device and the address verification system.

The user interface shown in FIG. 2 illustrates a digital ID for an individual which has been validated by the validated ID system. As shown in FIG. 2, the digital identification 200 may include various personally identifying information ("PII") 205 associated with the digital ID of the individual. The PII 205 may include, for example, a photo of the individual, an ID number associated with the individual, an expiration date for the digital identification, a signature of the individual, the individual's name (e.g. last name, first name, middle name/initial), an address (e.g. residence or mailing) for the individual, a date of birth for the individual, and physically identifying information for the individual (e.g. hair color, eye color, height and weight). In other embodiments, additional PII not shown in FIG. 2 may be displayed. In some embodiments, not all PII associated with a digital ID may be displayed.

FIG. 2 also illustrates a validated ID token 210 indicating that the digital ID has been validated by the validated ID system. For example, the validated ID token 210 as shown in FIG. 2 includes a label 215 indicating that the ID is validated. In some embodiments, the digital ID 200 may also display an alphanumeric code 220 associated with the validated ID token 210, which may be uniquely and dynamically generated by the validated ID system. In some embodiments, the digital ID 200 may also display a validation status 225 such as a time stamp, date, and/or time indicating the last time the digital ID 200 was last validated by the validated ID system. Further, in some embodiments, the digital ID 200 may also display a location 230, such as GPS coordinates, street, city, and/or other geographical indicator, indicating the location from which the digital ID 200 was last validated by the validated ID system. Such information may be useful, for example, to assure service providers/retailers of the authenticity of the validated digital ID. Also, as illustrated in FIG. 2, in some embodiments the digital ID 200 may display an image 235 associated with the validated ID token 210, which may be, as pictured here, a badge or certificate indicating the digital ID has been validated. In some embodiments, the image 235 may also be displayed as an embedded code (such as a bar code, a Quick Response or "QR" code, etc.) or randomly generated image, which may be, for example, scanned by a computing device at a service provider/retailer to read the validated ID token from the digital ID of the individual. In some embodiments, the image 235 and/or the entire digital ID 200 may be an active user interface element (e.g. "clickable" or "selectable" such as via a touch screen interface or user interactive display element). For example, in response to an individual clicking on the image 235 and/or the digital ID 200, a request to validate the ID may be sent to the validated ID system which may then validate the ID and provide an updated validated ID token 210 for the digital ID 200.

As described herein, in some embodiments, the various components of the validated ID token may be refreshed automatically by the validated ID system and provided or pushed to the individual's computing device on a periodic basis. Thus, for example, the code 215 and/or the image 235 may be randomly and dynamically updated, for example, every 30 seconds, so that at any given time the validated ID token represents a current status that the digital ID is valid. This auto-refresh feature may, for example, increase the security and/or trust associated with the validated digital ID, and help to prevent fraudulent use or copying by ensuring that the digital ID is validated on a recurring basis. Thus, for example, if an individual loses his/her computing device, he/she may be able to provide notice to the validated ID system that the computing device was lost or stolen. In response, the validated ID system may stop refreshing and/or pushing the validated ID token to the computing device, as a consequence, the validated ID token associated with the digital ID on the computing device may no longer be valid. This would prevent, for example, fraudulent use of the individual's computing device to verify their identity at various locations. It may also prevent a fraudster from intercepting or otherwise obtaining a copy of a validated ID token for use on another computing device, such as by taking a picture or screenshot of the validated ID token for use on the fraudster's own computing device. Thus, a validated ID token may only remain valid for a short, limited amount of time to reduce the possibility of fraudulent use. By the time the fraudster attempts to use the compromised or stolen validated ID token, the validated ID token most likely will have expired and the fraudster's attempt will be denied.

Although not shown in FIG. 2, in some embodiments, the individual may be presented with an option to manually refresh the validated ID token, in which case the validated ID system may issue a new validated ID token, for example, a new code 215 and/or a new image 235 to replace the existing code 215 and/or image 235. For example, if the individual suspected potentially fraudulent use of the validated ID token (e.g., if the individual left his/her computing device unattended for a period of time and was worried the computing device may have been compromised by a fraudster), the individual may wish to request a new validated ID token and thereby invalidate any previously issued validated ID tokens. Also, although not shown in FIG. 2, the digital ID user interface may provide an option to click on or touch the validated ID token or one of its components, such as the code 215 and/or image 235, in order to request verification of the digital ID. Thus, for example, a service provider wishing to verify the ID of the individual may click on or touch the validated ID token or one of its components to request verification of the individual's ID token. In such an embodiment, the validated ID system may perform the verification process and refresh or update the validated ID token to provide an indication that the digital ID of the individual is verified. As discussed herein, the request to verify the identity of the individual may be sent over a different network than the request to validate the digital ID. This may provide an extra layer of security because the validated ID token is generated and provided to the individual's computing device over a first network, while the validated ID token is provided by the service provider/retailer's computing device and verified over a second or "out of band" network connected to the validated ID system. By way of example, in some embodiments, the first network may be an online network (e.g. the Internet) while the second network may be a telecommunications network (e.g. a cellular network), and vice versa. Thus, for example, the individual may receive a validated ID token from the validated ID system over the Internet, while the service provider/retailer requests and/or receives verification over a cellular network. In other embodiments, other types of communications networks may be used in any combination to support a two-network, out-of-band architecture, including near-field networks, radio, infrared, Bluetooth, NFC, text message services, SMS, cellular networks, and the like.

Example Use Case Scenario for Validating a Digital ID

Figure 3A:
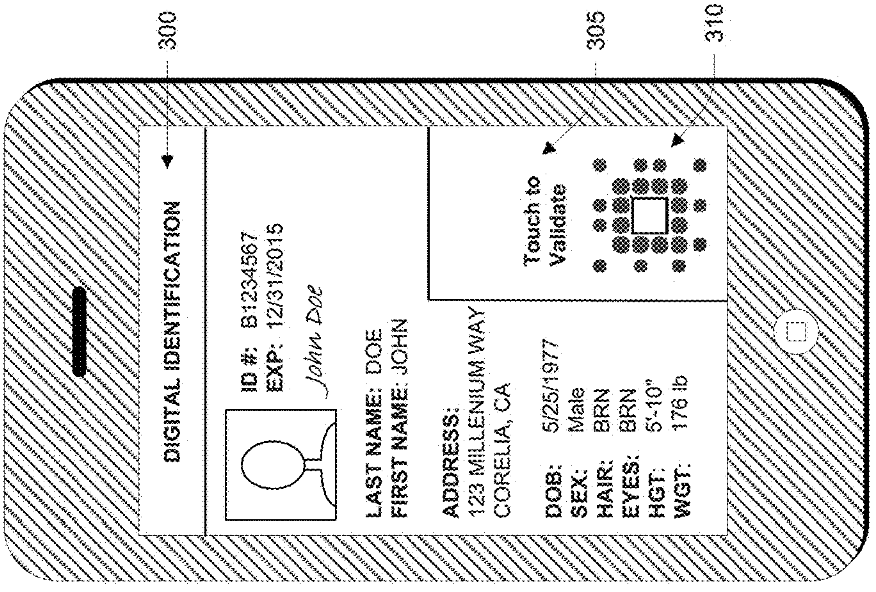
FIGS. 3A, 3B and 3C illustrate an example use case scenario in which an individual may request validation of a digital ID by the validated ID system
Figure 3B:
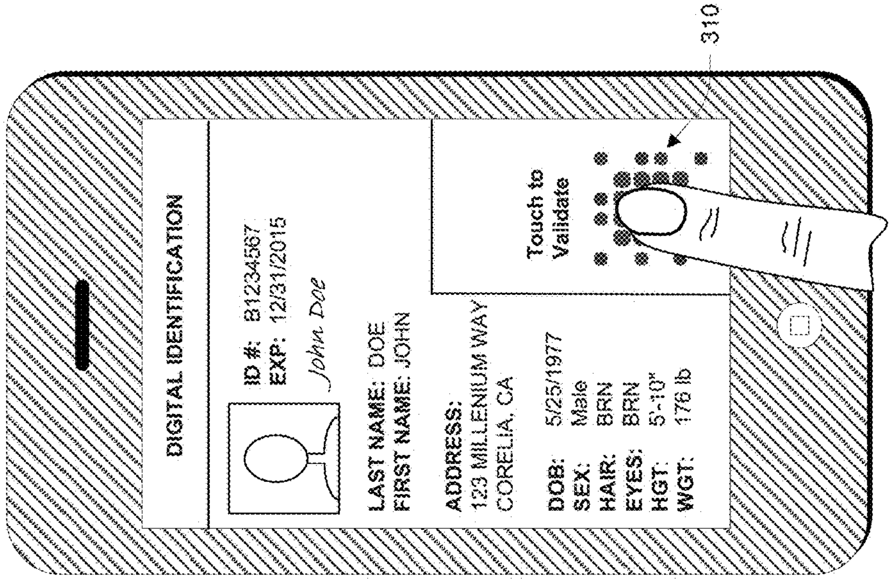
Figure 3C:
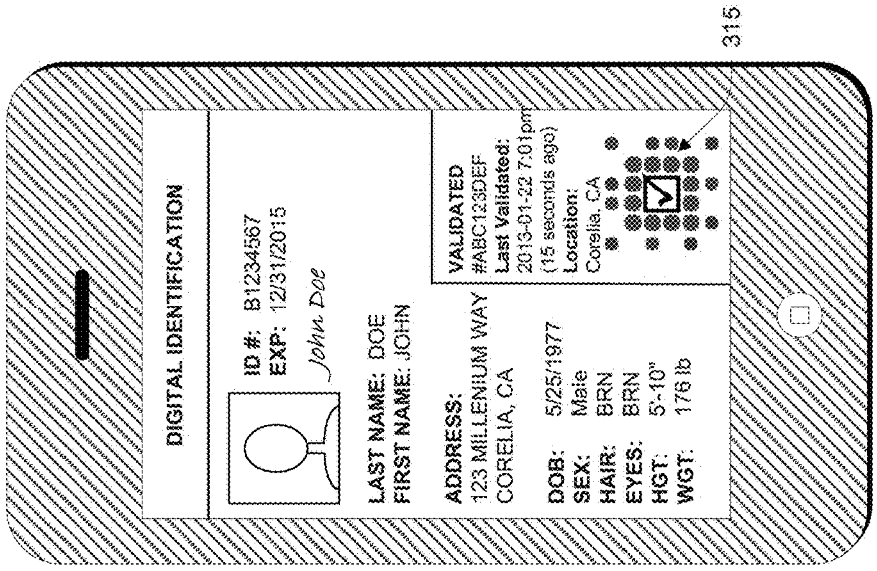

FIGS. 3A, 3B and 3C illustrate an example use case scenario in which an individual may request validation of a digital ID by the validated ID system. Beginning with FIG. 3A, the individual may be presented on a portable electronic device with a digital identification ("ID") 300, including various personally identifying information (e.g. name, address, date of birth ("DOB"), etc.), and an option to "touch to validate" 305 by touching a user-selectable portion of the screen, for example, a pre-validation badge 310. Although FIG. 3A provides an example of "touch," other user interactions may be possible, including but not limited to shaking, swiping, rotating, other touch and/or motion based interactions, voice commands (e.g. the individual may verbally request validation), etc.

FIG. 3B continues the touch example by illustrating the individual touching the pre-validation badge to initiate the request to validate the digital ID. Once a request to validate has been detected by the device, the request may be submitted to the validated ID system, which may then attempt to validate the ID for example, in conjunction with the process described with reference to FIG. 5 herein. If the validated ID system successfully validates the digital ID, it may provide a validated ID token to the individual's device for display as illustrated in FIG. 3C. In some embodiments the digital ID may display some or all of the validation status information as described herein (e.g. validation ID, time stamp, location, and/or certification badge). As shown in the example of FIG. 3C, the request to validate the digital ID was a success, and the pre-validation badge 310 has been replaced with a validation badge 315 along with other validation status information received from the validated ID system. In some embodiments, if the digital ID could not validated by the validated ID system, the device may instead show a message indicating that the digital ID could not be validated. In this use case, the validation process may be performed by the user and/or by another entity that requires validation of the ID. For example, a security agent at an event may want to see the active validation of the user's ID before trusting that the ID is valid and, thus, may actually be handed the mobile device (in a similar way as a paper ID would be) and press the validate icon to initiate the validation process (e.g., rather than shining a black light on or looking for holograms in a printed driver's license).

Example Use Case Scenario for a Validated ID

Figure 4A:
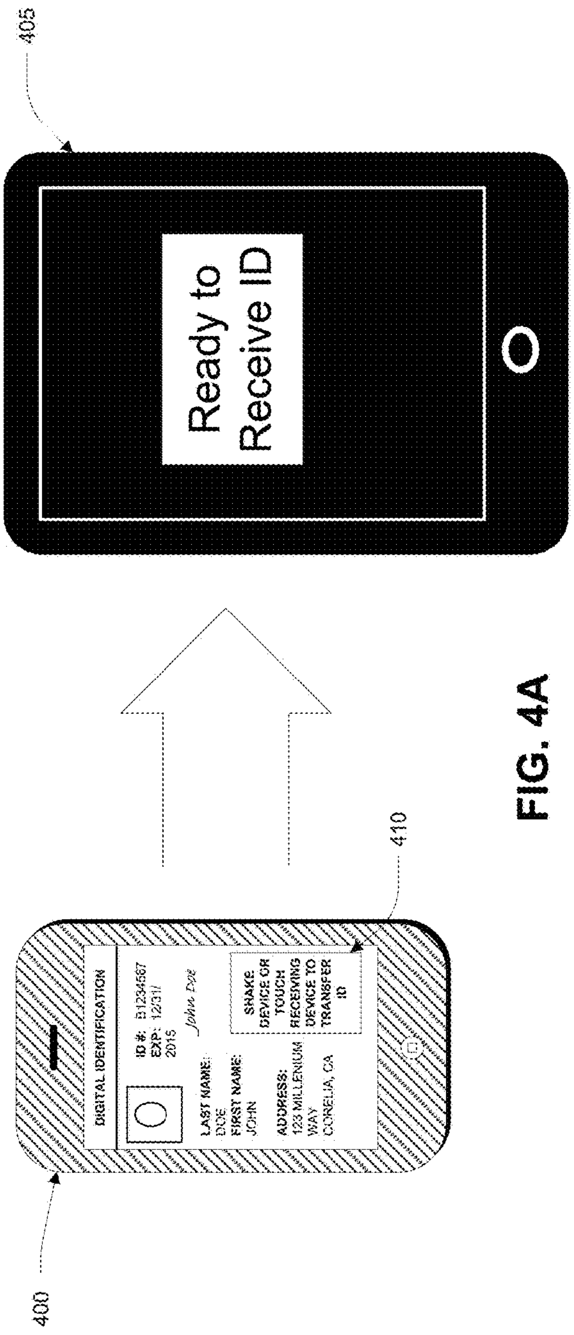
FIGS. 4A, 4B and 4C illustrate an example use case scenario in which an individual may use a validated ID in conjunction with a service provider or retailer's receiving device.
Figure 4B:
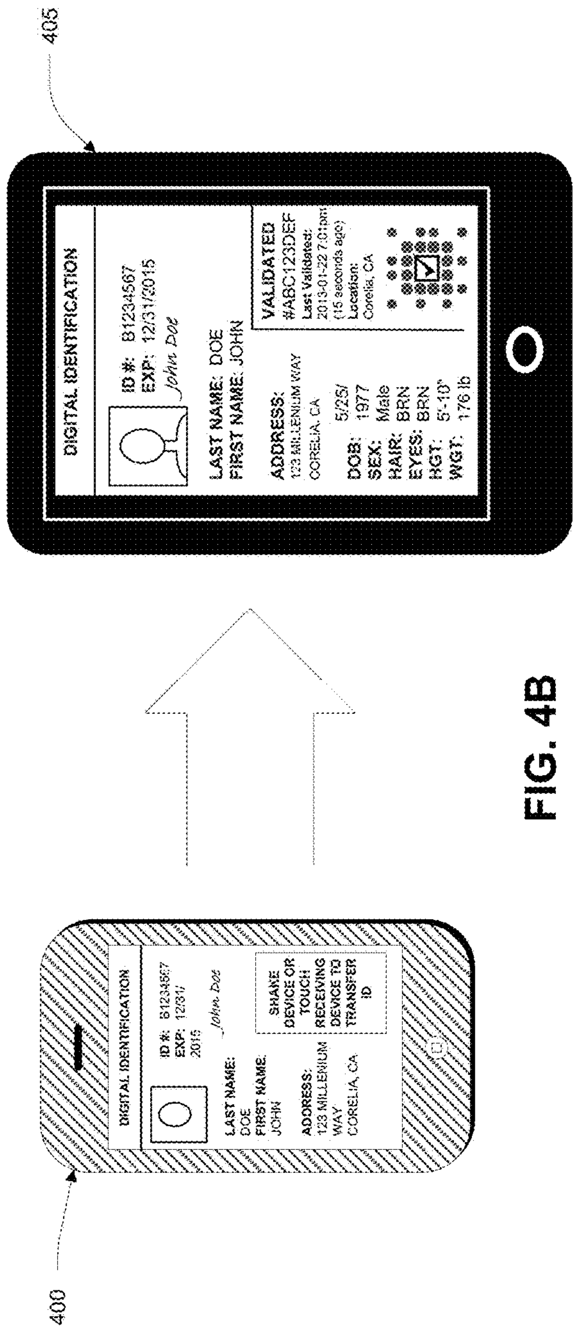
Figure 4C:
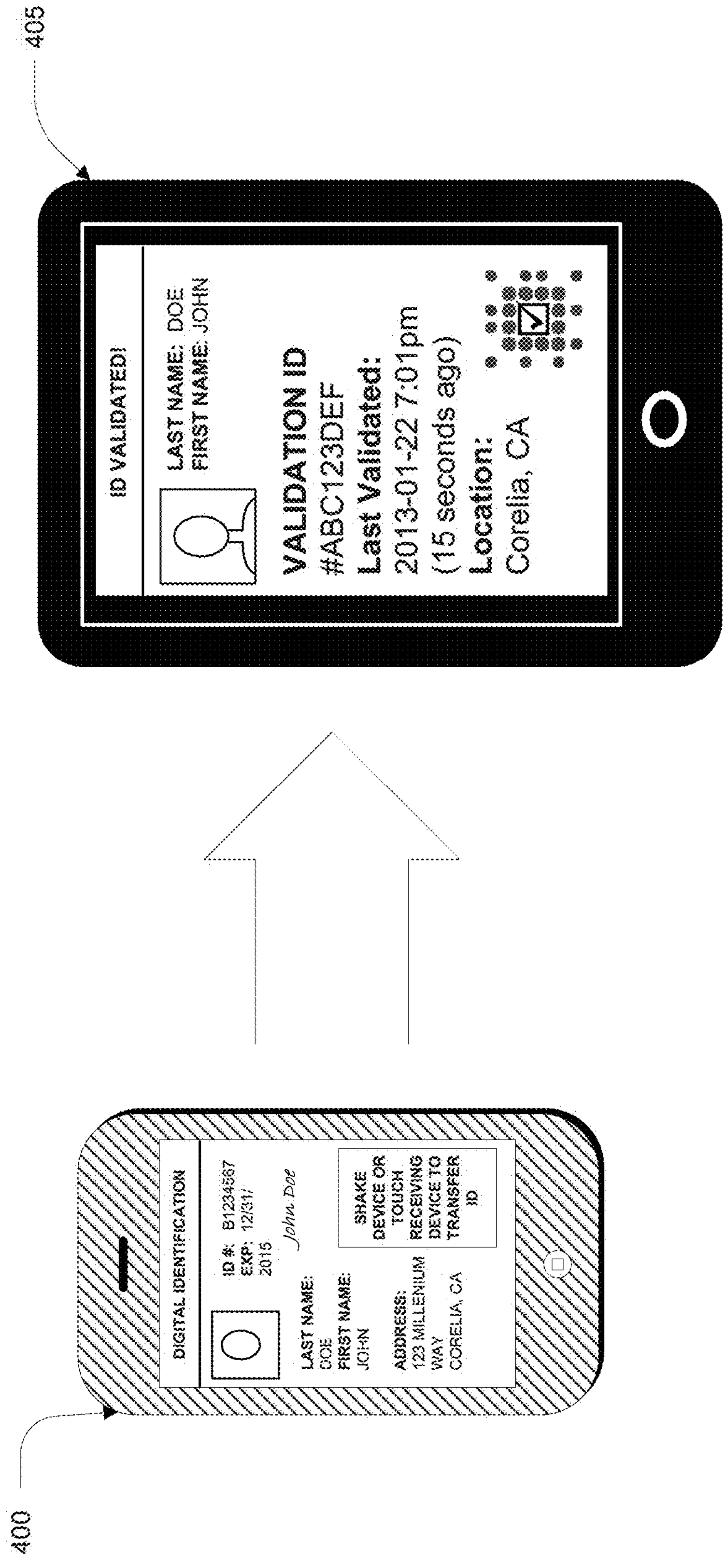

FIGS. 4A, 4B and 4C illustrate an example use case scenario in which an individual may use a validated ID in conjunction with a service provider or retailer's receiving device 405. In the example scenario illustrated, the individual may transfer a digital copy of some of all his/her digital ID (e.g. the entire digital ID, or a portion of the validated ID token, or any variation thereof), for example to a service provider's system, via a receiving device (such as a tablet PC or similar). FIG. 4A illustrates the individual's digital ID (e.g. on a mobile device) 400 displaying a message 410 indicating the individual may shake the device or touch a receiving device (e.g. receiving device 405), to transfer the digital ID from the individual's device 400 to the receiving device 405. Thus, the individual may perform the desired action (e.g. shake, touch, or other gesture) to wirelessly transfer a digital copy of the digital ID to the receiving device 405. FIG. 4B illustrates the receiving device 405 with a copy of the digital ID after receiving the digital ID from the individual's device 400. In some embodiments, after receiving the digital ID on the receiving device 405, the service provider may request validation of the digital ID in accordance with the processes described herein (see, e.g., FIG. 6). Thus, the validated ID system may receive the digital ID from the service provider's receiving device 405, validate the digital ID, and provide a verification status back to the service provider's receiving device 405.

FIG. 4C illustrates a variation on FIG. 4B in which instead of displaying and/or receiving the individual's digital ID, the receiving device 405 may alternatively display information about the digital ID's validation status (e.g., the individual's name, a validation ID, a time stamp (e.g., a date and/or time) indicating when the validated ID token was issued and/or last validated, a geographic location indicator (e.g., Global Positioning System ("GPS") coordinates, street, city, state, and/or any other information which provides an indication of geographic location) indicating a location from which the validated ID token was last validated, and/or a validation badge. The abbreviated validation status information shown in FIG. 4C may be displayed after receiving the digital ID from the individual's device 400, or after receiving a verification status from the validated ID system in response to a request to verify the digital ID received from the individual's device 400.

Examples of Methods Performed by a Validated Identification System

Figure 5:
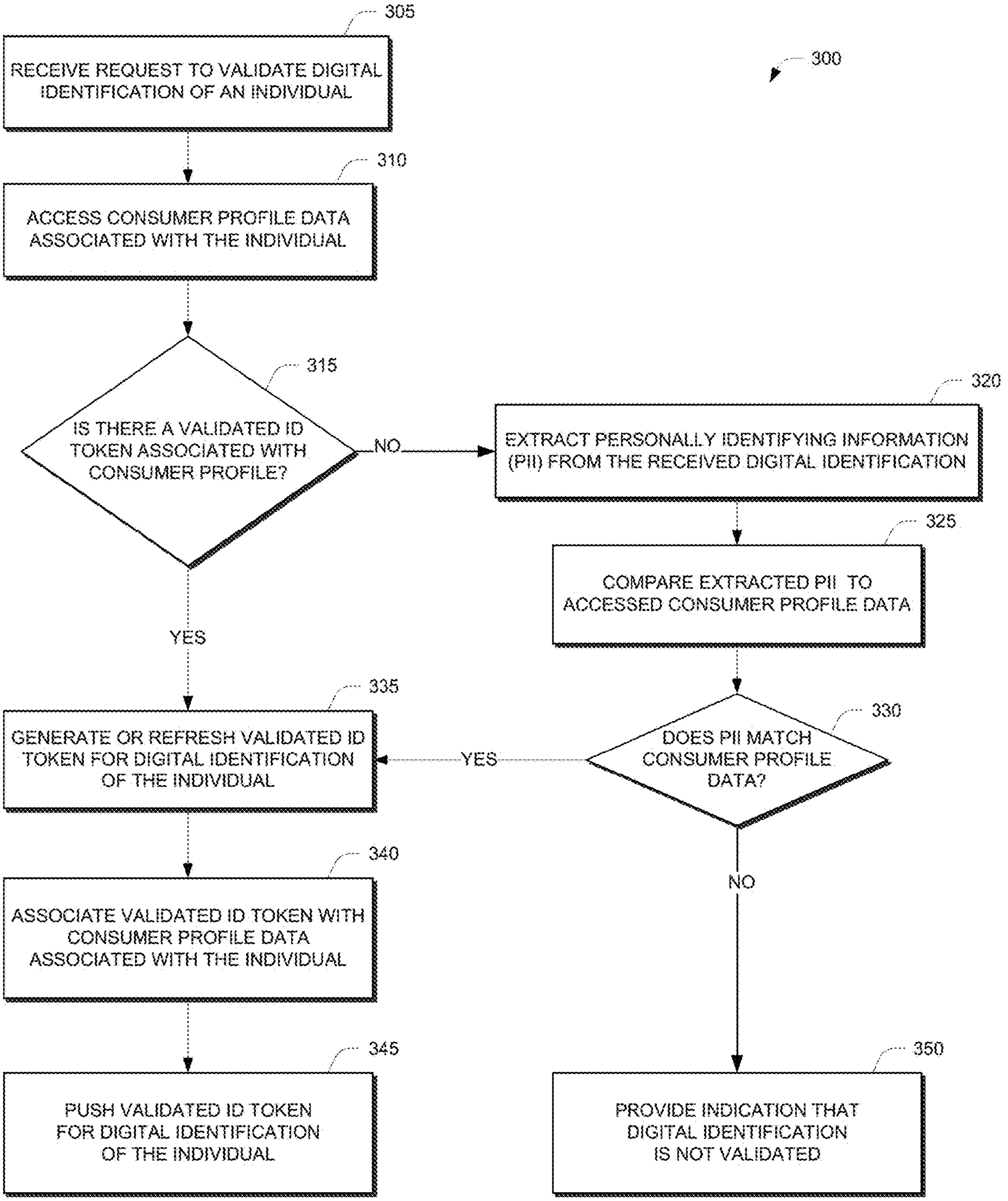
FIG. 5 is a flowchart illustrating one embodiment of a process for an individual to initially validate his/her digital identification and receive a validated ID token to allow use of the digital ID at participating locations involving an embodiment of a validated ID system, such as the validated identification system of FIG. 1

FIG. 5 is a logical flow diagram of a process 300 for an individual to initially validate his/her digital identification and receive a validated ID token to allow use of the digital ID at participating locations involving an embodiment of a validated ID system, such as the validated identification system 100 of FIG. 1. The method of FIG. 5 will be described herein as being performed by the validated ID system 100, but in other embodiments the method may be performed by one or more other computing systems, possibly in cooperation with the validated ID system 100.

Beginning at block 305, the validated ID system receives a request to validate the digital ID of an individual. The request may be received from an individual wishing to validate their digital ID for use in, for example, a digital wallet. The request may include, for example, a digitized form of a physical ID card (such as a scanned image of a driver's license). In some embodiments the request may also include additional personally identifying information or "out-of-wallet" information that may only be known by the individual (such as the individual's make and model of their first car, the name of their first boy/girlfriend, where they were born, where they went to high school, the name of their favorite teacher in high school, and other types of personally identifying information.) Such out-of-wallet information may be extracted from credit data or other public/private data associated with the individual, or may have been previously provided by the individual to the validated ID system, such that the validated ID system can use the out-of-wallet information to further verify the individual's digital identification. This information may also be useful to, for example, prevent a fraudster from stealing a physical ID card and attempting to validate the stolen physical ID card for fraudulent purposes, as the fraudster is less likely to have the out-of-wallet information necessary to validate the ID.

At block 310, the validated ID system may access consumer profile data, for example from data sources 166 storing, e.g., credit bureau and/or consumer data as shown in FIG. 7, associated with the individual. Additionally, the validated ID system may access a validated identification data store 108 which may be included as part of a validated ID system. The validated identification data store 108 may include, for example, consumer profile data previously accessed from the data sources 166, out-of-wallet information provided by the individual, and/or previously generated validated ID tokens (current and expired) which may be associated with the individual.

At block 315, the validated ID system determines if there is a validated ID token associated with the consumer profile data. In response to a determination that that no validated ID token is associated with the consumer profile data associated with the individual, the process 300 may proceed to block 320. At block 320, the validated ID system extracts personally identifying information ("PII") from the received digital identification of the individual. At block 325, the validated ID system compares the extracted PII and/or out-of-wallet information provided by the individual (e.g., in response to questions asked by the validated ID system) to the accessed consumer profile data. For example, the PII may include a last name, first name, and an address which may be compared to the name and address information associated with the consumer profile data to determine if the PII is a match.

At block 330, the validated ID system determines whether the PII matches the consumer profile data. In response to a determination that the PII does match consumer profile data associated with the individual, the process 300 may proceed to block 335.

At block 335, the validated ID system may generate a validated ID token for the digital ID of the individual. Once the validated ID token has been generated, the process 300 may proceed to block 340 where the validated ID token may be associated with the consumer profile data associated with the individual. For example, the validated ID token may be stored in the validated identification data store 108 for retrieval in a later process for verifying the identity of the individual. Finally, moving to block 345, the validated ID system may push or provide the validated ID token for the digital ID of the individual to the requesting entity.

Returning to block 330, if the validated ID system determines that the PII does not match the consumer profile data (e.g., if the address on the digital ID does not match any address(es) in the consumer profile data for the individual, or the individual-provided out-of-wallet information does not match out-of-wallet information in the consumer profile data for the individual, etc.), the process 300 can proceed to block 350 where the validated ID system may provide an indication that the digital identification could not be validated. In some embodiments, along with the indication that the digital ID could not be validated, the validated ID system may provide information indicating one or more reasons why the digital ID could not be validated. For example, the validated ID system may suggest that the digital ID could not be validated because the address did not match an address known in the consumer profile data, or the digital ID could not be validated because the name or other personally identifying information, such as the individual's physical information, could not be matched, or that the out-of-wallet information provided was incorrect, etc.

Returning to block 315, if the validated ID system determines that a validated ID token has already been associated with the consumer profile associated with the individual, then the process may proceed directly to block 335 where the validated ID system may refresh the validated ID token associated with the individual's digital ID. For example, this process may be performed as part of an automatic or periodic batch process for refreshing the validated ID associated with an individual's digital ID which may be performed as described herein automatically or manually in response to a request from the individual to refresh the validated ID token. From block 335 the process 300 may proceed to blocks 340-345 as described above, and the process 300 may then end.

Figure 6:
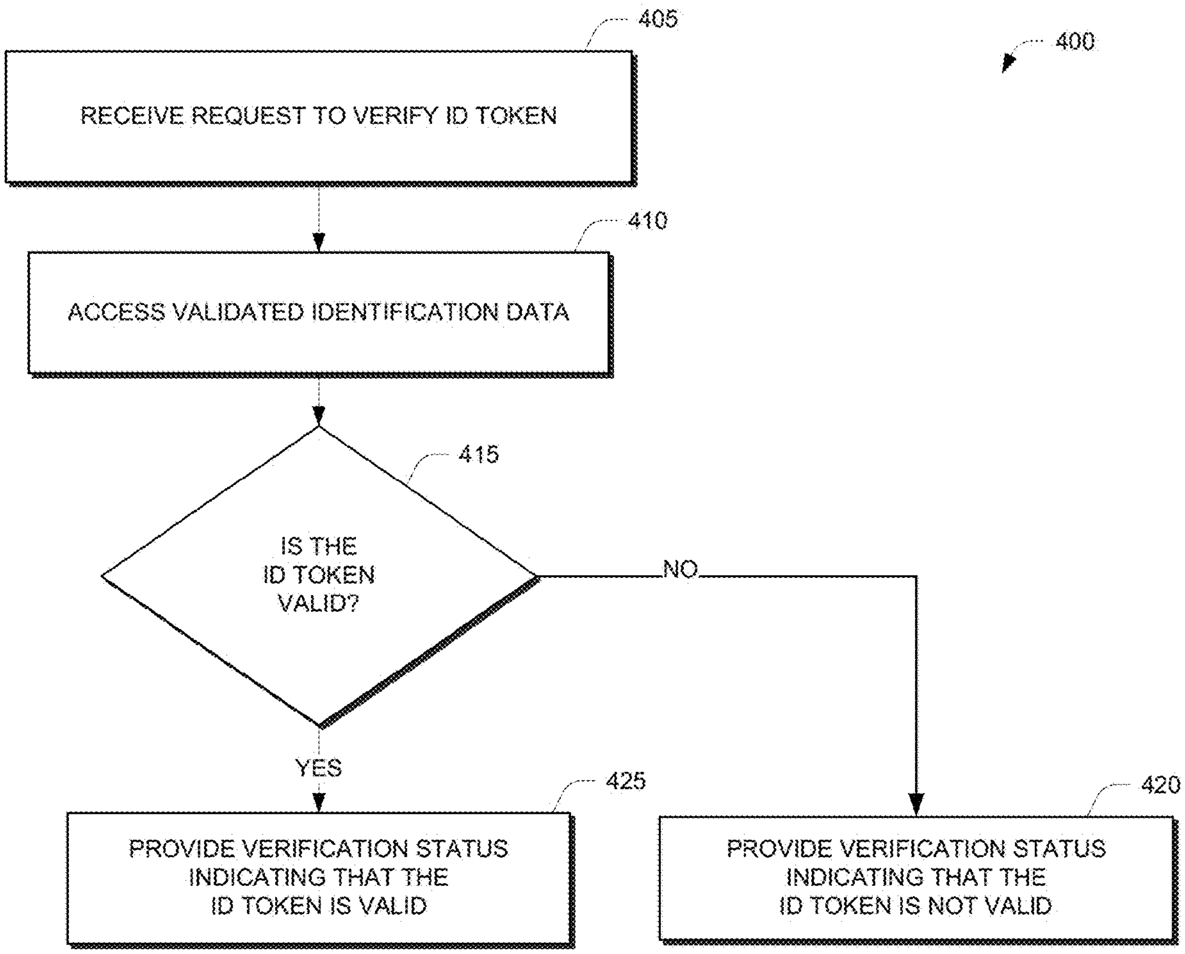
FIG. 6 is a flowchart illustrating one embodiment of a process for verifying the identify of an individual using a validated ID token involving an embodiment of a validated ID system, such as the validated identification system of FIG. 1

FIG. 6 is a logical flow diagram of a process 400 for verifying the identify of an individual using a validated ID token involving an embodiment of a validated ID system, such as the validated identification system 100 of FIG. 1. The method of FIG. 6 will be described herein as being performed by the validated ID system 100, but in other embodiments the method may be performed by one or more other computing systems, possibly in cooperation with the validated ID system 100.

Beginning at block 405, the validated ID system receives a request to verify the identity of an individual using an ID token. For example, the request may be received from a service provider/retailer wishing to verify the identity of the individual using an ID token provided by the individual. The request may include, for example, some or all portions, in any combination, of the ID token to be verified. Thus, for example, in some embodiments, the request may include a digital certificate associated with the ID token; or the request may include a validation code, such as text-based alphanumeric code or a code read from a QR image or bar code, associated with the ID token; and/or the request may include any other data element associated with the ID token.

At block 410, the validated ID system accesses validated identification data for example, from the validated identification data store 108. At block 415, the validated ID system uses the validated identification data to determine if the provided ID token is a valid ID token, e.g. based on data included in the validated identification data. For example, in some embodiments, the validated ID system may attempt to match the provided ID token (or an element of the provided ID token, such as a code) to one or more known validated ID tokens (or an element of the validated ID tokens, such as a code) included in the validated identification data. If the provided ID token does not match any known validated ID tokens, the validated ID system may determine that the provided ID token is not valid. In another example, the validated ID system may find a match of the provided ID token to one of the known validated ID tokens, but determine that the known validated ID token has expired or is otherwise no longer valid.

If the validated ID system determines that the provided ID token is not valid, then the process 400 may proceed to block 420, where the validated ID system may provide to the requesting party a verification status indicating that the ID token is not valid. In some embodiments the validated ID system may also provide with the verification status additional information related to why the ID token is not valid. For example, the verification status may indicate that the provided ID token has expired, or that the provided ID token did not match any known validated ID tokens, etc.

In some embodiments, along with the verification status, the validated ID system may also provide out-of-wallet information (e.g. questions and answers) which the requesting party (e.g. service provider/retailer) may use to further verify the individual's identity, where the out-of-wallet information is information typically only known to the individual. For example, after scanning an individual's digital ID and/or ID token and sending a request for verification to the validated ID system, the nightclub bouncer may receive a response indicating that the digital ID and/or ID token is valid along with an additional out-of-wallet question and answer which the nightclub bouncer may ask the individual for further verification. In some embodiments of the validated ID system, when the individual initially validates her digital ID, she may have be given an option, or preference, to enable or disable this type of extra "out-of-wallet" verification when the digital ID is used. The individual may also be given options to decide where (e.g. particular service providers/retailers) and/or when (e.g. particular time, day, or period of time, such as for example when the individual may be traveling) out-of-wallet type verification may be used. For example, the individual may desire out-of-wallet verification as an added security measure when using the digital ID at a financial institution such as bank (where) or during a trip abroad (when), but may not want out-of-wallet verification enabled at other locations such as supermarkets or restaurants (where) or during everyday use (when). Some of all of these features may also be provided or enabled in some embodiments via one or more user interfaces provided by the validated ID system.

As mentioned above, the validated ID system may also validate the individual's date of birth (and/or other data associated with the individual), separately as a standalone process or as part of the process 400. Thus, in some embodiments the provided ID token may include age or date or birth information, which the validated ID system may compare to accessed consumer profile data (e.g. credit report or public records, such as a birth certificate) to validate the individual's age or date of birth. The validated ID system may then provide this information to the requesting party with the verification status. This information may be useful, for example, to ensure that the individual meets a certain age requirement, such as to enter an age-prohibitive establishment (e.g. a bar or a nightclub) or to purchase age-prohibitive products (e.g. alcohol, cigarettes).

If the validated ID system determines that the provided ID token is valid, then the process 400 may proceed to block 425, where the validated ID system may provide to the requesting party a verification status indicating that the ID token is valid.

Once the validated ID system has determined whether the provided ID token is valid and provided the verification status at block 440 or block 435, the process 400 may end.

Example System Implementation and Architecture

FIG. 7 is a block diagram showing an embodiment in which a validated ID computing system 100 (or simply "computing system 100") is in communication with a network 160 and an optional network 170, and various systems, such as user computing device(s) 162 and service provider(s)/retailer(s) 164, are also in communication with the networks 160 and 170. The computing system 100 may be used to implement systems and methods described herein. In some embodiments the network 170 may be separate and distinct from the network 160, wherein the network 170 is used to provide out-of-band verification of a validated ID token.

The computing system 100 includes, for example, a personal computer that is IBM, Macintosh, or Linux/Unix compatible or a server or workstation. In one embodiment, the computing system 100 comprises a server, a laptop computer, a smart phone, a personal digital assistant, a kiosk, or an media player, for example. In one embodiment, the exemplary computing system 100 includes one or more central processing unit ("CPU") 105, which may each include a conventional or proprietary microprocessor. The computing system 100 further includes one or more memory 130, such as random access memory ("RAM") for temporary storage of information, one or more read only memory ("ROM") for permanent storage of information, and one or more mass storage device 120, such as a hard drive, diskette, solid state drive, or optical media storage device. Typically, the modules of the computing system 100 are connected to the computer using a standard based bus system 180. In different embodiments, the standard based bus system could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of computing system 100 may be combined into fewer components and modules or further separated into additional components and modules.

In the embodiment of FIG. 7, the computing system 100 includes a digital identification validation module 150 and/or validated identification data store 108. The digital identification validation module 150 may be configured to validate a digital ID for an individual and/or verify or authenticate a validated ID token associated with the individual, for example in response to a request for verification from a service provider 164. The validated identification data 108 may be, for example, a database configured to store consumer profile data, personally identifying or out-of-wallet information for individuals, and/or validated ID tokens (current and expired) associated with an individual. Also shown in the embodiment of FIG. 7, the computing device(s) 162 may include a validated id module 162A which may be configured to send digital IDs to the computing system 100 and/or service provider(s)/retailer(s) 164, receive validated ID tokens from the computing system 100, and display validated ID tokens on the computing device 162. The validated ID module 162A may also be configured to periodically request a new or refreshed validated ID token in accordance with the processes described herein. These and other modules in the computing system 100 and/or computing device(s) 162 may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The computing system 100 is generally controlled and coordinated by operating system software, such as Windows XP, Windows Vista, Windows 7, Windows 8, Windows Server, Unix, Linux, SunOS, Solaris, iOS, Blackberry OS, or other compatible operating systems. In Macintosh systems, the operating system may be any available operating system, such as MAC OS X. In other embodiments, the computing system 100 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary computing system 100 may include one or more commonly available input/output (I/O) devices and interfaces 110, such as a keyboard, mouse, touchpad, and printer. In one embodiment, the I/O devices and interfaces 110 include one or more display devices, such as a monitor, that allows the visual presentation of data to a user. More particularly, a display device provides for the presentation of GUIs, application software data, and multimedia presentations, for example. The computing system 100 may also include one or more multimedia devices 140, such as speakers, video cards, graphics accelerators, and microphones, for example.

In the embodiment of FIG. 7, the I/O devices and interfaces 110 provide a communication interface to various external devices. In the embodiment of FIG. 7, the computing system 100 is electronically coupled to networks 160 and 170, which comprises one or more of a LAN, WAN, and/or the Internet, for example, via a wired, wireless, or combination of wired and wireless, communication link 115. The networks 160 and 170 communicate with various computing devices and/or other electronic devices via wired or wireless communication links.

According to FIG. 7, in some embodiments, information may be provided to the computing system 100 over the network 160 from one or more data sources 166. The data sources 166 may include one or more internal and/or external data sources. The data sources 166 may include internal and external data sources which store, for example, credit bureau data (for example, credit bureau data from File OneSM) and/or other consumer data. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the computing system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Digital Identity

A digital identity service may be configured to compile digital identity information regarding a consumer and to make that digital identity information available to multiple data sources. For example, a digital identity service may be configured to obtain information regarding a consumer's identity from a physical ID (e.g., a driver's license, a birth certificate, a Social Security card, etc.), validate the authenticity of the provided physical ID (or more particularly, a photograph of the physical ID), and combine the consumer information from the authenticated physical ID with authentication information of the consumer (e.g., authenticating that the consumer really is who they say they are, such as via one or more out of wallet questions, and/or that the consumer is who is identified in the physical ID). Thus, the digital identity service can generate a digital identity of the consumer that is populated with information with minimal effort from the consumer, but that is validated in multiple ways so that the information can be trusted by various entities, including the various validation methods discussed above with reference to FIGS. 1-7.

Figure 8:
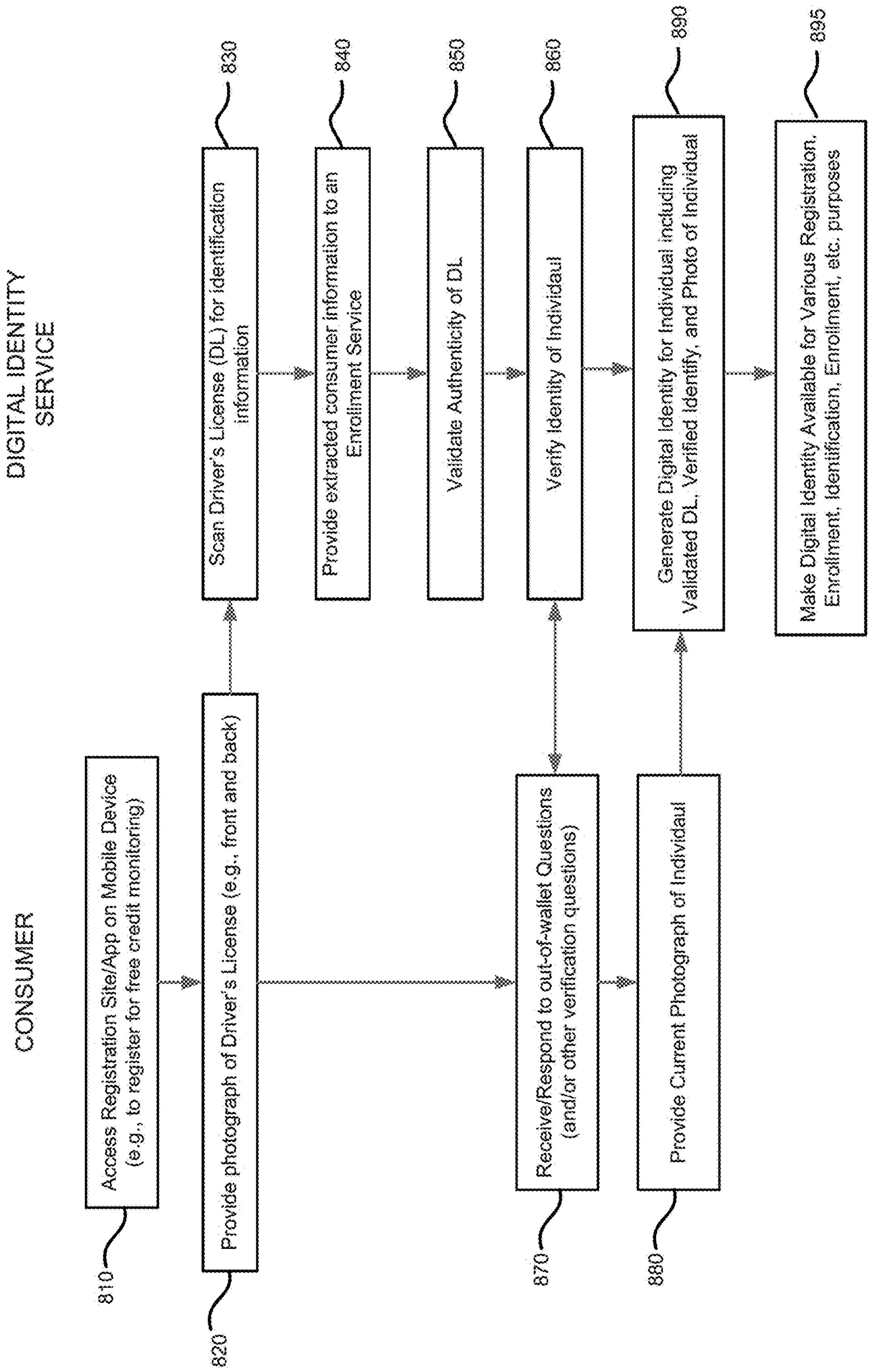
FIG. 8 is a flowchart illustrating an example process of generating a digital identity for a consumer, such as may be initiated when a consumer attempts to register for an online service (e.g., a credit monitoring service).

FIG. 8 is a flowchart illustrating an example process of generating a digital identity for a consumer, such as may be initiated when a consumer attempts to register for an online service (e.g., a credit monitoring service). In the embodiment of FIG. 8, the method is divided into two columns, with the left column indicating actions that a consumer and/or consumer mobile device may perform, while the right-hand column indicates actions that a digital identity service and/or related computing systems may perform. Depending on the embodiment, the blocks may be performed by different entities. Additionally, the blocks may be performed in an order different than is illustrated and/or the method may contain additional or fewer blocks.

Beginning at block 810, a consumer accesses a registration site or application on a mobile device (or a non-mobile device). For example, a consumer may access a sign-up page for a free (or paid) credit monitoring service, which requires personal identification information of the consumer in order to register for the credit monitoring service. In other embodiments, the consumer may visit a site or app of the digital identity service directly, such that the process begins with a consumer requesting establishment of a digital identity (e.g., without initiating registration with any other service).

Next, at block 820, the consumer provides a photograph of the consumer's driver's license and/or other identification document, such as a passport, birth certificate, Social Security card, school identification, etc. Depending on the embodiment, the consumer may provide images of both a front and back of the identification document because, for example, the back of certain identification documents includes valuable identification information and/or information that is usable to validate the authenticity of the identification document.

Moving to block 830, the digital identity service scans the driver's license for identification information of the consumer. For example, the digital identity service may perform OCR on the driver's license and then parse information on the driver's license according to regular expression logic configured to identify various pieces of identification information. In one embodiment, the digital identity service uses technology provided by another party to extract information from the identification document. Alternatively, the digital identity service may forward the driver's license images to another entity so that the information extraction may be performed by that other entity and returned to the digital identity service.

In block 840, the consumer information extracted from the driver's license is provided to the enrollment service. For example, the consumer information may be used to prepopulate registration fields provided by the enrollment service so that the consumer is not required to manually provide such information. In some embodiments, the consumer information is provided later in the process, such as after the authenticity of the identification document is validated. In some embodiments, such as where the consumer is not enrolling in a service, block 840 may not be performed.

Next, at block 850, authenticity of the driver's license (or other form of identification) is validated, either using technology provided by the digital identity service itself and/or using document validation technology of one or more other entities. For example, in one embodiment the digital identity service provides the identification document images to a company such as 192Business to perform a document validity check. In such an embodiment, the results of a validity check (e.g., a confirmation that the document is valid or an indication that the document may be invalid, and/or a confidence level of authenticity) may be returned to the digital identity service. In some embodiments, the information extraction at block 830 and/or the authenticity validation of block 850 are performed by a single entity, such as the digital identity service or another entity.

Moving to block 860, the identity of the individual is authenticated, such as to obtain a confidence level that the consumer really is the consumer identified in the driver's license information. Depending on the embodiment, various authentication techniques may be performed, such as by using out of wallet questions that are obtained from a consumer's credit data (e.g. questions regarding previous mortgage accounts, residence addresses, etc., that it is unlikely know by others besides the consumer). In some embodiments, the authentication is performed by a separate service, such as Experian's PreciseID service, and results of the authentication are provided back to the digital identity service.

At block 870, the consumer receives and responds to out of wallet questions and/or other authentication questions in order to authenticate the identity of the consumer. As noted above, various authentication methods may be used in order to arrive at a confidence level that the consumer is who is identified in the provided identification document photographs.

Moving to block 880, in some embodiments once the consumer is authenticated the consumer is asked to provide a current photograph (and/or other biometric) to be included in the consumer's digital identity. For example, the consumer may obtain a photograph on the consumer's mobile device that is transmitted to the digital identity service. In other embodiments, a photograph is not obtained at block 880 and, instead, an existing photograph of the consumer is used in the digital identity of the consumer (or no photograph of the consumer is used in certain embodiments). For example, the photograph of the consumer from the driver's license (or other ID) may be used in the digital identity service and/or a photograph of the consumer may be obtained from one or more other data sources, such as a social network that has a profile picture of the consumer.

Next, at block 890 the digital identity service generates a digital identity for the consumer. Depending on the embodiment, the digital identity may include various data, such as a copy of the driver's license photograph(s), extracted information from the driver's license, authenticity information regarding the driver's license, authentication information regarding the individual identified in the driver's license, one or more photographs of the individual, device information associated with one or more devices from which the identification information was received (e.g., a device identifier for the mobile device of the consumer) and/or any other information relevant to the consumer's identity. In some embodiments additional data sources are accessed in order to obtain further information regarding the consumer, such as demographic data sources, publicly available data sources, marketing data sources, etc.

At block 895, the digital identity is made available for various applications. For example, with reference to the example registration process noted above, the digital identity may be provided to the registration site and used in registration of the consumer for the associated service. In some embodiments, the digital identity may be stored on a server of the digital identity service and made available to third parties (e.g., online websites) via an API and/or other exchange protocol. In some embodiments, the digital identity may be stored on the consumers device, e.g., a mobile device of the consumer, such that information from the digital identity may be provided directly to requesting entities (e.g. a financial institution that requires the identity information) from the consumers mobile device, such as using one or more of the methods discussed above, for example.

Figure 9:
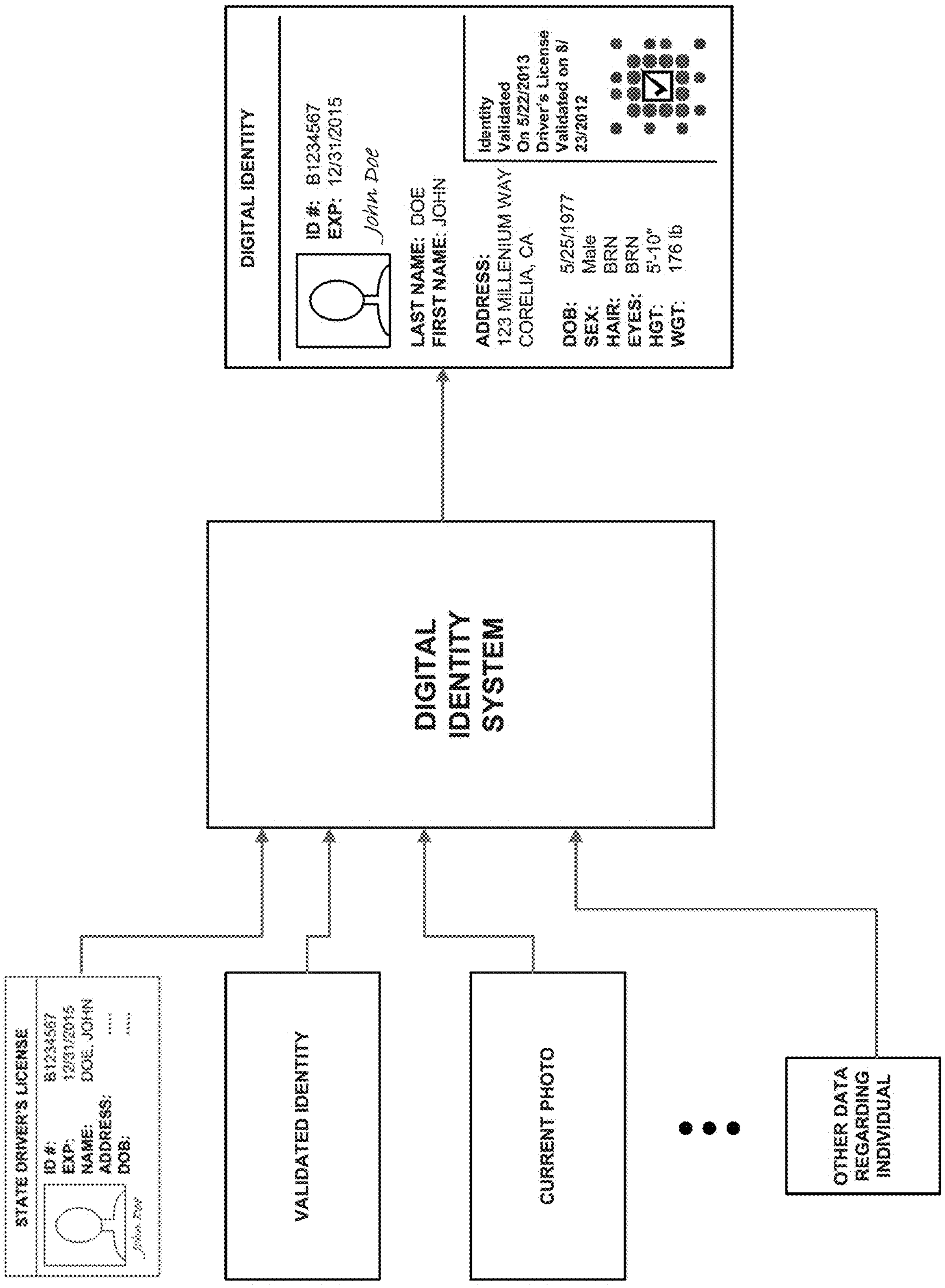
FIG. 9 is a flow diagram illustrating example information components that may be combined in order to generate a digital identity of a consumer.

FIG. 9 is a flow diagram illustrating example information components that may be combined in order to generate a digital identity of a consumer. Depending on the embodiment, fewer and/or additional information may be combined in a consumer's digital identity.

In the embodiment of FIG. 9, a state driver's license, authenticated identity information, and a current photo are each received (or generated or accessed) by the digital identity system. Also shown in FIG. 9 are other data regarding the individual, which may include any other type of data, such as demographic, psychographic, etc. In this embodiment, the digital identity system combines the received information (or at least portions of the information) in order to generate a digital identity of the consumer, such as the example digital identity illustrated.

The example digital entity is in the form of a user interface that may be provided to any interested party to provide consumer information, as well as information regarding the validity of the information and authentication of the individual. In other embodiments, the information may be in any other format, such as in a database or other data structure. The example digital identity of FIG. 9 illustrates information extracted from the consumers driver's license, and also indicates that the driver's license was validated on a particular date (Aug. 23, 2012 in this example), and that the identity of the indicated individual (e.g., John Doe in this example), was authenticated on May 22, 2013. In this example, a validation stamp (e.g. the logo in the lower right corner of the digital identity) indicates a source of the digital identity, such that the information provided therein may be more trustworthy. In some embodiments additional or less information regarding the validity of the provided consumer information may be included, such as a date and/or location where the consumer was last authenticated. In some embodiments, the consumer is required to re-authenticate periodically (as discussed in certain embodiments discussed above). In some embodiments, the digital identity may be shown to an interested party and authentication of the digital identity may occur in real time, such as based on a device identifier, location information of the device, authentication questions asked of the consumer, and/or other information available to the digital identity system.

Figure 10:
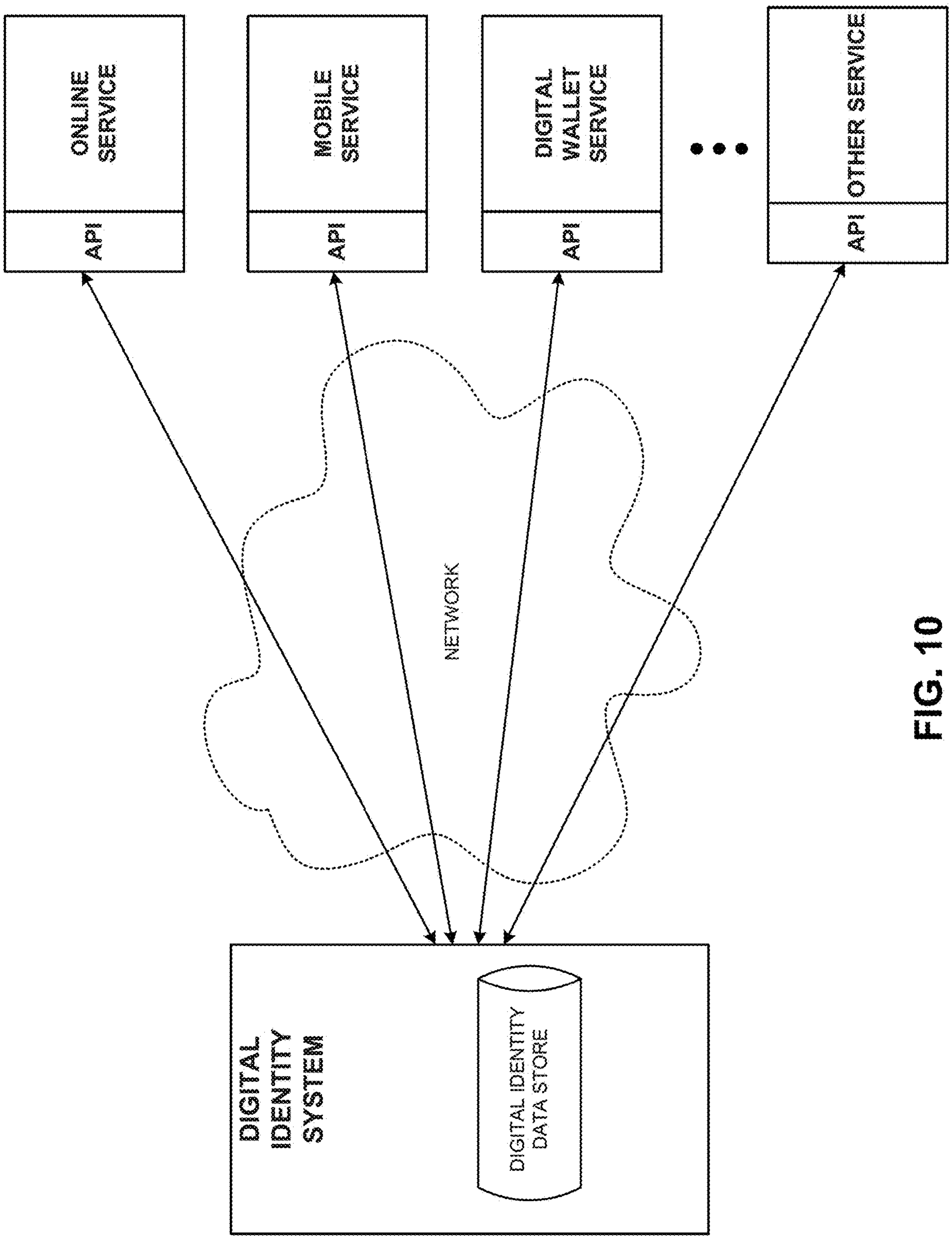
FIG. 10 is a block diagram illustrating one embodiment of a digital identity system in communication with various services that access digital identities of consumers that are stored by the digital identity system.

FIG. 10 is a block diagram illustrating one embodiment of a digital identity system in communication with various services that access digital identities of consumers that are stored by the digital identity system. In the example of FIG. 10, an online service, a mobile service, a digital wallet service, and one or more other services, may each communicate with the digital identity service in order to access one or more digital identities of consumers via an API that is configured to allow such communication. Thus, the various services may easily access digital identity information of consumers (e.g., possibly after receiving authorization to do so from the consumer) in order to provide services to consumers, validate the consumer's identity, etc. In other embodiments, the services may communicate with the digital identity system (and the digital identities stored therein) in any other manner.

Figure 11:
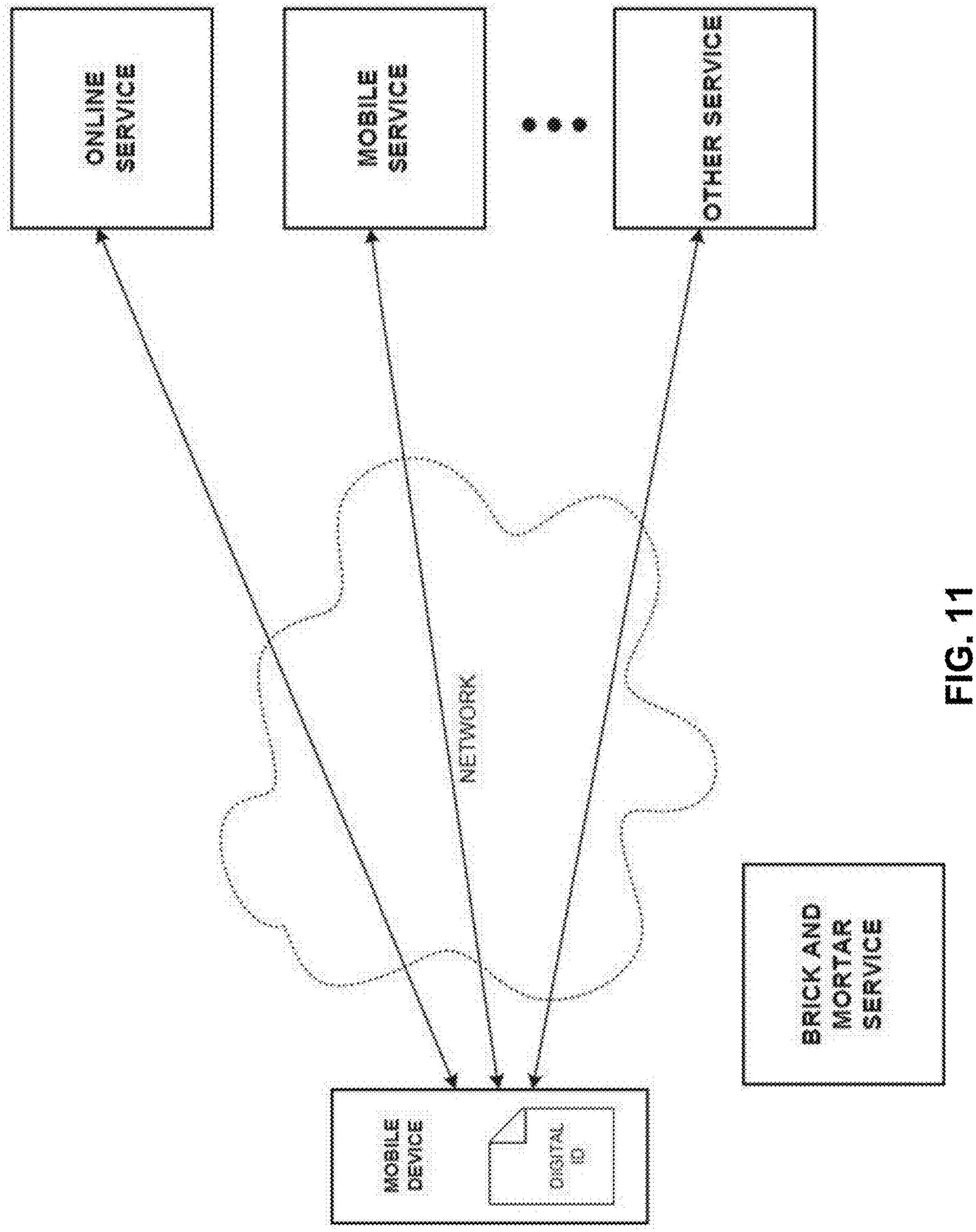
FIG. 11 is a block diagram illustrating one embodiment of a digital identity that is stored on a particular consumer's mobile device.

FIG. 11 is a block diagram illustrating one embodiment of a digital identity that is stored on a particular consumer's mobile device. As noted above, the digital identity may be a valuable information item that is usable by a consumer to quickly and reliably provide information to various entities. Examples of services to which the digital identity may be provided via the mobile device are an online service, a mobile service, and a brick-and-mortar service, as well as any other service. The digital ID may be transmitted to the online service via any available protocol, such as via an Internet connection or near field communication, for example. In one embodiment, the digital ID is displayed to an individual representing the brick and mortar service (e.g., a nightclub bouncer or cashier at a restaurant or store) in order to allow the individual to view the authenticated ID of the consumer.

In one embodiment, a digital identity may be used in conjunction with other services, such as a payment service, to streamline a payment process by providing identification and payment information concurrently, for example. In some embodiments, the digital identity may be used in conjunction with alerts that are provided to consumers. For example, a consumer may be provided an alert when the consumer approaches a business establishment of interest in view of a portion of the digital identity of the consumer being accessible to the business.

OTHER

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the address verification computing system 100 and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computing system comprising:

memory; and one or more processors configured by computer-executable instructions that, when executed by the one or more processors, cause the one or more processors to:

generate or obtain results of a validation of an individual based at least in part on an image of a government-issued form of identification ("ID") of the individual;

based at least in part on the results of the validation, generate a validated ID token, wherein the validated ID token is specific to the individual and is usable to authenticate the individual;

associate the validated ID token and profile data regarding the individual in a validated ID data store;

receive an identification verification request from a third-party service provider in association with a request from the individual to open an account with the third-party service provider; and in response to the identification verification request, transmit a response to the third-party service provider that is based at least in part on a comparison of information in the identification verification request and at least one of the validated ID token or the profile data stored in the validated ID data store.

2. The computing system of claim 1, wherein the validated ID token is generated in response to a determination that the individual was not associated with a pre-existing ID token.

3. The computing system of claim 1, wherein the computer-executable instructions further cause the one or more processors to:

retrieve a digital image of the government-issued form of identification of the individual from a camera of a mobile device of the individual; and extract a set of personally identifying information of the individual from the digital image.

4. The computing system of claim 1, wherein the identification verification request is sent by a merchant or retailer.

5. The computing system of claim 1, wherein the computer-executable instructions further cause the one or more processors to: generate a new validated ID token periodically for the individual.

6. The computing system of claim 1, wherein the computer-executable instructions further cause the one or more processors to: provide the validated ID token to the individual over a network, wherein the individual provides the validated ID token to the third-party service provider prior to the identification verification request being sent from the third-party service provider.

7. The computing system of claim 1, wherein the validated ID token is valid for use only for a predetermined period of time.

8. The computing system of claim 1, wherein the validated ID token is associated with a particular computing device of a user.

9. The computing system of claim 1, wherein the identification verification request is from a point of sale device of a merchant.

10. The computing system of claim 1, wherein the computer-executable instructions further cause the one or more processors to:

generate a user interface for display to the individual, wherein the user interface includes a selectable interface element configured to, upon selection by the individual, invalidate the validated ID token.

11. A computer-implemented method comprising:

generating or obtaining results of a validation of an individual based at least in part on an image of a government-issued form of identification ("ID") of the individual;

based at least in part on the results of the validation, generating a validated ID token, wherein the validated ID token is specific to the individual and is usable to authenticate the individual;

associating the validated ID token and profile data regarding the individual in a validated ID data store;

receiving an identification verification request from a third-party service provider in association with a request from the individual to open an account with the third-party service provider; and in response to the identification verification request, transmitting a response to the third-party service provider that is based at least in part on a comparison of information in the identification verification request and at least one of the validated ID token or the profile data stored in the validated ID data store.

12. The computer-implemented method of claim 11, wherein the government-issued form of identification comprises one of a driver's license or a passport.

13. The computer-implemented method of claim 11, wherein the image of the government-issued form of identification comprises a scan or a photograph of the government-issued form of identification.

14. The method of claim 11, further comprising:

identifying a photograph of the individual from a social media site corresponding to the individual; and comparing the photograph to another photograph of the individual, wherein generating the validated ID token is further based at least in part on a determination that at least a portion of the another photograph corresponds to at least a portion of the photograph of the individual.

15. The method of claim 11, wherein the validated ID token comprises an indication that the government-issued form of identification is valid and was issued by an issuing entity.

16. The method of claim 11, wherein the profile data comprises credit data.

17. The method of claim 11 further comprising providing an application programming interface to one or more online services, wherein the application programming interface is configured to allow the one or more online services to access the validated ID token.

18. The method of claim 11, wherein the response to the identification verification request includes the validated ID token.

* * * * *